(12) United States Patent
Thillainadarajah et al.

(10) Patent No.: US 10,386,453 B2
(45) Date of Patent: Aug. 20, 2019

(54) METHODS AND SYSTEMS FOR POSITION TRACKING

(71) Applicant: Smart Skin Technologies Inc., Fredericton (CA)

(72) Inventors: Kumaran Thillainadarajah, Fredericton (CA); Adam Joseph MacDonald, Hanwell (CA); Daniel Robert Rogers, McLeod Hill (CA); Abhishek Kar, Fredericton (CA)

(73) Assignee: Smart Skin Technologies Inc., Fredericton, New Brunswick (CA)

(*) Notice: Subject to any disclaimer, the term of this patent is extended or adjusted under 35 U.S.C. 154(b) by 130 days.

(21) Appl. No.: 15/533,226

(22) PCT Filed: Dec. 4, 2015

(86) PCT No.: PCT/CA2015/051271
§ 371 (c)(1),
(2) Date: Oct. 18, 2017

(87) PCT Pub. No.: WO2016/086312
PCT Pub. Date: Jun. 9, 2016

(65) Prior Publication Data
US 2017/0363708 A1 Dec. 21, 2017

Related U.S. Application Data

(60) Provisional application No. 62/088,312, filed on Dec. 5, 2014.

(51) Int. Cl.
*A63F 13/65* (2014.01)
*G01S 5/02* (2010.01)
*G01S 5/14* (2006.01)

(52) U.S. Cl.
CPC ............ *G01S 5/0294* (2013.01); *G01S 5/02* (2013.01); *G01S 5/0252* (2013.01); *G01S 5/14* (2013.01)

(58) Field of Classification Search
CPC ..... H04W 4/02; H04W 4/027; H04W 64/006; H04W 52/0209; H04B 10/116; A63B 71/0622; G06K 7/10207
(Continued)

(56) References Cited

U.S. PATENT DOCUMENTS 5,742,237 A 4/1998 Bledsoe
2002/0014533 A1* 2/2002 Zhu .................. B82Y 15/00
235/472.01

(Continued)

FOREIGN PATENT DOCUMENTS

EP 2 733 502 A1 5/2014
JP 2014-99857 A 5/2014
WO 2011/009767 A2 1/2011

OTHER PUBLICATIONS

Extended European Search Report dated Jul. 5, 2018 in corresponding EP Patent Application No. 15865394.9.
(Continued)

*Primary Examiner* — Phuoc H Doan
(74) *Attorney, Agent, or Firm* — Bereskin & Parr LLP/S.E.N.C.R.L., s.r.l.

(57) ABSTRACT

Various embodiments are described herein for methods and systems that can be used to track a position of a mobile receiver on a production line. In one example embodiment, the position of the mobile receiver is tracked by receiving at least information signal from at least one location tag from among a plurality of location tags positioned at fixed locations along the length of a conveyor belt in a production line, by determining a signal strength of the at least one infor-
(Continued)

mation signal, and by determining the position of the mobile receiver based on the signal strength of the at least one information signal.

20 Claims, 40 Drawing Sheets

(58) Field of Classification Search
USPC ........ 700/91; 340/572.1, 539.12; 235/472.01
See application file for complete search history.

(56) References Cited

U.S. PATENT DOCUMENTS

| | | |
|---|---|---|
| 2006/0208887 A1 | 9/2006 | Fields et al. |
| 2008/0061939 A1 | 3/2008 | Davis et al. |
| 2009/0286548 A1 | 11/2009 | Coronel et al. |
| 2014/0132411 A1 | 5/2014 | Buchheim et al. |
| 2014/0135041 A1 | 5/2014 | Buchheim et al. |
| 2014/0135042 A1 | 5/2014 | Buchheim et al. |
| 2014/0347165 A1 | 11/2014 | Bremer |
| 2014/0364974 A1* | 12/2014 | Wohl .................. G06K 7/10227 700/91 |
| 2014/0370917 A1 | 12/2014 | Buchheim et al. |

OTHER PUBLICATIONS

Faragher, et al., "An Analysis of the Accuracy of Bluetooth Low Energy for Indoor Positioning Applications", In Proceedings of the 27th International Technical Meeting of the Satellite Division of the Institute of Navigation (ION GNSS+ 2014), Tampa, Florida, 2014, pp. 201-210.

International Search Report and Written Opinion dated Mar. 8, 2016 in corresponding International Patent Application No. PCT/CA2015/051271.

* cited by examiner

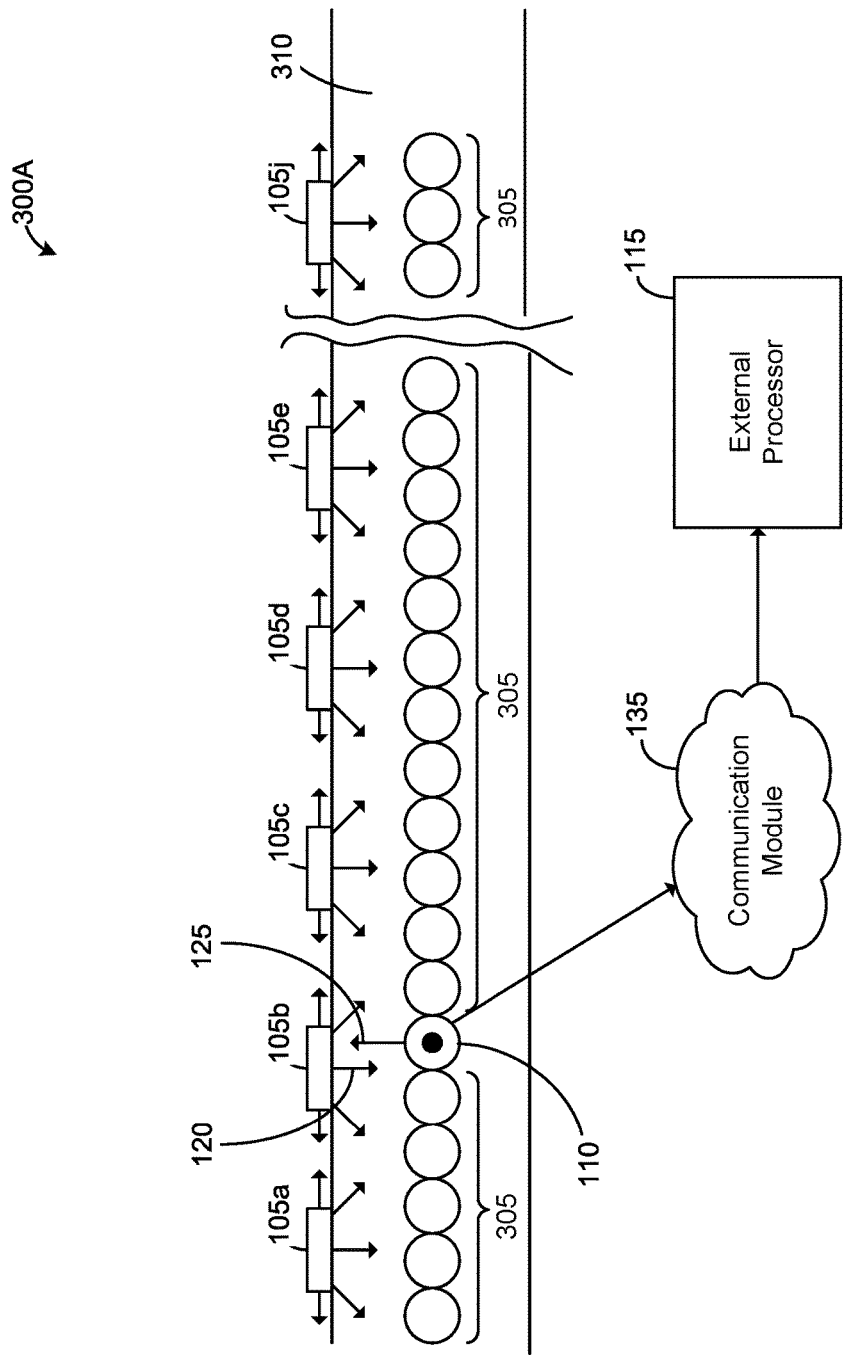

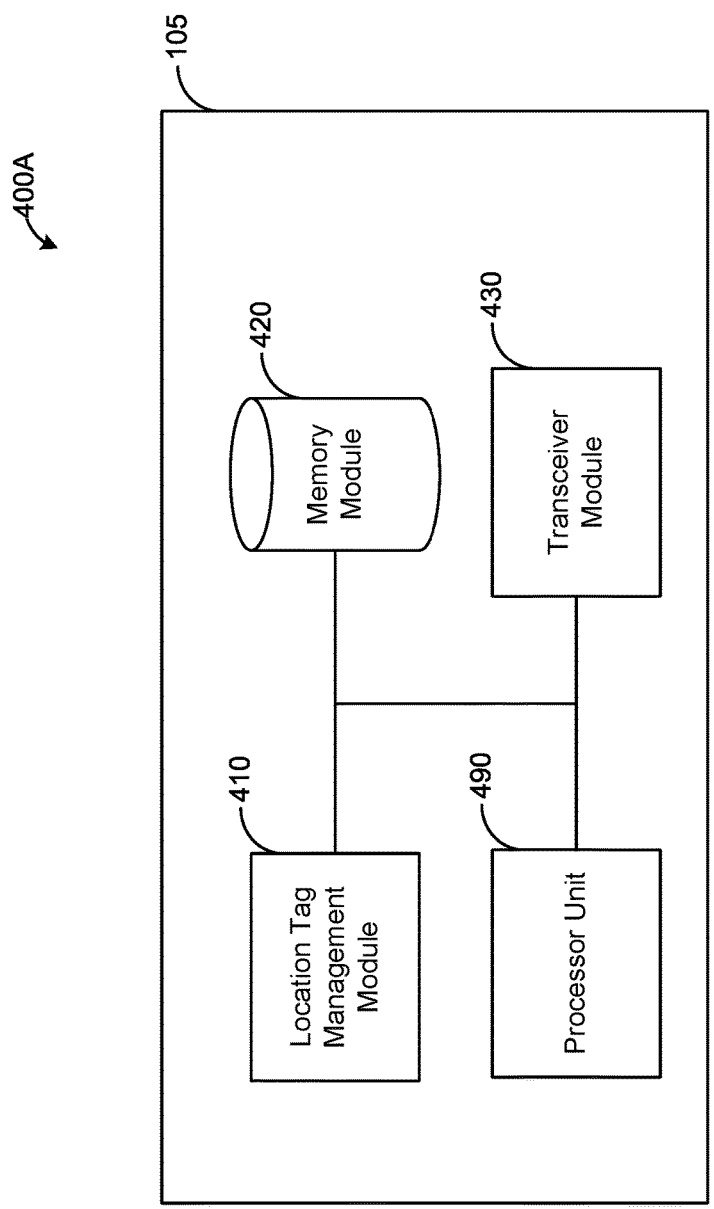

| Signal Strength Range | Actual Distance from Location Tag |
|---|---|
| -70dBm to -66dBm | 3 |
| -65dBm to -61dBm | 2 |
| -60dBm to -56dBm | 1 |

METHODS AND SYSTEMS FOR POSITION TRACKING

CROSS-REFERENCE TO RELATED APPLICATIONS

This application claims priority to U.S. Patent Application No. 62/088,312, filed Dec. 5, 2014, the entire contents of which are hereby incorporated by reference.

FIELD

The described embodiments generally relate to methods and systems of position tracking, and in particular, to methods and systems for tracking the position of a mobile receiver on a production line.

BACKGROUND

A production line generally involves conveying articles (such as, cans, boxes, bottles, etc.) to several sub-stations of the production line. During the conveying process, the articles may experience varying pressure forces from production line apparatus and from adjacent articles. Further, the articles may experience varying motions and orientations. Production line costs and efficiency are likely to be impacted by whether the articles are effectively and efficiently handled on the production line.

SUMMARY

In one aspect, in at least one embodiment described herein, there is provided a method for tracking the position of a mobile receiver on a production line, the production line having a movable conveyor belt and a plurality of location tags positioned at fixed locations along the length of the conveyor belt, and wherein the mobile receiver, when placed on a moving conveyor belt, is moving with respect to the plurality of location tags such that the distance between the mobile receiver and the plurality of location tags is continuously changing, and wherein the mobile receiver is configured to observe and communicate with one or more location tags within a range of the mobile receiver.

The method generally comprises receiving at least one information signal from at least one location tag; determining a signal strength of the at least one information signal; and determining the position of the mobile receiver based on the signal strength of the at least one information signal.

In some embodiments, determining the position of the mobile receiver comprises determining whether the signal strength of the at least one information signal is a local maximum; and generating an event entry if the signal strength of the at least one information signal is determined to be a local maximum, wherein the event entry indicates that the mobile receiver has reached a minimum distance with respect to the at least one location tag transmitting the at least one information signal having the signal strength determined to be a local maximum.

In some embodiments, determining whether the signal strength of the at least one information signal is a local maximum comprises determining whether the signal strength of the at least one information signal is a local maximum at the mobile receiver; and generating the event entry comprises generating the event entry at the mobile receiver.

In some embodiments, the method of tracking a position of a mobile receiver on a production line further comprises transmitting a data signal from the mobile receiver to an external processor, wherein the data signal comprises at least one of the signal strength of the at least one information signal and a location tag identifier corresponding to the at least one location tag transmitting the at least one information signal, and wherein the external processor is communicably linked to the mobile receiver; and wherein determining whether the signal strength of the at least one information signal is a local maximum comprises determining whether the signal strength of the at least one information signal is a local maximum at the external processor; and generating the event entry comprises generating the event entry at the external processor.

In some embodiments, the method of tracking a position of a mobile receiver on a production line further comprises transmitting a data signal from the mobile receiver to an external processor, wherein the data signal comprises at least one of the signal strength of the at least one information signal and a location tag identifier corresponding to the at least one location tag transmitting the at least one information signal; and wherein determining the position of the mobile receiver based on the signal strength of the at least one information signal comprises determining the position of the mobile receiver at the external processor.

In some embodiments, determining the signal strength of the at least one information signal comprises determining the signal strength at the location tag transmitting the at least one information signal.

In some embodiments, determining the signal strength of the at least one information signal comprises determining the signal strength at the mobile receiver.

In some embodiments, determining the signal strength of the at least one information signal comprises collaboratively determining the signal strength of the at least one information signal at both the at least one location tag transmitting the at least one information signal and the mobile receiver.

In some embodiments, a plurality of information signals are received from each location tag, and determining whether the signal strength of the at least one information signal is a local maximum comprises comparing signal strengths corresponding to one or more information signals to a signal strength of a newly received information signal where the one or more information signals were received before the newly received information signal, and where the one or more information signals and the newly received information signal are received from a same location tag. The method further comprises determining if the signal strength of the newly received information signal is higher than the signal strengths corresponding to the one or more information signals.

In some embodiments, determining whether the signal strength of the at least one information signal is a local maximum comprises comparing the signal strength of a newly received information signal to a pre-determined signal strength threshold value and determining if the signal strength of the newly received information signal exceeds the pre-determined signal strength threshold value. In this embodiment, the signal strength of the newly received information signal is concluded to be a local maximum if the signal strength of the newly received information signal exceeds the pre-determined signal strength threshold value and if the newly received information signal has a higher signal strength than the signal strengths corresponding to the one or more information signals received from the same location tag but before the newly received information signal.

In some embodiments, determining whether the signal strength of the at least one information signal is a local maximum comprises receiving, at the mobile receiver, a plurality of information signals from the at least one location tag, the plurality of information signals being received successively; and comparing signal strengths of the plurality of information signals to each other to identify the information signal having the highest signal strength value.

In some embodiments, the method of tracking a position of a mobile receiver on a production line further comprises transmitting the event entry to an external processor as soon as it is generated, wherein the external processor is communicably linked to the mobile receiver.

In some embodiments, the method of tracking a position of a mobile receiver on a production line further comprises buffering a plurality of event entries at the mobile receiver as buffered event entries; and transmitting the buffered event entries to an external processor, wherein the external processor is communicably linked to the mobile receiver.

In some embodiments, the method of tracking a position of a mobile receiver on a production line further comprises recording sensor data corresponding to orientation of the mobile receiver and pressure exerted on the mobile receiver; recording the sensor data and the event entry in a data stream in a unique sequence corresponding to a sequence in which the sensor data was recorded and the event entry was generated by the mobile receiver; and transmitting the data stream to an external processor, wherein the external processor is communicably linked to the mobile receiver.

In some embodiments, the method of tracking a position of a mobile receiver on a production line further comprises transmitting one or more information signals from the at least one location tag, wherein the at least one location tag is configurable to change the frequency of transmission of the one or more information signals.

In some embodiments, the at least one location tag is configurable to change the frequency of transmission of the one or more information signals based on an activation signal received from the mobile receiver, wherein prior to receiving the activation signal from the mobile receiver, the at least one location tag is configured to transmit the one or more information signals at a pre-activated frequency, and subsequent to receiving the activation signal from the mobile receiver, the at least one location tag is configured to transmit the one or more information signals at an activated frequency, wherein the activated frequency is higher than the pre-activated frequency.

In some embodiments, the at least one location tag is configurable to transmit the one or more information signals at an activated frequency for a fixed duration of time, wherein when the fixed duration of time is expired, the at least one location tag transmits the one or more information signals at a pre-activated frequency, wherein the activated frequency is higher than the pre-activated frequency.

In some embodiments, the at least one location tag is configurable to change the frequency of transmission of the one or more information signals based on the signal strength of an information signal transmitted immediately prior to the one or more information signals, wherein if the signal strength of the information signal transmitted immediately prior to the one or more information signals is below a certain threshold, the one or more information signals are transmitted at a pre-activated frequency; and if the signal strength of the information signal transmitted immediately prior to the one or more information signals is above the certain threshold, the one or more information signals are transmitted at an activated frequency, wherein the activated frequency is higher than the pre-activated frequency.

In some embodiments, the at least one location tag is configurable to transmit the one or more information signals at an activated frequency upon receiving a start signal from the mobile receiver and wherein the at least one location tag is configurable to transmit the one or more information signals at a pre-activated frequency upon receiving a stop signal from the mobile receiver, wherein the activated frequency is higher than the pre-activated frequency.

In some embodiments, the method of tracking a position of a mobile receiver on a production line further comprises transmitting one or more information signals from the at least one location tag, wherein the at least one location tag is configurable to switch the frequency of transmission of the one or more information signals from an activated frequency to a pre-activated frequency based on the generation of the event entry, wherein the activated frequency is higher than the pre-activated frequency.

In some embodiments, determining the position of the mobile receiver based on the signal strength of the at least one information signal comprises associating a first signal strength corresponding to a first information signal received from a first location tag to a first distance value; associating a second signal strength corresponding to a second information signal received from a second location tag to a second distance value, wherein the first location tag is adjacent to the second location tag, and wherein the distance between the first location tag and the second location tag are known; and determining a position of the mobile receiver between the first location tag and the second location tag based on the first distance value, the second distance value and the distance between the first location tag and the second location tag.

In another aspect, in at least one embodiment described herein, there is provided a system for tracking the position of a mobile receiver on a production line, the production line having a moving conveyor belt. The system comprises at least one location tag positioned at an at least one fixed location along the length of the conveyor belt; and a mobile receiver, wherein the mobile receiver, when placed on a moving conveyor belt, is moving with respect to the at least one location tag such that the distance between the mobile receiver and the at least one location tag is continuously changing, and wherein the mobile receiver is configured to observe and communicate with one or more location tags within a range of the mobile receiver. The mobile receiver comprises a processor unit and the processor unit is configured to receive at least one information signal from at least one location tag; determine a signal strength of the at least one information signal; and determine the position of the mobile receiver based on the signal strength of the at least one information signal.

In another embodiment, the mobile receiver is configured to perform the methods as defined above or other methods in accordance with the teachings herein.

In another aspect, in at least one embodiment described herein, there is provided a system for tracking the position of a mobile receiver on a production line, the production line having a moving conveyor belt. The system comprises at least one location tag, the at least one location tag positioned at an at least one fixed location along the length of the conveyor belt; a mobile receiver, wherein the mobile receiver, when placed on a moving conveyor belt, is moving with respect to the at least one location tag such that the distance between the mobile receiver and the at least one location tag is continuously changing, and wherein the mobile receiver is configured to observe and communicate with one or more location tags within a range of the mobile receiver. The mobile receiver comprises a processor unit, the processor unit is configured to receive at least one information signal from at least one location tag and determine a signal strength of the at least one information signal; and an external processor communicably linked to the mobile receiver, wherein the external processor is configured to determine the position of the mobile receiver based on the signal strength of the at least one information signal.

In another embodiment, the processor unit is configured to perform the methods as defined above or other methods in accordance with the teachings herein.

In another aspect, in at least one embodiment described herein, there is provided a computer-readable medium storing computer-executable instructions, the instructions for causing a processor to perform a method of tracking the position of a mobile receiver on a production line. The production line has a moveable conveyor belt and a plurality of location tags positioned at fixed locations along the length of the conveyor belt. The mobile receiver, when placed on a moving conveyor belt, is moving with respect to the plurality of location tags such that the distance between the mobile receiver and the plurality of location tags is continuously changing. The mobile receiver is configured to observe and communicate with one or more location tags within a range of the mobile receiver. The method comprises receiving at least one information signal from at least one location tag; determining a signal strength of the at least one information signal; and determining the position of the mobile receiver based on the signal strength of the at least one information signal.

In another embodiment, the instructions cause the processor to perform the methods as described above or other methods in accordance with the teachings herein.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and which will now be briefly described.

FIG. 3A illustrates a production line with a system for tracking the position of a mobile receiver in accordance with an example embodiment;

FIG. 4A is a block diagram of a location tag in a system for tracking the position of a mobile receiver in accordance with an example embodiment;

Figure 1:
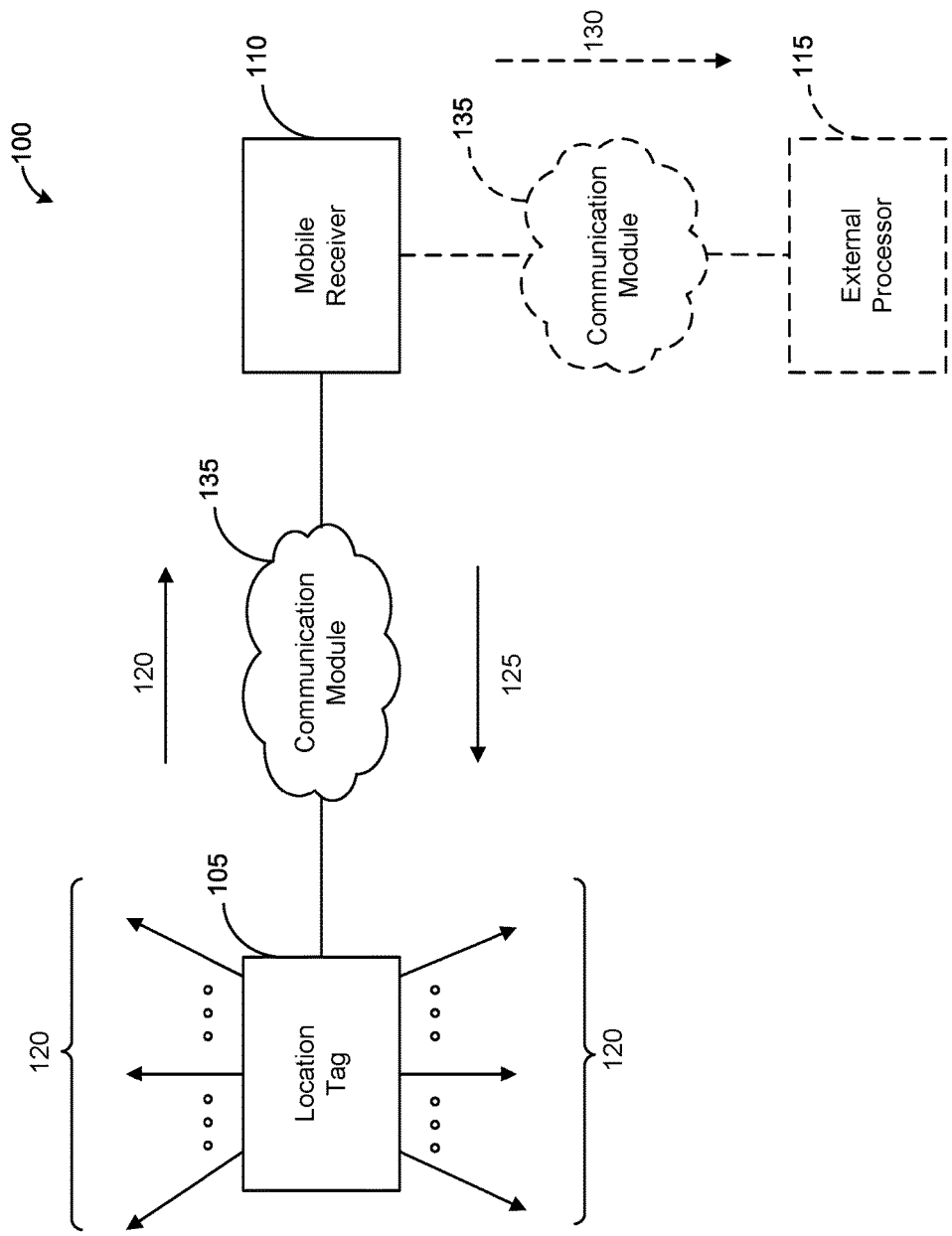
FIG. 1 is a block diagram illustrating components in a system for tracking the position of a mobile receiver on a production line in accordance with an example embodiment.

For simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Various apparatuses or processes will be described below to provide an example of at least one embodiment of the claimed subject matter. No embodiment described below limits any claimed subject matter and any claimed subject matter may cover processes, apparatuses, devices or systems that differ from those described below. The claimed subject matter is not limited to apparatuses, devices, systems or processes having all of the features of any one apparatus, device, system or process described below or to features common to multiple or all of the apparatuses, devices, systems or processes described below. It is possible that an apparatus, device, system or process described below is not an embodiment of any claimed subject matter. Any subject matter that is disclosed in an apparatus, device, system or process described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It should also be noted that the terms "coupled" or "coupling" as used herein can have several different meanings depending in the context in which the term is used. For example, the term coupling can have a mechanical or electrical connotation. For example, as used herein, the terms "coupled" or "coupling" can indicate that two elements or devices can be directly connected to one another or connected to one another through one or more intermediate elements or devices via an electrical element, electrical signal or a mechanical element such as but not limited to, a wire or a cable, for example, depending on the particular context.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

The various embodiments of the devices, systems and methods described herein may be implemented using a combination of hardware and software. These embodiments may be implemented in part using computer programs executing on programmable devices, each programmable device including at least one processor, an operating system, one or more data stores (including volatile memory or non-volatile memory or other data storage elements or a combination thereof), at least one communication interface and any other associated hardware and software that is necessary to implement the functionality of at least one of the embodiments described herein. For example, and without limitation, the computing device may be a server, a network appliance, an embedded device, a computer expansion module, a personal computer, a laptop, a personal data assistant, a cellular telephone, a smart-phone device, a tablet computer, a wireless device or any other computing device capable of being configured to carry out the methods described herein. The particular embodiment depends on the application of the computing device.

In some embodiments, the communication interface may be a network communication interface, a USB connection or another suitable connection as is known by those skilled in the art. In other embodiments, the communication interface may be a software communication interface, such as those for inter-process communication (IPC). In still other embodiments, there may be a combination of communication interfaces implemented as hardware, software, and a combination thereof.

In at least some of the embodiments described herein, program code may be applied to input data to perform at least some of the functions described herein and to generate output information. The output information may be applied to one or more output devices, for display or for further processing.

At least some of the embodiments described herein that use programs may be implemented in a high level procedural or object oriented programming and/or scripting language or both. Accordingly, the program code may be written in C, Java, SQL or any other suitable programming language and may comprise modules or classes, as is known to those skilled in object oriented programming. However, other programs may be implemented in assembly, machine language or firmware as needed. In either case, the language may be a compiled or interpreted language.

The computer programs may be stored on a storage media (e.g. a computer readable medium such as, but not limited to, ROM, magnetic disk, optical disc) or a device that is readable by a general or special purpose computing device. The program code, when read by the computing device, configures the computing device to operate in a new, specific and predefined manner in order to perform at least one of the methods described herein.

Furthermore, some of the programs associated with the system, processes and methods of the embodiments described herein are capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. In alternative embodiments the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The various embodiments disclosed herein generally relate to systems and methods of tracking positions of a mobile receiver on a production line. A production line may include sets of sequential operations related to various processes, such as manufacturing process, packaging process, assembly process, etc. A production line typically comprises a conveying mechanism designed to receive one or more items or articles, and to convey or transport them forward along the production line. The conveying mechanism may include a conveyor belt, a robotic arm, a starwheel device etc.

Articles transported by a conveying mechanism in a production line may be subject to forces resulting from pressure exerted by other articles on the conveying mechanism, pressure exerted by components of the conveying mechanism or the production line, effects of movement of the articles on the conveying mechanism etc. Such forces may result in breakage, scuffing, abrasion etc. in the articles.

In at least one embodiment disclosed herein, the mobile receiver is transported by a conveying mechanism and is configured to measure pressure and orientation data. The measured pressure and orientation data is associated with unique regions along the conveying mechanism based on the tracked positions of the mobile receiver.

An advantage of associating pressure and orientation data to unique regions along the conveying mechanism may include ease of identification of regions along the conveying mechanism that are problematic. Potentially problematic regions along a production line may include regions where articles experience greater than tolerable external forces that may lead to damaged articles. Knowledge of potentially problematic regions may enable a production line operator to proactively remedy problems caused by conveying mechanisms even before articles are placed on the conveying mechanism. This may contribute to increased lifetime of the articles used or placed on the production line, reduced wastage, reduced downtime, and/or improved efficiency.

In the various embodiments disclosed herein, the mobile receiver is designed to be the same dimension as an article of interest on the production line. The mobile receiver may be the same size, shape and/or weight as the articles subject to the production line. For example, if the article subject to the production line is a can, the mobile receiver may be shaped and sized like a can. The mobile receiver may also be configured to have the same weight as a can subject to the production line. Similarly, if the article of interest is a box, a container, a bottle, a sports equipment (e.g. a hockey sticks, golf clubs, rackets, bats etc.) or any other product, the mobile receiver may be similarly shaped and sized, and in some cases, also similarly weighted, to match the article of interest.

Figure 4B:
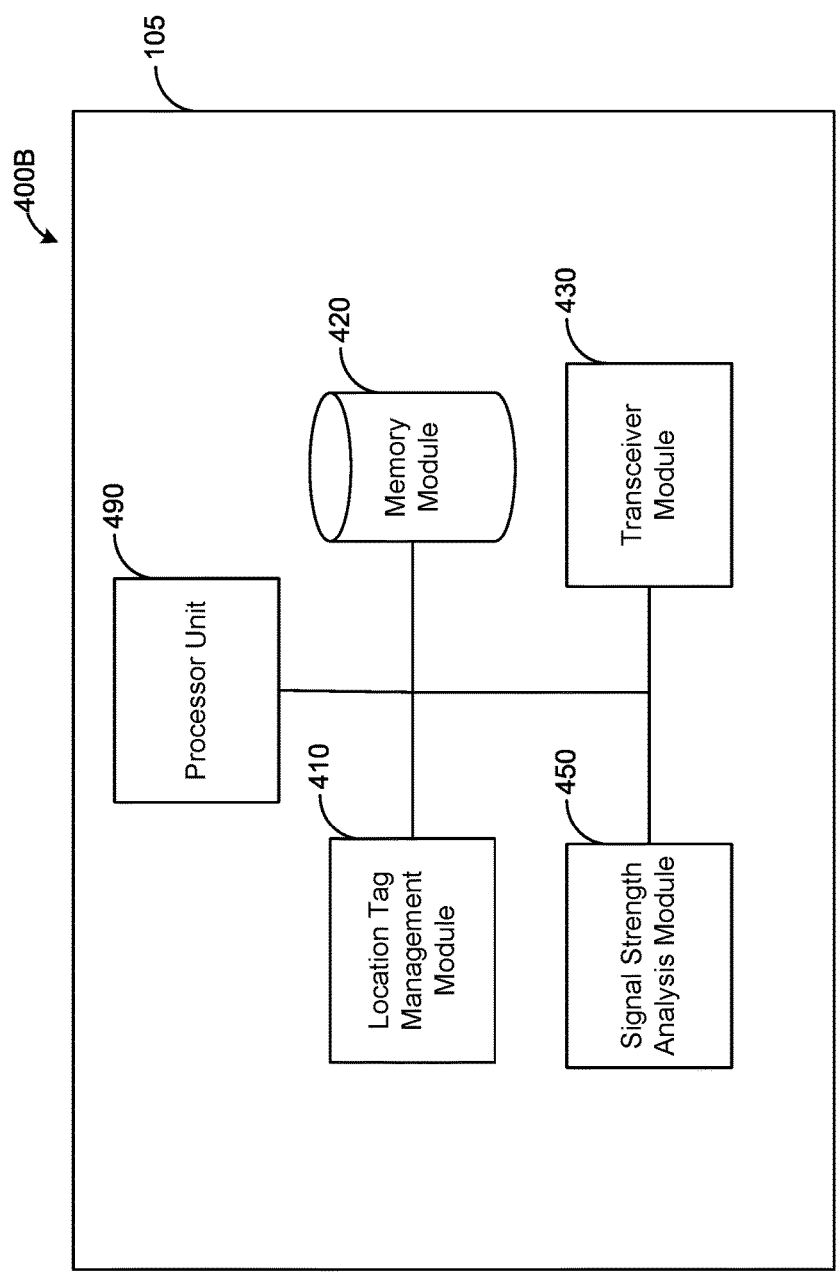
FIG. 4B is a block diagram of a location tag in a system for tracking the position of a mobile receiver in accordance with another example embodiment.
Figure 4C:
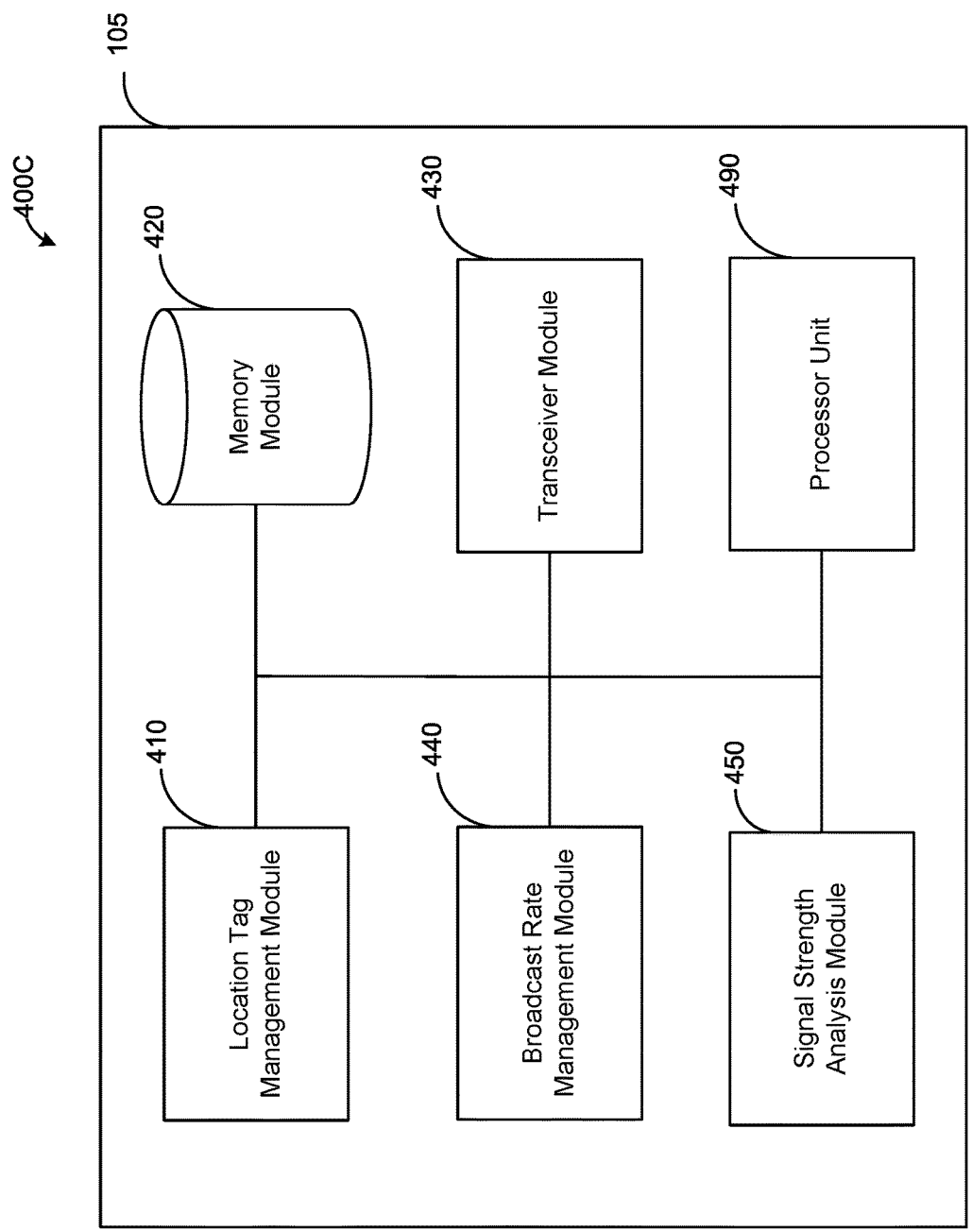
FIG. 4C is a block diagram of a location tag in a system for tracking the position of a mobile receiver in accordance with another example embodiment.
Figure 5A:
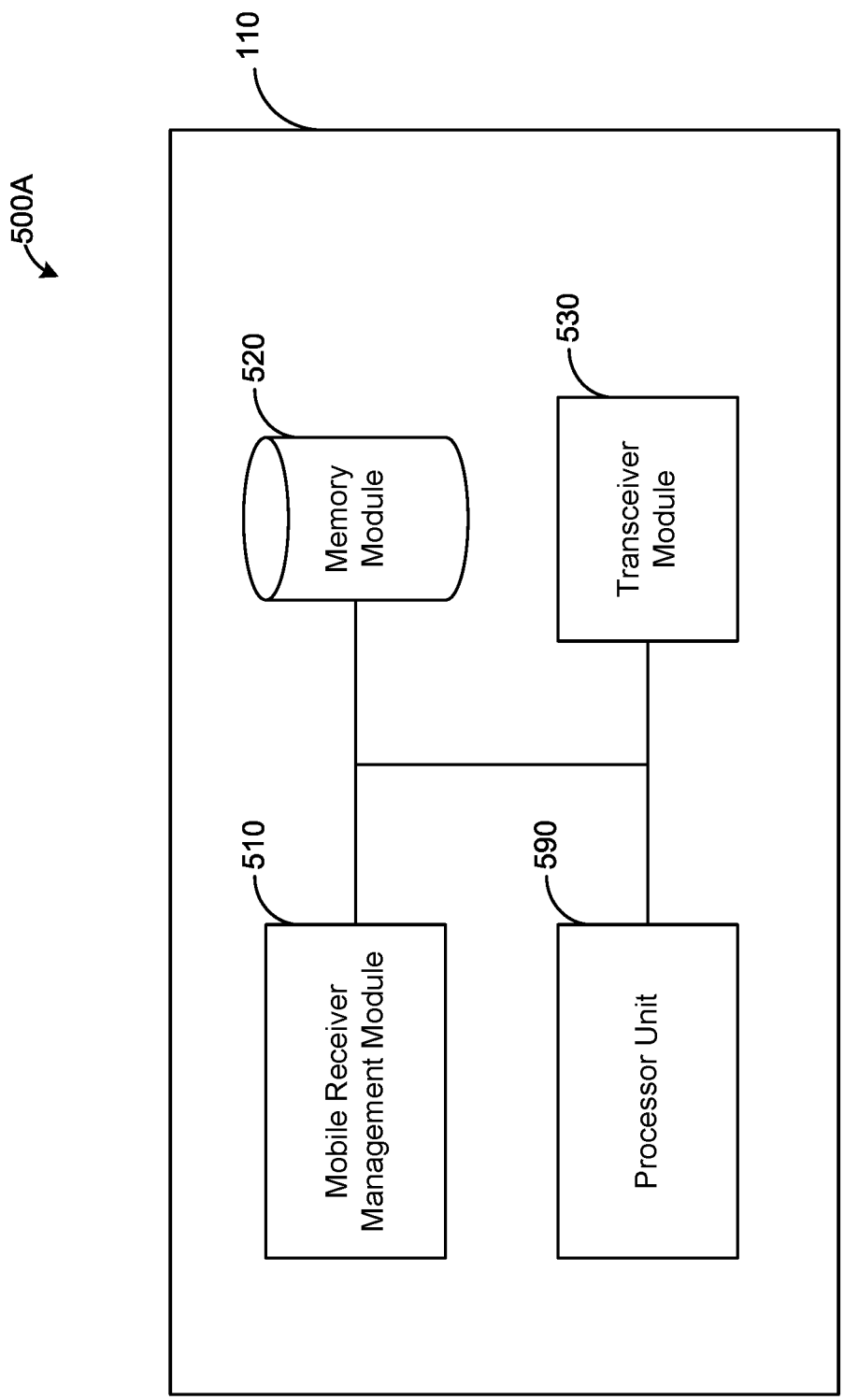
FIG. 5A is a block diagram of mobile receiver in a system for tracking the position of a mobile receiver in accordance with an example embodiment.
Figure 5B:
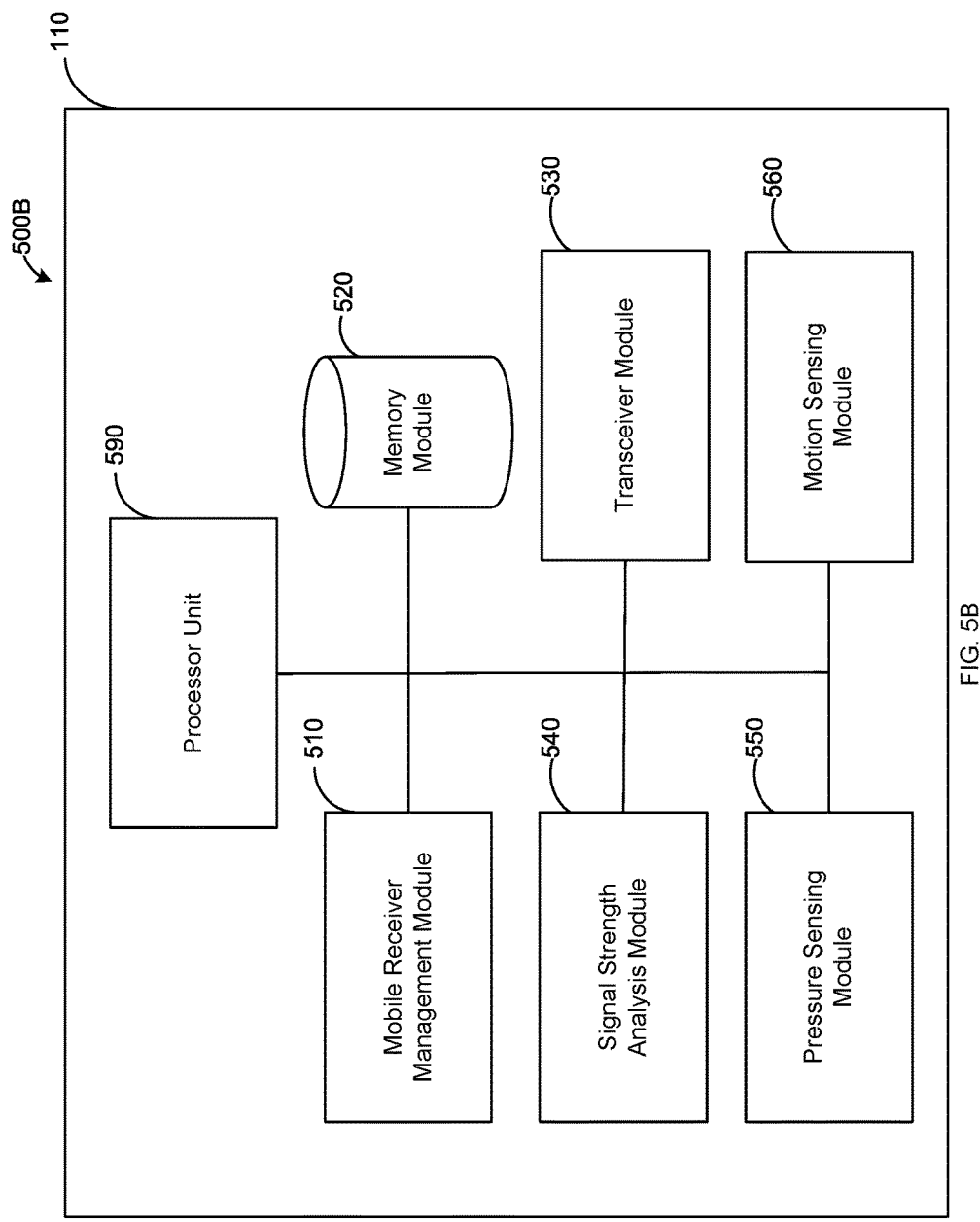
FIG. 5B is a block diagram of mobile receiver in a system for tracking the position of a mobile receiver in accordance with another example embodiment.
Figure 5C:
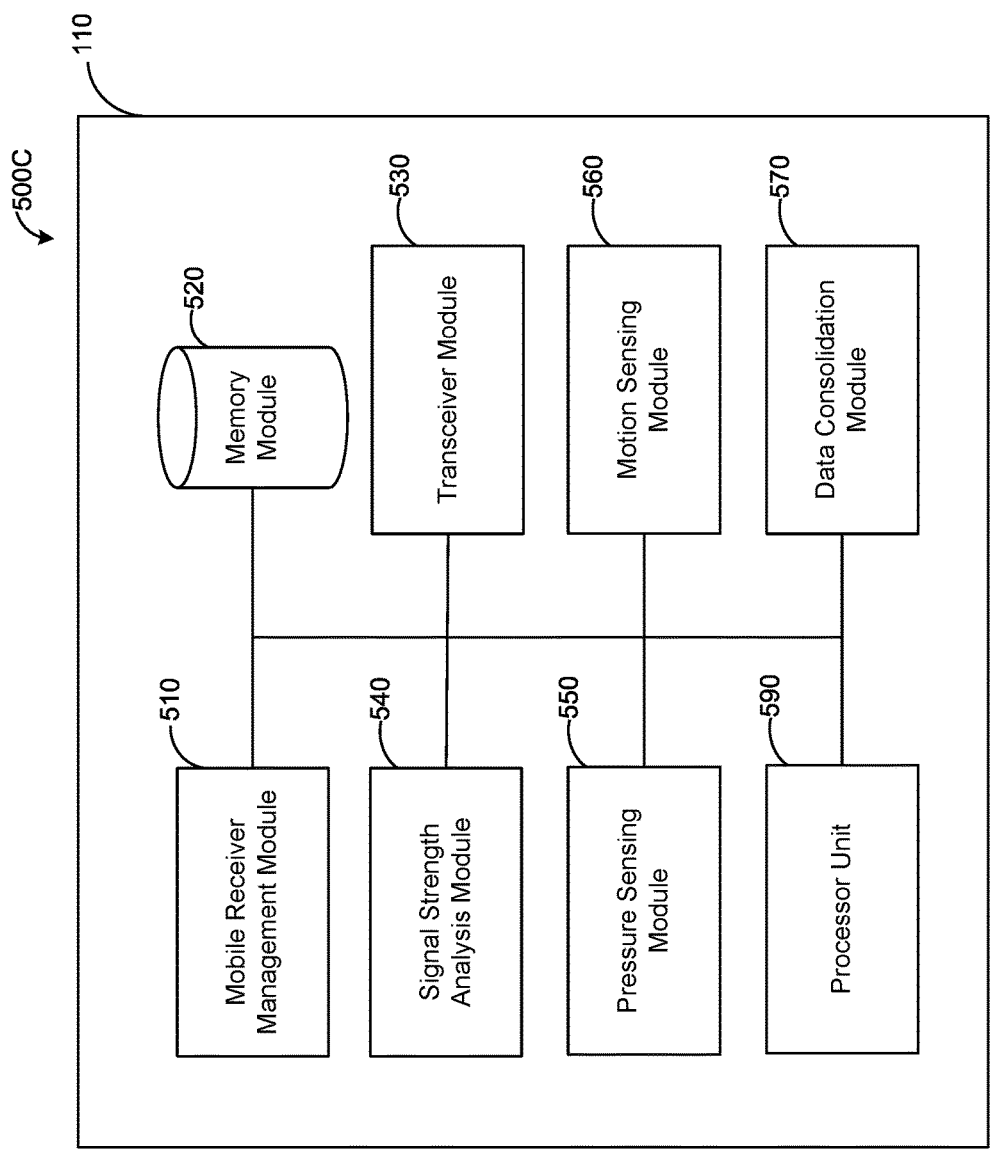
FIG. 5C is a block diagram of mobile receiver in a system for tracking the position of a mobile receiver in accordance with another example embodiment.
Figure 6:
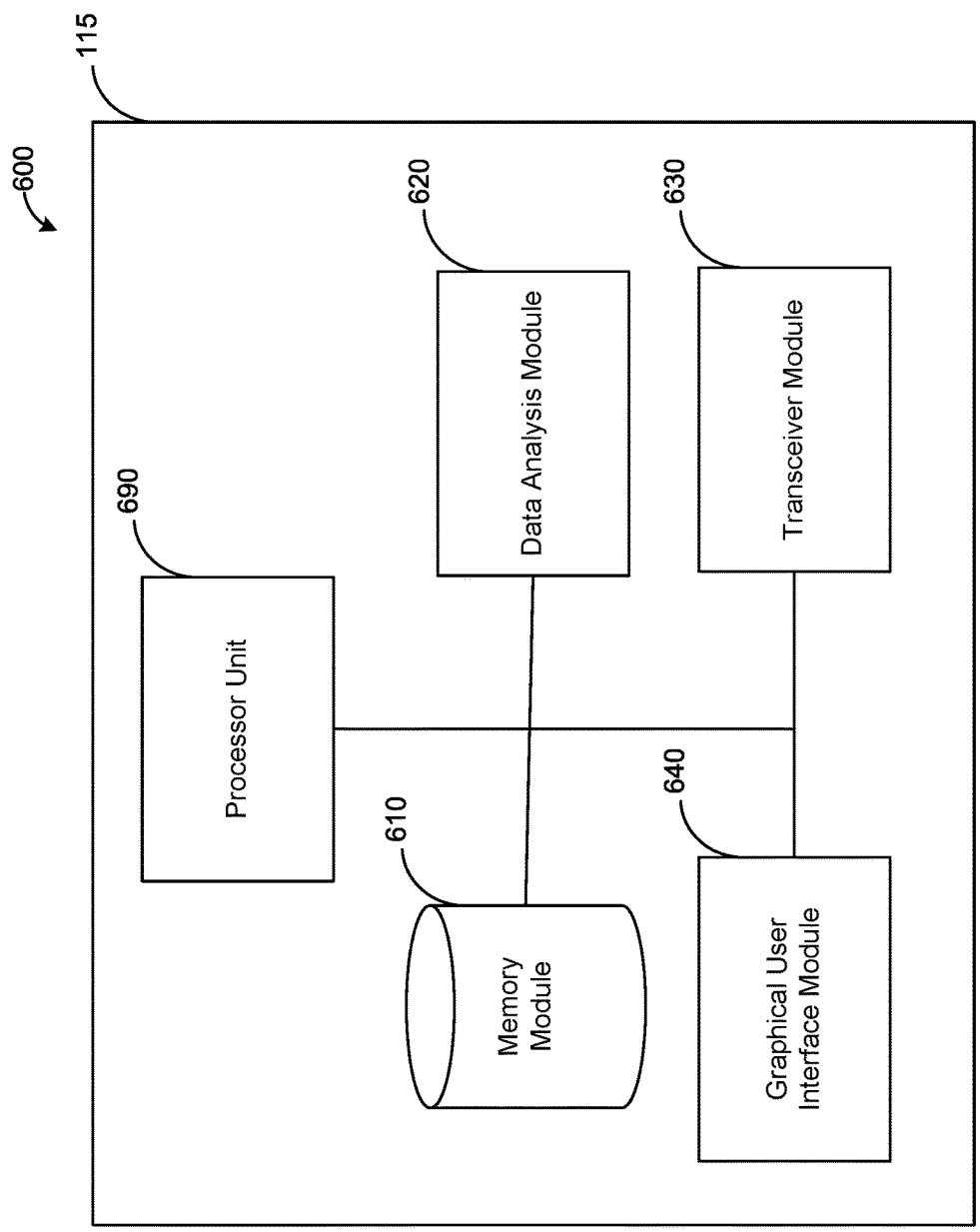
FIG. 6 is a block diagram of an external processor in a system for tracking the position of a mobile receiver in accordance with an example embodiment.

Reference is first made to FIG. 1, which is a block diagram illustrating components in a system 100 for tracking the position of a mobile receiver on a production line in accordance with an example embodiment. System 100 comprises a location tag 105, a mobile receiver 110, an external processor 115, and a communication module 135. To illustrate the components, simultaneous reference will be made to FIGS. 4A-4C, 5A-5C and 6. FIGS. 4A, 4B and 4C are block diagrams of a location tag 105 according to various embodiments. FIGS. 5A, 5B, and 5C are block diagrams of a mobile receiver 110 according to various embodiments. FIG. 6 is a block diagram of an external processor 115 according to an example embodiment.

As illustrated in FIG. 1, the mobile receiver 110 communicates with the location tag 105 via a communication module 135. The mobile receiver 110 also communicates with an external processor 115 via a communication module 135. It will be understood that although one communication module 135 is shown to facilitate communication between a mobile receiver 110 and a location tag 105 and a separate communication module 135 is shown to facilitate communication between the mobile receiver 110 and an external processor 115, a single communication module 135 may be used to facilitate communication of both the mobile receiver 110 with the location tag 105 and the mobile receiver 110 with an external processor 115. The communication modules 135 are separated in FIG. 1 to indicate that in this example embodiment, the location tag 105 cannot communicate directly with the external processor 115.

Further, it will be understood that although only one location tag 105 is illustrated in FIG. 1, any number of location tags 105 may be used in system 100 of tracking the position of a mobile receiver on a production line.

Location tags 105 are low power wireless devices configured to transmit and receive signals using any type of wireless communication protocol. Examples of wireless communication protocols may include Bluetooth® 4.0 Low Energy, passive or active RFID, infrared light emission and detection, WiFi, radio frequency communication, or any other wireless transmission method. In some cases, location tags 105 may be battery powered. In some other cases, the location tags 105 may harvest energy from the surroundings or environmental sources, including from solar energy, magnetic energy, or thermal energy.

As will be discussed in greater detail in relation to FIGS. 3A and 3B, one or more location tags 105 can be placed throughout the production line at known locations. The location tags 105 may be placed at various locations, such as on rails or other structures or along a conveying mechanism, such as a conveyor belt. The location tags 105 may be located at the entrance or exit of equipment of interest, and/or other specific areas of interest, along the conveying mechanism, or otherwise in the production line.

In some cases, the location tags 105 may be placed in close proximity to other adjacent location tags and continuously placed along the length of the conveying mechanism to achieve higher resolution and more accurate results from the methods described herein. The resolution and accuracy may also be increased by placing the location tags in close proximity to each other.

As illustrated in FIG. 1, location tag 105 is configured to transmit one or more information signals 120 in a plurality of directions. In some cases, the location tag 105 may transmit information signals with an omnidirectional antenna. In some other cases, the location tag 105 may transmit information signals 120 with one or more unidirectional antennas. The information signals 120 may be transmitted at any frequency. The frequency may be fixed or variable.

Information signals 120 may include a unique identifier for the location tag 105. The unique identifier is specific to the location tag 105 and identifies the location tag 105 from which the information signal 120 originates. The unique identifier may be in the form of a MAC address, a location tag serial number, a location tag name, or any other identifier that uniquely identifies the location tag from which the information signal 120 originates.

Information signals 120 may also include battery or power level information specific to the location tag 105. The battery or power level information may be transmitted to a mobile receiver 110 to provide an indication that a location tag 105 may require some service, such as, for example, battery recharge, battery replacement, other services for non-battery source of power etc. It will be understood that information signals 120 may additionally contain other information related to the location tag 105 in accordance with the methods described herein.

Mobile receiver 110 may be a wireless device configured to observe one or more location tags 105 within the range of the mobile receiver 110. The mobile receiver 110 may be configured to receive information signals 120 from the location tag 105 via the communication module 135. The mobile receiver 110 may also be configured to simultaneously receive information signals 120 from more than one location tags 105.

In some embodiments, the mobile receiver 110 may be configured to transmit an activation signal 125 to the location tag 105 via the communication module 135. The mobile receiver 110 may transmit the activation signal 125 to a location tag 105 only upon receipt of an information signal from that location tag 105. The activation signal 125 may cause the transmission frequency of the information signal 120 to switch from a low frequency to a high frequency. Further embodiments relating to altering transmission frequency of information signals 120 will be discussed in detail below.

As the mobile receiver 110 may simultaneously receive information signals 120 from one or more location tags 105, the mobile receiver 110 may simultaneously transmit activation signals 125 to the one or more location tags 105 upon receipt of the information signal 120 from these one or more location tags 105.

When a location tag 105 sends an information signal 120 with a unique identifier, a mobile receiver 110 or external processor 115 may determine from which location tag 105 a received information signal 120 originated. In various embodiments, a location tag 105 may also transmit information signals 120 with transmission signal strength or transmission signal power information.

The mobile receiver 110 may be further configured to transmit information 130 to the external processor 115 via the communication module 135. The mobile receiver 110 may transmit information 130 to the external processor 115 in various forms. In some embodiments, the mobile receiver 110 may receive an information signal 120, determine the signal strength of the received information signal 120, and immediately transmit the information signal 120 and corresponding signal strength to the external processor 115. As will be described below, an information signal 120 and the corresponding signal strength of the information signal 120 may collectively be termed a data signal.

In other embodiments, the mobile receiver 110 may receive an information signal 120, determine the signal strength of the received information signal 120, and buffer the information signal 120 and corresponding signal strength for transmission to an external processor 115 at a later time.

In various embodiments, the mobile receiver 110 may receive an information signal 120, may determine the signal strength of the received information signal 120, may process the signals and information in accordance with the various methods described herein, and further may transmit information 130 to an external processor 115. In some examples, the information 130 may include location tag 105 identifier, the signal strength of an information signal 120, and an additional indicator or flag associated with the location tag identifier and signal strength of an information signal 120. The additional indicator or flag having significance will be described in detail below. Further, as will be described below, an information signal 120, the signal strength of the information signal 120, and the additional indicator or flag associated with the information signal 120 may collectively be termed an event entry.

The communications module 135 may be any wireless network capable of carrying data, including the Internet, satellite, mobile, Wi-Fi, WiMAX, Bluetooth® communications network, passive or active RFID network, infrared light detection and emission communication network, local area network, wide area network, and others, including any combination of these, capable of interfacing with, and enabling communication between the mobile receiver 110 and location tags 105 and between the mobile receiver 110 and external processors 115.

Reference is next made to FIGS. 4A, 4B, and 4C, which are block diagrams of location tags 105 in a system for tracking the position of a mobile receiver in accordance with example embodiments.

As illustrated in FIG. 4A, location tags 105 may include one or more components, such as a location tag management module 410, a memory module 420, a transceiver module 430, and a processor unit 490. The location tag management module 410 may be a processing module configured to manage the operation of the location tag 105 in accordance with the teachings herein. In various embodiments, the location tag management module 410 may be configured to monitor one or more of voltage, current, temperature, battery health, current battery charge, or other information related to the source of power associated with the location tag 105.

The memory module 420 may include one or more storage and/or database components for storing the various data and/or operational processes. For example, the memory module 420 may be configured to store a unique location tag identifier. Unique location tag identifiers, as discussed above, may be a location tag 105 MAC address. In some embodiments, the unique location tag identifier may be associated with a pre-assigned meaningful name. For example, a unique location tag identifier in the form of a MAC address may be associated with the name "bottle filling station start" to indicate that a location tag 105 has been placed at the beginning of the bottle filling station of a beverage bottling production line.

The memory module 420 may be further configured to store battery level information. In some embodiments, the location tag 105 may transmit battery level information with information signals 120. The location tag 105 may be configured to signal a low battery power state and prompt for battery maintenance or replacement.

In cases where the location tag 105 utilizes a non-battery source of power, the memory module 420 may be configured to store charge level associated with the other source of power. In such cases, the location tag 105 may be configured to transmit charge information with information signals 120. An indication of a low charge level may prompt a production line operator to maintain or replace the power source.

Transceiver module 430 may be a processing module configured to facilitate transmission of information signals 120 to the mobile receiver 110. The transceiver module 430 may also be configured for receiving activation signals 125 from the mobile receiver 110. In various embodiments, the transceiver module 430 is configured to facilitate communication using wireless communication protocols, such as Bluetooth communication protocol, RFID communication protocol etc.

The processor unit 490 controls the operation of the location tag 105. The processor unit 490 may be any suitable processor, controller or digital signal processor that can provide sufficient processing power for the configuration, purpose, and requirements of the location tag 105 as is known by persons skilled in the art. For example, processor unit 490 may be a high performance general processor. In alternative embodiments, the processor unit 490 can include more than one processor with each processor configured to perform different dedicated tasks. In other embodiments, it may be possible to use specialized hardware to provide some of the functions provided by the location tag 105.

Reference is next made to FIG. 4B, which illustrates a block diagram of a location tag 105 in accordance with another example embodiment. Block diagram 400B comprises a tag management module 410, a memory module 420, a transceiver module 430, a signal strength analysis module 450, and a processor unit 490. The location tag management module 410, memory module 420, transceiver module 430, and processor unit 490 of FIG. 4B may correspond substantially with location tag management module 410, memory module 420, transceiver module 430, and processor unit 490 as described in FIG. 4A.

The signal strength analysis module 450 may be a processing module configured to determine the signal strength of the information signals 120. Determination of the signal strength of received information signals 120 will be discussed in greater detail below.

Reference is next made to FIG. 4C, which illustrates a block diagram of a location tag 105 in accordance with another example embodiment. Block diagram 400C comprises a tag management module 410, a memory module 420, a transceiver module 430, a broadcast rate management module 440, a signal strength analysis module 450, and a processor unit 490. The location tag management module 410, memory module 420, transceiver module 430, signal strength analysis module 450, and processor unit 490 of FIG. 4C may correspond substantially with those described in FIG. 4B.

The broadcast rate management module 440 may be a processing module configured to alter the frequency or the rate of transmission of the information signal 120 between two or more modes. In some cases, the broadcast rate management module 440 is configured to transition the transmission frequency of information signals 120 from a pre-activated mode to an activated mode, or vice versa. A location tag 105 operating in a pre-activated mode may transmit information signals 120 at a pre-activated frequency. A location tag 105 operating in an activated mode may transmit information signals 120 at an activated frequency, which is higher than the pre-activated frequency.

In some other cases, the broadcast rate management module 440 is configured to transition the rate of transmission of the information signals 120 between more than two modes, for example, a first mode, a second mode and a third mode, where the transmission frequency of the information signals 120 in the first mode is the lowest of the three modes, and the transmission frequency of the information signals 120 in the third mode is the highest of the three modes. The transmission frequency of the information signals 120 in the second mode is between the lowest and the highest transmission frequencies.

The location tag 105 may be operated in a pre-activated or a lower frequency mode to save or optimize power. Further, as will be described below in greater detail, the location tag 105 may transmit information signals 120 in different modes, and switch between the different modes, based on various triggers.

In FIG. 4C, the memory module 420 may also store operational processes governing information signal 120 transmission frequency. The location tag 105 may transmit information signals 120 at a relatively lower frequency, such as 1 Hz, or at a relatively higher frequency, such as 50 Hz, or at an intermediary frequency, such as 25 Hz.

Further, in any of the embodiments described with reference to FIGS. 4A to 4C, a location tag 105 may have a power switch and a power light that may blink periodically. Actuation of a power switch may activate the location tag 105 such that it begins the transmission of information signals 120. The power light, when blinking periodically, may indicate that the location tag 105 is in an "on" position.

In some embodiments, a location tag 105 transmitting information signals 120 at an activated or high transmission frequency may transmit information signals 120 with less information than if the location tag 105 was transmitting information signals 120 at a pre-activated or low transmission frequency. For example, information signals 120 transmitted at an activated or high transmission frequency may only contain location tag identifier information. In contrast, information signals 120 transmitted at a pre-activated or low transmission frequency may contain location tag identifier information as well as power level (for example, battery level) information.

The location tag management module 410, the memory module 420, the transceiver module 430, the broadcast rate management module 440, and the signal strength analysis module 450 may be implemented in software or hardware, or a combination of software and hardware.

Reference is next made to FIGS. 5A, 5B, and 5C, which are block diagrams of mobile receiver 110 in a system for tracking the position of the mobile receivers 110 in accordance with various example embodiments.

As illustrated in FIG. 5A, mobile receiver 110 may include one or more components, such as a mobile receiver management module 510, a memory module 520, a transceiver module 530, and a processor unit 590. The mobile receiver management module 510 may be a processing module configured to manage the operation of the mobile receiver 110 in accordance with the teachings herein. In some cases, the mobile receiver management module 510 may be configured to monitor one or more of voltage, current, temperature, battery health, current battery charge, or other information related to the source of power associated with the mobile receiver 110.

The memory module 520 may include one or more storage and/or database components for storing the various data and/or operational processes. In various embodiments, the memory module 520 is configured as a database for storing data about each location tag 105 on a production line. For example, for each location tag 105 on the production line, the memory module 520 may store received information signals 120, where successively received information signals 120 may include unique location tag identifiers. In some cases, the information signals 120 may also include power level indication, which may also be stored in the memory module 520.

The transceiver module 530 may be a processing module configured to facilitate transmission and reception of signals. The transceiver module 530 may facilitate communication between the mobile receiver 110 and the location tag 105 via the communication module 135. The transceiver module 530 may also facilitate communication between the mobile receiver 110 and the external processor 115. In various cases, the transceiver module 530 may be configured to facilitate transmission and reception of data using communication protocols.

The processor unit 590 controls the operation of the mobile receiver 110. The processor unit 590 may be any suitable processor, controller or digital signal processor that can provide sufficient processing power for the configuration, purpose, and requirements of the mobile receiver 110 as is known by persons skilled in the art. For example, processor unit 590 may be a high performance general processor. In alternative embodiments, the processor unit 590 may include more than one processor with each processor configured to perform different dedicated tasks. In other embodiments, it may be possible to use specialized hardware to provide some of the functions provided by the mobile receiver 110.

FIG. 5B is a block diagram of a mobile receiver 110 in accordance with another example embodiment. The mobile receiver management module 510, the memory module 520, the transceiver module 530, and the processor unit 590 of FIG. 5B may correspond substantially with those described in FIG. 5A. Further, the mobile receiver 110 illustrated in FIG. 5B may also include a signal strength analysis module 540, a pressure sensing module 550, and a motion sensing module 560.

The signal strength analysis module 540 may be a processing module configured to determine the signal strength of received information signals 120. In various embodiments, the signal strength analysis module 540 of the mobile receiver 110 and the signal strength analysis module 450 of the location tag 105 may collaborate to determine the signal strength of the information signals 120. Determination of the signal strength of received information signals 120 will be discussed in greater detail below. In other embodiments, the transceiver module 530 and the signal strength analysis module 540 may be part of the same module. The transceiver module 530 may be configured to send and receive signals with a wireless communication protocol capable of calculating and determining the signal strength of received signals.

The pressure sensing module 550 may be a processing module configured to facilitate acquisition of pressure sensor data related to pressure forces exerted on the mobile receiver 110 on the production line. The pressure sensing module 550 may include a plurality of pressure sensors positioned at several locations on the periphery of the mobile receiver 110. The pressure sensing module 550 may be configured to capture and sequentially store pressure sensor data as it is received.

The motion sensing module 560 may be a processing module configured to facilitate acquisition of motion or orientation sensor data related to the motion of the mobile receiver 110. The motion sensing module 560 may include or may interface with an accelerometer, a gyroscope, and/or a magnetometer. The motion sensing module 560 may be configured to capture and sequentially store motion or orientation sensor data as it is received.

In various embodiments, mobile receiver 110 may be configured to buffer the captured signal strength data, pressure sensor data, and motion or orientation sensor data for storage in memory module 520 or for transmission to the external processor 115.

FIG. 5C is a block diagram of a mobile receiver 110 in accordance with a further example embodiment. The mobile receiver management module 510, the memory module 520, the transceiver module 530, the signal strength analysis module 540, the pressure sensing module 550, the motion sensing module 560, and the processor unit 590 of FIG. 5C may correspond substantially with those described in FIG. 5B. Further, the mobile receiver 110 illustrated in FIG. 5C may include a data consolidation module 570.

The data consolidation module 570 may be a storage and processing module configured to consolidate the plurality of data acquired by various components of the mobile receiver 110. The data consolidation module 570 may be further configured to generate a data stream comprising the consolidated data. In various embodiments, the data consolidation module 570 is configured to consolidate signal strength data, pressure sensor data, and motion or orientation sensor data in a meaningful manner.

In various other embodiments, the data consolidation module 570 is configured to consolidate pressure sensor data and/or motion/orientation sensor data with event entry data. Event entry data is described in further detail below. Event entry data generally refers to a data entry indicating when a mobile receiver 110 was closest to a location tag 105.

In at least one embodiment, the data consolidation module 570 is configured to consolidate the pressure sensor data and the motion or orientation sensor data in the sequence in which the pressure and orientation data is received. In another embodiment, the data consolidation module 570 is configured to organize the pressure sensor data and the motion or orientation sensor data into subsets such that each subset corresponds to a unique region along the conveying mechanism in the production line.

In some embodiments, the data consolidation module 570 is configured to consolidate some other data, i.e. other than sensor data, with event entry data. This may be applicable in the field where the mobile receiver is configured to receive some other data, other than motion or orientation, and pressure data.

The mobile receiver management module 510, the memory module 520, the transceiver module 530, the signal strength analysis module 540, the pressure sensing module 550, the motion sensing module 560, and the data consolidation module 570 may be implemented in software or hardware, or a combination of software and hardware.

Reference is next made to FIG. 6, which is a block diagram of an external processor 115 in a system for tracking the position of a mobile receiver 110 in accordance with an example embodiment.

As illustrated in FIG. 6, the external processor 115 may include one or more components, such as a memory module 610, a data analysis module 620, a transceiver module 630, a graphical user interface module 640, and a processor unit 690.

The memory module 610 may include one or more storage and/or database components for storing the various data and/or operational processes corresponding to the external processor 115. The memory module 610 may store a plurality of sensor data or data streams received from one or more mobile receivers 110. The memory module 610 may also store location tag indication information and/or signal strength analysis data recoded in and received from the mobile receiver 110.

The data analysis module 620 may be a storage and processing module configured to generate correlation data between two or more data streams recorded on a same production line. The correlation data may consist of overlays of two or more data streams and may illustrate trends based on sensor data recorded on a production line at various points in time.

The transceiver module 630 may be a processing module configured to facilitate transmission and reception of signals including real-time data, buffered data or data stream 130 between the external processor 115 and the mobile receiver 110. In various embodiments, the transceiver module 630 may be configured to utilize wireless communication protocols, such as the Bluetooth communication protocol, to facilitate transmission and reception of signals.

The graphical user interface module 640 may be a processing module configured to interface with a user display and configured to provide graphical representation of data.

The processor unit 690 controls the operation of the external processor 115. The processor unit 690 may be any suitable processor, controller or digital signal processor that can provide sufficient processing power for the configuration, purpose, and requirements of the external processor 115 as is known by persons skilled in the art. For example, processor unit 690 may be a high performance general processor. In alternative embodiments, the processor unit 690 may include more than one processor with each processor configured to perform different dedicated tasks. In other embodiments, it may be possible to use specialized hardware to provide some of the functions provided by the external processor 115.

The memory module 610, data analysis module 620, the transceiver module 630, and the graphical user interface module 640 may be implemented in software or hardware, or a combination of software and hardware.

Reference is now made to FIGS. 2A to 2E, which are flowcharts 200A to 200E of example methods of tracking the position of a mobile receiver 110 on a production line. Tracking the position of a mobile receiver 110 on a production line may require analysis of signal strengths of information signals 120. As will be described below, in some embodiments, tracking the position of a mobile receiver 110 on a production line may involve searching for local maximums in a series of recorded signal strengths of information signals 120. In other embodiments, tracking the position of a mobile receiver 110 on a production line may involve comparing recorded signal strengths to known information. To illustrate the example methods, simultaneous references may be made to FIGS. 3A and 3B, which illustrate a production line 300A, 300B using a system for tracking the position of a mobile receiver 110 in accordance with an example embodiment.

Figure 3B:
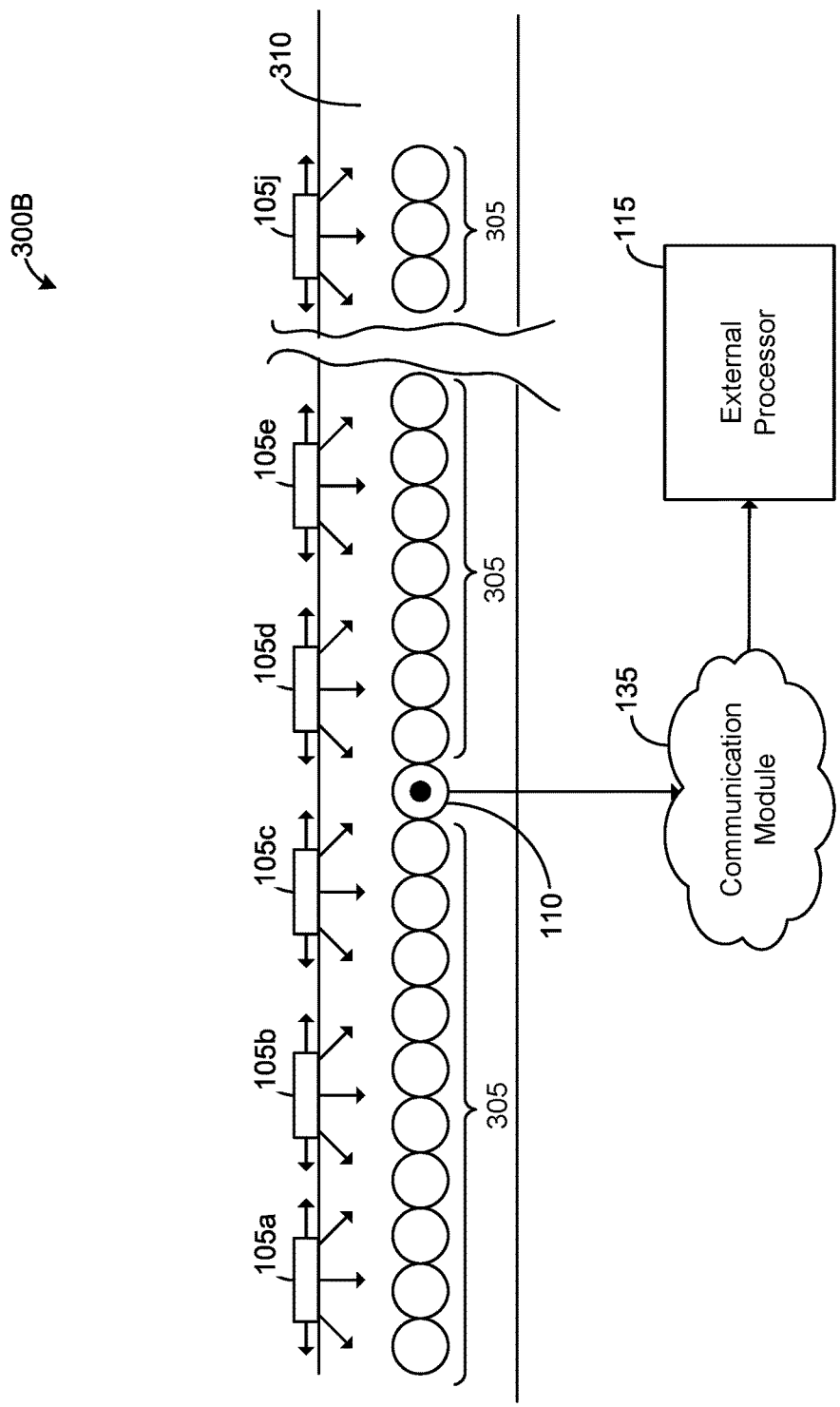
FIG. 3B illustrate a production line with a system for tracking the position of a mobile receiver in accordance with another example embodiment.

In the illustrated embodiment of FIGS. 3A and 3B, the production line 300A, 300B includes a movable conveyor belt 310 for conveying articles 305. In other embodiments, other conveying mechanisms discussed above may be used. Articles 305 may include glass, bottles, metal cans, sports equipment, or other products.

The articles 305 are transported through the production line on the conveyor belt 310. It will be understood that although the production line 300A, 300B is shown to have a conveyor belt 310 with a uniform width and a horizontal extending length, the conveyor belt 310 may be of varying width and may consist of curved and winding portions.

In one example, the production line 300A, 300B may be a beverage bottling operation. Articles 305 may be glass bottles. The glass bottles may be of substantially uniform size, shape, and weight. While being conveyed, the articles 305 may experience varying pressure forces, motion, and orientations. Pressure forces may act on the articles 305 as the articles 305 may be thrust against each other during the course of the production line cycle. For example, when accelerated along sloping portions of the conveyor belt 310, the articles 305 may experience increasing pressure from adjacent articles 305. Articles 305 may also be subject to pressure forces from the conveyor belt 310 apparatus or other components of the production line 300A, 300B. Production line operators may be interested in increasing efficiency and reducing production costs by reducing these types of stresses and strains. For example, repeated strains on articles 305 through the production line can lead to damaged articles 305 and reduce product production yield.

As shown in FIGS. 3A and 3B, the production line 300A, 300B may have a plurality of location tags 105 positioned at fixed and known locations along the length of the conveyor belt 310. The location tags 105 may be placed on rails or other structures alongside the conveyor belt 310. The location tags 105 may be placed at entrance or exit points, or other areas of interest, along the length of the conveyor belt 310.

Although FIGS. 3A and 3B illustrate only six location tags 105a, 105b, 105c, 105d, 105e, 105j, it will be understood that a production line 300A, 300B may consist of any number of location tags 105. Continuing with the beverage bottling operation example, location tags 105 may be positioned in the production line at various areas of interest. For example, the location tags 105 may be positioned along the bottle sterilizing portions, beverage filling portions, bottle labeling portions, and other desired portions of the production line.

In some cases, as illustrated in FIGS. 3A and 3B, the location tags 105 may be positioned equidistant from adjacent location tags 105. In other words, the distance between a first location tag 105a and a second location tag 105b may be the same as the distance between the second location tag 105b and a third location tag 105c. In some other cases, the location tags 105 may not be equidistant from each other. For example, the location tags 105 may only be positioned at the beginning and at the end of identifiable regions of the production line. Location tags 105 may be positioned in very close proximity to an adjacent location tag 105 or may be positioned sparsely throughout the production line 300A, 300B. Overall, location tags 105 may be positioned at fixed and known locations of a production line as position markers or guideposts.

The mobile receiver 110 may be positioned adjacent to the articles 305 on the production line. The mobile receiver 110 may have substantially the same physical size, shape, and/or weight as the articles 305. By having substantially the same physical size, shape, and/or weight as the adjacent articles 305, the mobile receiver 110 may experience the same motion, orientation, and pressure forces as the articles 305.

Although only one mobile receiver 110 is illustrated in FIGS. 3A and 3B, any number of mobile receivers 110 may be placed on the movable conveyor belt 310. In some embodiments, two or more mobile receivers 110 may be simultaneously used. For example, at a given point in time, a first mobile receiver 110 may be traversing the bottle filling portion of the production line, and a second mobile receiver 110 may be traversing in the bottle labeling portion of the production line. As the production continues, the first and second mobile receiver 110 may continue along to successive portions of the production line. In other embodiments, the first mobile receiver 110 may be permanently assigned to gather data, for example, in the bottle filling portion of the production line and the second mobile receiver 110 may be permanently assigned to gather data in the bottle labeling portion of the production line.

The external processor 115 may be located in the vicinity of the production line. Alternatively, the external processor 115 may be located at an off-site location. Furthermore, more than one external processor 115 may be utilized for receiving data from the mobile receivers 110 used in the production line.

In some embodiments, the external processor 115 may not be needed in the system for tracking the position of a mobile receiver 110. For example, the mobile receiver 110 may perform the methods described herein and may store all processes and outputs at the mobile receiver 110 itself. In such embodiments, the mobile receiver 110 may be configured to store a full day of runs in memory module 520 until download at a later time for analysis. In some cases, the download may be through a wired connection. In some other cases, the download may be facilitated by an SD card. In some further cases, the download may be via a wireless connection.

Reference is now made to FIGS. 2A to 2E, which illustrate example methods 200A to 200E of tracking the position of a mobile receiver 110 according to various embodiments.

Figure 2A:
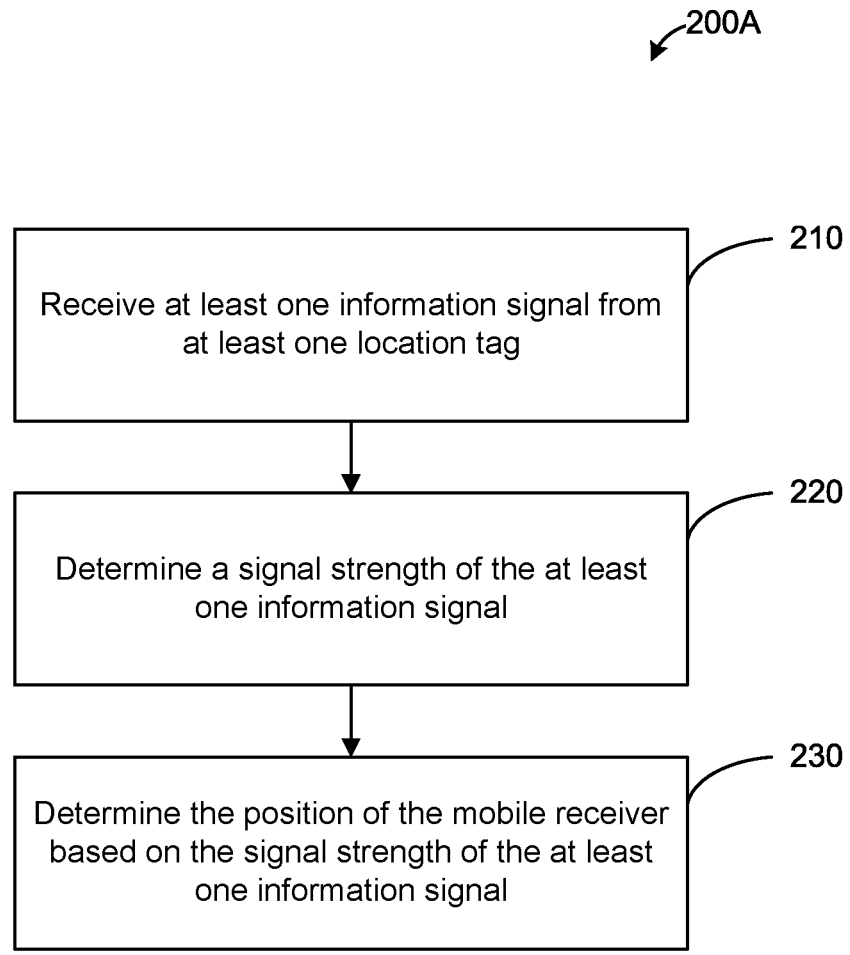
FIG. 2A is an example embodiment of a method of tracking the position of a mobile receiver on a production line.

Referring to FIG. 2A, at 210, a mobile receiver 110 may receive at least one information signal 120 from at least one location tag 105. An information signal 120 may be any signal analogous to the information signal 120 illustrated in FIGS. 3A and 3B. Location tags 105 may continuously transmit, and a mobile receiver 110 may continuously receive, information signals 120.

Location tags 105 may be configured to transmit information signals 120 with varying signal power levels. For example, where location tags 105 are configured to transmit activated information signals 120 at a high signal power level, the activated information signals 120 may be detected up to 15 meters away in open air. In a production line environment, however, information signals 120 may be attenuated by environmental factors and may only be detected up to 2 meters away. As illustrated in FIG. 3A, mobile receiver 110 may receive information signals 120 from one location tag 105b and may not receive information signals 120 from the other adjacent location tags 105 placed along the length of the conveyor belt 310.

FIG. 3A illustrates a given point in time when the mobile receiver 110 is positioned near one location tag 105b. The mobile receiver 110 may receive information signals 120 from the location tag 105b. The mobile receiver 110 may successively receive information signals 120 from the location tag 105b until the mobile receiver 110 is no longer within signal reception range of the location tag 105b. Although the mobile receiver 110 may successively receive information signals 120 from the location tag 105b, each received information signal 120 may be received with differing signal strengths.

The mobile receiver 110 may also simultaneously receive information signals 120 from two or more location tags 105. FIG. 3B illustrates a point in time when the mobile receiver 110 may be positioned at a location between two adjacent location tags 105c and 105d. The location tags 105c and 105d may be configured to transmit information signals 120 with sufficient signal power so that the mobile receiver 110 may simultaneously receive information signals 120 from the two adjacent location tags 105c and 105d.

Accordingly, the signal strength of transmitted information signals 120 may directly impact whether mobile receivers 110 may receive information signals 120 at successive and specific points in time.

At 220, a signal strength of the received at least one information signal is determined. In some embodiments, the signal strength may be determined by the location tag 105, where the location tag 105 transmits signal strength information along with information signals 120. The signal strength may be transmitted as a part of the information signal 120, or as a separate signal. In some other embodiments, the signal strength may be determined by the mobile receiver 110. In some further embodiments, the signal strength may be determined collaboratively by both the location tag 105 and the mobile receiver 110.

Referring again to an earlier example described with reference to FIG. 3A, where a mobile receiver 110 may successively receive information signals 120 from location tag 105b, each successively received information signal 120 may be received with a different signal strength.

Figure 10A:
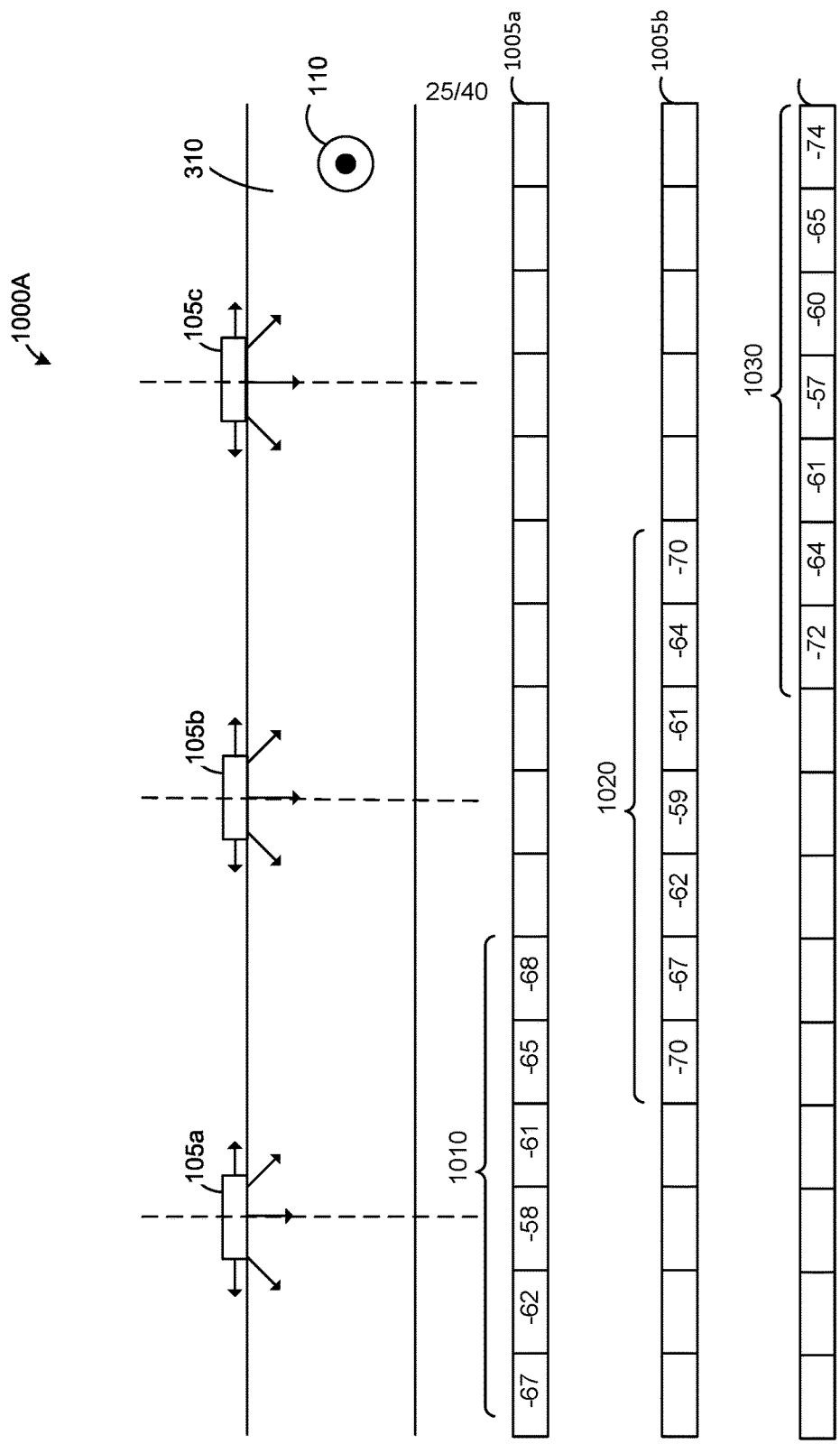
FIG. 10A illustrates a production line with a system for tracking the position of a mobile receiver and corresponding recorded data in accordance with an example embodiment.

Reference will now be simultaneously made to FIG. 10A, which illustrates recorded signal strengths 1005a, 1005b, 1005c as the mobile receiver is moving past location tags 105 on the production line 1000A. These signal strength values may be recorded at a mobile receiver 110 or at an external processor 115 or both. Each of the recorded signal strength arrays 1005a, 1005b, 1005c corresponds to a specific location tag 105. For example, the signal strength array 1005a corresponds to the signal strengths of information signals 120 received by the mobile receiver 110 as the mobile receiver 110 approaches, passes, and traverses away from the location tag 105a. When the signal strengths of information signals 120 are too low to be detected by the mobile receiver 110, no values are recorded in the signal strength array 1005a. But when the signal strength of information signals 120 are high enough to be detected by the mobile receiver 110, signal strength values 1010 are recorded.

The signal strength array 1005b corresponds to the signal strengths of information signals 120 received by the mobile receiver 110 as the mobile receiver 110 approaches, passes, and traverses away from the location tag 105b. Similarly, the signal strength array corresponds to the signal strengths of information signals 120 received by the mobile receiver 110 as the mobile receiver 110 approaches, passes, and traverses away from the location tag 105c. When the signal strength of information signals 120 received from location tag 105b are high enough to be detected by the mobile receiver 110, signal strength values 1020 are recorded. Similarly, when the signal strength of information signals 120 received from location tag 105*c* are high enough to be detected by the mobile receiver 110, signal strength values 1030 are recorded. As illustrated, at any given time, the mobile receiver 110 may be receiving detectable information signals 120 from more than one location tags.

In an example, as a mobile receiver 110 approaches a location tag 105*b*, the signal strength of successively received information signals 120 from the location tag 105*b* may strengthen. For example, as the mobile receiver 110 approaches a location tag 105*b*, mobile receiver 110 may receive an information signal 120 with a signal strength of −70 dBm. As the mobile receiver 110 moves closer to the location tag 105*b*, the mobile receiver 110 may receive a successive information signal 120 with a signal strength of −67 dBm. As the distance between the mobile receiver 110 and the location tag 105*b* further decreases, a further successive information signal 120 may be received with a signal strengths of −62 dBm and −59 dBm, respectively. As the mobile receiver 110 subsequently moves past the location tag 105*b*, the signal strength of information signals 120 may weaken. For example, as the mobile receiver 110 begins to move away from the location tag 105*b*, the signal strength of received information signals 120 may be −61 dBm, −64 dBm, and −70 dBm, respectively. Accordingly, although the mobile receiver 110 may continuously receive activated information signals 120 from location tags 105, each received activated information signal 120 may be received with a different signal strength.

At 230, a position of the mobile receiver 110 may be determined based on the signal strength of the at least one information signal 120.

Measured signal strength of an information signal 120 may be used to determine the distance between a mobile receiver 110 and a location tag 105 at a given point in time. As location tags 105 are positioned at fixed and known locations along the length of a conveyor belt 310, distance information may be used to provide an estimate of the relative or absolute position of the mobile receiver 110 on the production line 300A, 300B. As will be described with a number of examples in greater detail below, in some embodiments the position of a mobile receiver 110 may be determined based on signal strength information and known distance information relating to where location tags 105 are placed within a production line. In other embodiments, the position of a mobile receiver 110 may be determined based on locating local maximums within a plurality of recorded signal strengths.

Figure 2B:
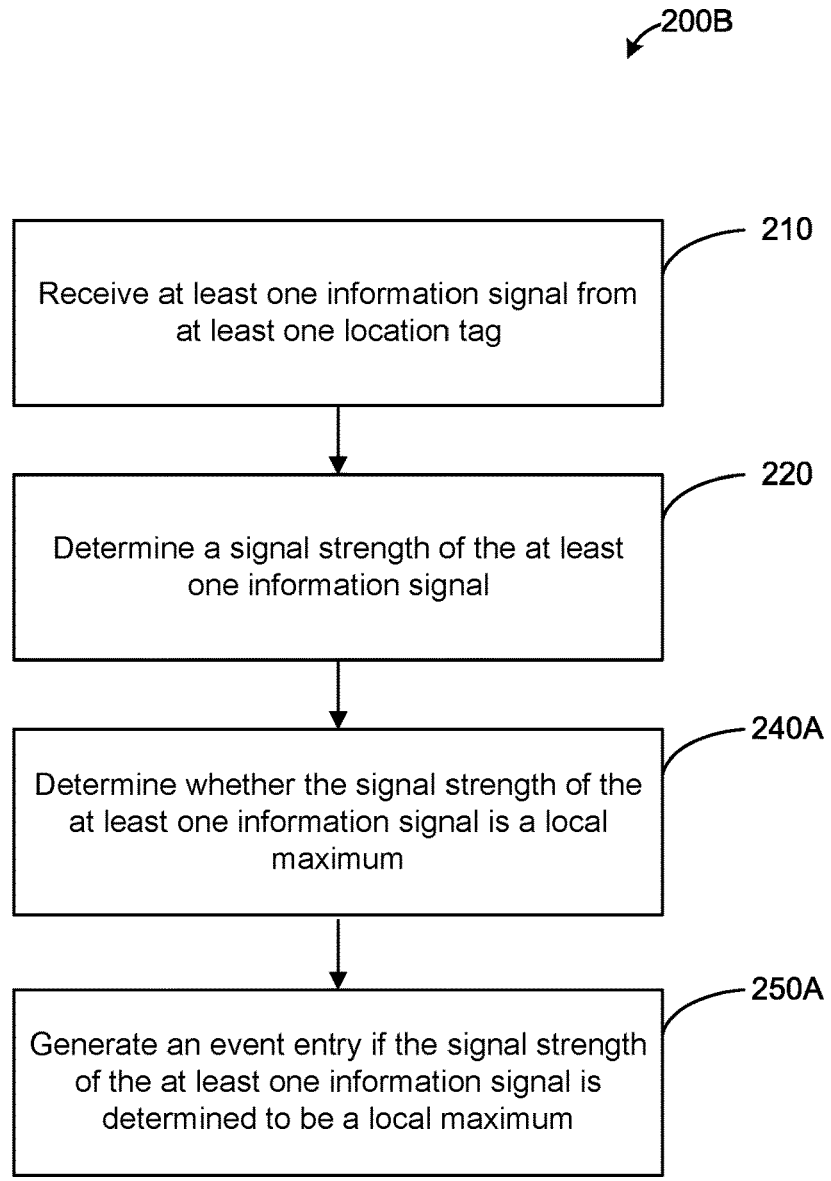
FIG. 2B is another example embodiment of a method of tracking the position of a mobile receiver on a production line.

Reference is now made to FIG. 2B, which illustrates another example method 200B of tracking the position of a mobile receiver 110. Steps 210 and 220 of FIG. 2B are analogous to steps 210 and 220 of FIG. 2A.

At step 240A, a determination is made as to whether the signal strength of the information signal 120 has reached a local maximum value. A local maximum may be found after a mobile receiver 110 or an external processor 115 have determined and recorded signal strengths of a plurality of information signals 120. A local maximum may be the largest signal strength in a sequence of signal strengths, such as signal strength arrays 1005*a*, 1005*b*, 1005*c*, received over a period of time. In various embodiments, a period of time may be defined as a function of the time it takes for the mobile receiver 110 to start and stop receiving detectable information signals 120 from a location tag 105. In other embodiments, a period of time may be defined by a number of completed cycles a mobile receiver 110 may travel on a production line. For example, a period of time may be defined as one full cycle on a production line or a period of time may be defined as having traveled past 5 location tags fixed along a production line.

In various embodiments, the mobile receiver 110 or the external processor 115 may determine whether the signal strength of each received information signal 120 has reached or exceeded a local maximum signal strength value. In some cases, the local maximum signal strength value may be defined as a signal strength threshold value. For example, the mobile receiver 110 may be configured to define a local maximum signal strength value of −60 dBm. In this example, when the mobile receiver 110 receives an information signal 120 and determines that the information signal 120 strength is −77 dBm, the mobile receiver 110 may determine that the signal strength of the information signal 120 has not reached the local maximum signal strength value. On the other hand, when the mobile receiver 110 receives an information signal 120 and determines that the information signal 120 strength is −58 dBm, the mobile receiver 110 may determine that the signal strength of the information signal 120 has exceeded the local maximum signal strength value.

In some embodiments, a local maximum signal strength value may be defined with reference to empirically gathered data. For example, location tags 105 may be positioned at fixed locations throughout a production line. When a mobile receiver 110 traverses the production line, the mobile receiver 110 may record signal strengths of information signals 120 for each individual location tag 105 at a specific location on the production line. For each cycle of the production line, the signal strength of received information signals for a given location tag 105 at the specific location on the production line may be very similar or the same. Accordingly, a threshold value or local maximum signal strength values may be defined based on empirically gathered data.

In some cases, where the measured signal strength of a received information signal 120 is used to generate a distance measurement between a mobile receiver 110 and a location tag 105, a threshold value may be defined in terms of a distance measurement. In these cases, determining whether the signal strength has reached a maximum value may be accomplished by comparing a measured distance between the mobile receiver 110 and the location tag 105 to a distance threshold and determining if the measured distance is greater or lesser than the threshold distance.

In some other cases, the mobile receiver 110 may retroactively determine whether the signal strength of the information signal 120 is a local maximum. In the retroactive determination process, the mobile receiver 110 receives successive information signals 120 and compares the signal strengths of the successively received information signals 120 to each other to identify the information signal 120 having a signal strength with the largest value.

Referring again to FIG. 3A, as the mobile receiver 110 approaches and moves past the location tag 105*b*, mobile receiver 110 may continue to successively receive information signals 120. As previously discussed, each information signal 120 may be received by the mobile receiver 110 with a different signal strength. As the mobile receiver 110 moves past the location tag 105*b*, the mobile receiver 110 may record the successively received information signals 120. When the mobile receiver 110 has passed a point where the signal strength of information signals 120 is too low to be received by the mobile receiver 110, the mobile receiver 110 may compare the signal strengths of each successively received information signal to each other and identify the information signal having a signal strength with the highest signal strength value.

In some other cases, the signal strengths of incoming information signals 120 from different location tags 105 at the start of the run are assumed to be local maximums. As and when more information signals 120 are received from different location tags 105, signal strength comparisons for each location tag 105 is carried out to determine the new local maximums. The process may continue until the end of the run to correctly identify the local maximum signal strengths corresponding to each location tag 105. This process is described in greater detail below in the discussion of FIGS. 17A-17C.

At 250A, if a determination is made that the signal strength of the information signal has reached a local maximum value, an event entry is generated. An event entry may indicate that the mobile receiver 110 has reached a minimum distance with respect to at least one location tag 105 transmitting the at least one information signal 120 having the signal strength determined to be a local maximum.

An event entry may be a data entry (referred to herein as "event entry data"), generated in a memory module 520 of mobile receiver 110 or memory module 610 of external processor 115, which includes information regarding the information signal 120 whose signal strength analysis lead to the conclusion of a local maximum. In other words, the event entry data may include signal strength of the information signal 120, a location tag identifier identifying the location tag corresponding to the information signal 120, and an additional indicator (for example, a flag) associated with the location tag identifier and signal strength of the information signal 120. The additional indicator may be any symbol (for example, a flag, a triangle, a circle etc.) or any other indicator that indicates to the mobile receiver 110 or the external processor 115 that the event entry data corresponds to the point in time when the distance between the mobile receiver 110 and a location tag 105 was minimum. This also indicates the point in time when the mobile receiver 110 crosses a location tag 105 on the production line.

Figure 2C:
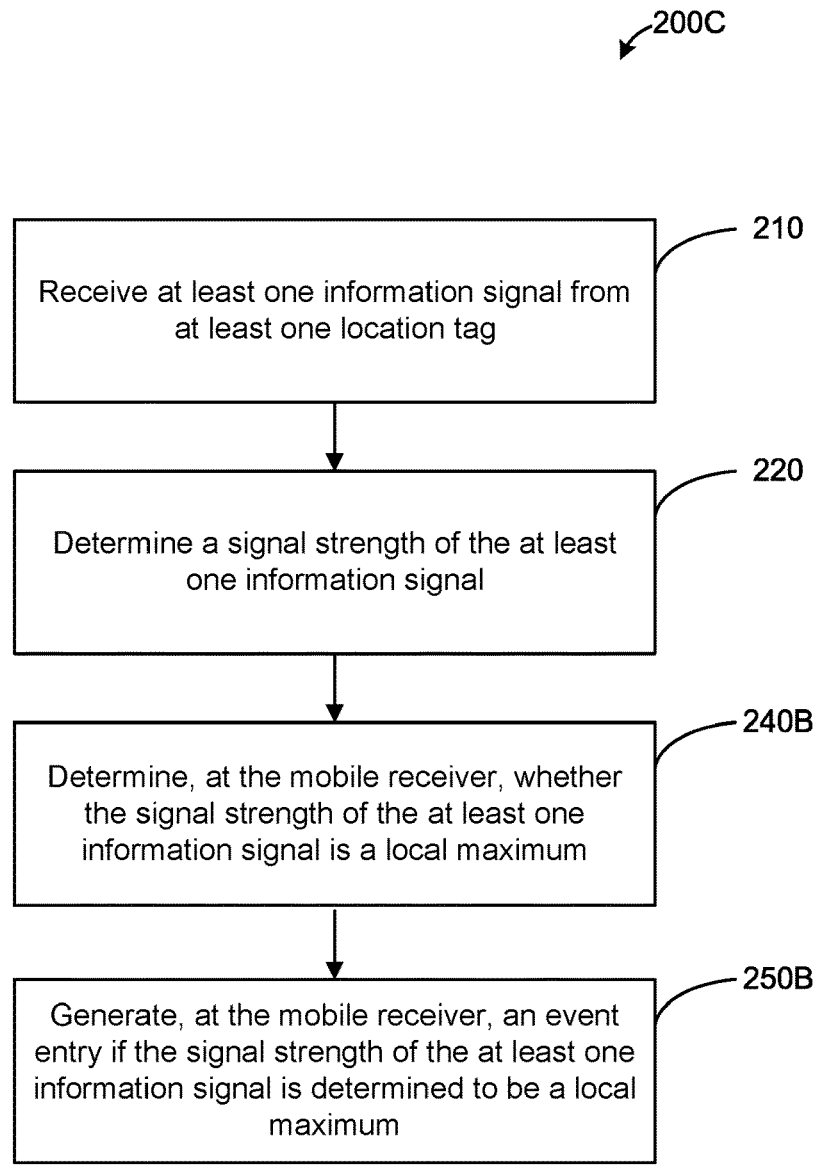
FIG. 2C is a further example embodiment of a method of tracking the position of a mobile receiver on a production line.
Figure 2D:
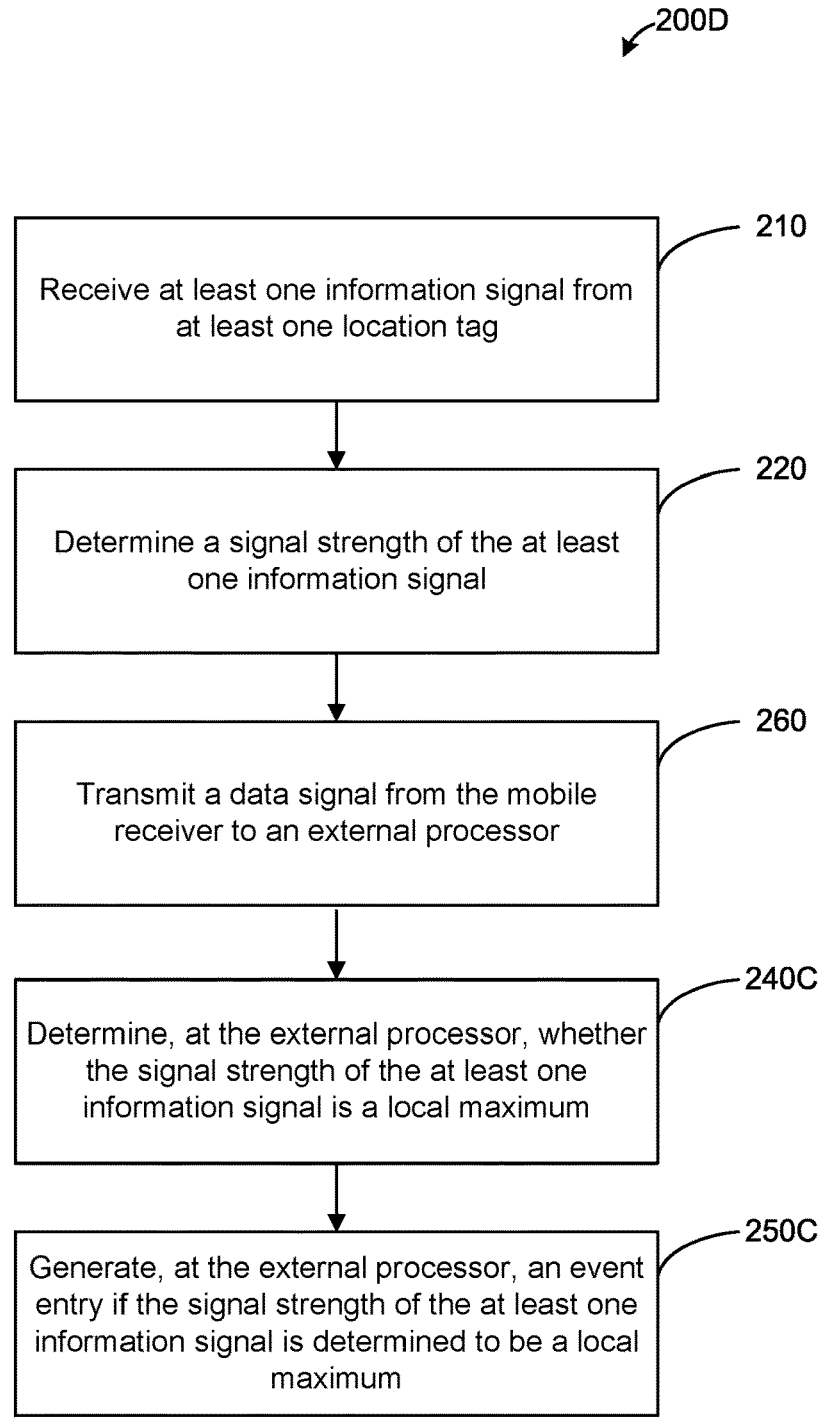
FIG. 2D is another example embodiment of a method of tracking the position of a mobile receiver on a production line.

Reference will now be made to FIGS. 2C and 2D, which illustrate further example methods 200C, 200D of tracking the position of a mobile receiver 110. Steps 210 and 220 of FIG. 2C are analogous to steps 210 and 220 of FIG. 2A. Further, as will be discussed, flowchart 200C and flowchart 200D illustrate that the determination of whether a signal strength of at least one information is a local maximum may take place at either the mobile receiver 110 or the external processor 115.

Referring to FIG. 2C, at step 240B, a determination is made at the mobile receiver 110 as to whether the signal strength of the information signal 120 has reached a local maximum value. Step 240B is otherwise analogous to step 240A in FIG. 2B.

Further, at step 250B, if a determination is made that the signal strength of the at least one information signal 120 is a local maximum, an event entry is generated by the mobile receiver 110. Step 250B is performed at the mobile receiver 110 and is otherwise analogous to step 250A in FIG. 2B Referring now to FIG. 2D, at step 260, the mobile receiver 110 may transmit information 130 to an external processor 115. In this embodiment, information 130 includes data signals. In other words, when a mobile receiver 110 receives an information signal 120, the mobile receiver 110 may determine the signal strength of the information signal 120 and immediately subsequently transmit the signal strength and the information signal 120 to the external processor 115 as a data signal. In some cases, instead of transmitting the information signal 120 with the corresponding signal strength as the data signal, the mobile receiver 110 only transmits a location tag identifier identifying the source of the information signal 120 along with the signal strength of the information signal 120 as the data signal. In some other cases, the data signal may include the signal strength of the received information signal 120, a location tag identifier of the location tag 105 from which the information signal 120 was received, and power level information of the location tag 105 from which the information signal 120 was received. It will be understood that a data signal may include more or fewer components, as may be required by the external processor 115.

At step 240C, a determination is made at the external processor 115 as to whether the signal strength of the at least one information signal has reached a local maximum value. Step 240C is otherwise analogous to steps 240A and 240B in FIGS. 2A and 2B, respectively.

Further, at step 250C, if a determination is made that the signal strength of the at least one information signal 120 is a local maximum, an event entry is generated at the external processor 115. The determination at step 240C is made at the external processor 115. Step 250C is performed at the external processor 115 and is otherwise analogous to step 250A and 250B in FIGS. 2A and 2B, respectively.

Figure 2E:
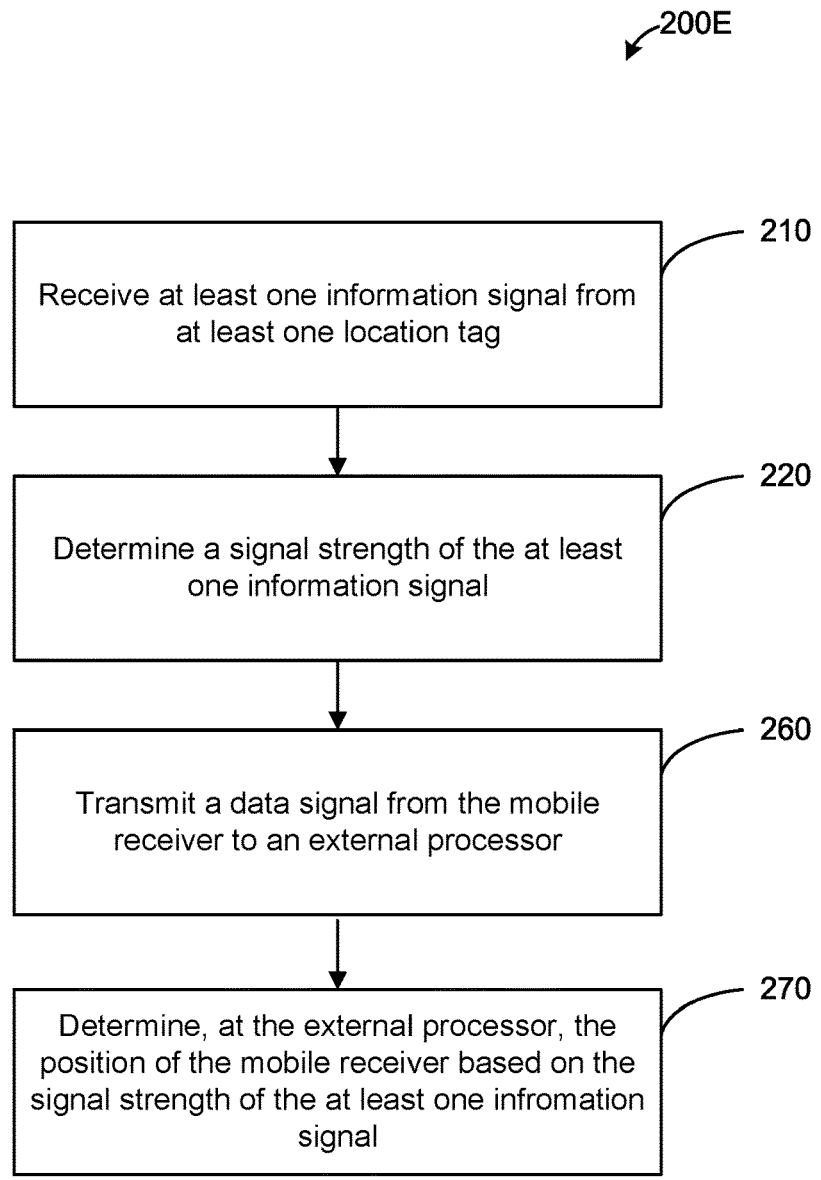
FIG. 2E is another example embodiment of a method of tracking the position of a mobile receiver on a production line.

Reference is now made to FIG. 2E, which illustrates another example method 200E of tracking the position of a mobile receiver 110. The example method 200E may track the position of a mobile receiver 110 without locating local maximums. To illustrate the example method of flowchart 200E, simultaneous references will be made to FIGS. 16A and 16B.

Steps 210 and 220 of FIG. 2E are analogous to steps 210 and 220 of FIG. 2A.

At 260, mobile receiver 110 may transmit data signals to an external processor 115. The mobile receiver 110 may transmit data signals as information 130 as illustrated in FIG. 1. Similar to FIG. 2D, in FIG. 2E, at step 260, data signals may include the signal strength of the received information signal 120, a location tag identifier of the location tag 105 from which the information signal 120 was received, and/or power level information of the information tag 105 from which the information signal 120 was received.

At step 270, the position of the mobile receiver 110 may be determined by analyzing recorded signal strengths and without locating local maximums.

Figures 16A, 16B:
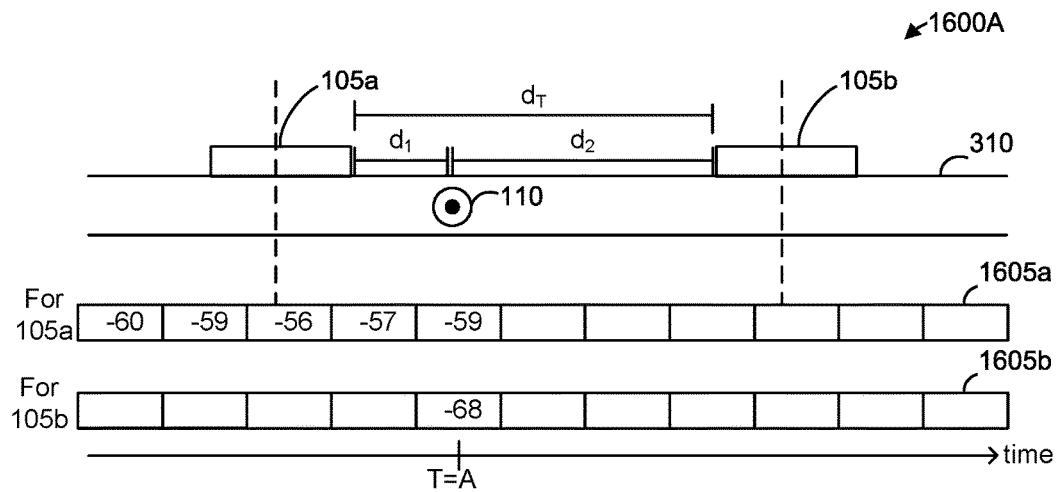
FIG. 16A illustrates a production line and recorded signal strength information in accordance with an example embodiment.
FIG. 16B illustrates a look up table in accordance with an example embodiment.

FIG. 16A illustrates a production line 1600A and recorded signal strength arrays 1605a, 1605b according to an example embodiment. The signal strength array 1605a corresponds to signal strengths of the successively received information signals 120 from location tag 105a as the mobile receiver 110 approaches, passes, and subsequently moves away from the location tag 105a. Similarly, the signal strength array 1605b corresponds to signal strengths of the successively received information signals 120 from location tag 105b as the mobile receiver approaches, passes, and subsequently moves away from the location tag 105b.

As illustrated in FIG. 16B, a look up table 1600B may be used to map or correlate a signal strength value to a distance value. For example, when a mobile receiver 110 receives an information signal 120 from a location tag 105 with signal strength value of −62 dBm, the mobile receiver 110 may determine that the distance between the mobile receiver 110 and the location tag 105 from which the information signal 120 was received is approximately 2 distance units. In various embodiments, the look up table 1600B may correlate ranges of signal strengths to a discrete distance value. In other embodiments, the look up table 1600B may correlate a discrete signal strength value to a discrete distance value. It will be understood that the implementation of the example look up table 1600B should not be limited by described examples. In various embodiments, look up table 1600B may be implemented to define high, low, and various intermediary signal strength thresholds and to correlate the signal strength thresholds to a distance value.

In various embodiments, a calibrated function may be used to correlate signal strength values to distance values. For example, the relationship between signal strength of an information signal 120 received from a location tag 105 and distance between a location tag 105 and a mobile receiver 110 may be represented by a nonlinear curve or function. Without limiting the type of nonlinear functions that may be used, depending on the wireless communication method employed, exponential or polynomial functions are examples of nonlinear functions that may best approximate the relationship between signal strengths of information signals 120 and distances between the mobile receiver 110 and location tags 105 transmitting the information signals 120.

In other various embodiments, a set of calibration points may be used to correlate signal strength values to distance values. For example, a production line operator may setup a production line and measure signal strength values of information signals 120 at several known distances from a location tag 105. A mobile receiver 110 or an external processor 115 may subsequently interpolate, from a set of calibration points, measured signal strength to estimate distance. Because location tags 105 are placed at fixed and known locations along a production line 1600A, a set of calibration points may be collected by a mobile receiver 110 over several traversals of a production line 1600A.

Referring again to FIG. 2E and FIG. 16A simultaneously, the mobile receiver 110 may travel along the production line 1600A and receive information signals 120 from location tags 105 (e.g. step 210 in FIG. 2E). The mobile receiver 110 may determine signal strength of the at least one information signal 120 (e.g. step 220 in FIG. 2E). Further, as the mobile receiver 110 traverses along the production line 1600A, the mobile receiver 110 may transmit data signals to the external processor 115. The external processor 115 may, at 270, subsequently determine the position of the mobile receiver 110 based on the signal strength of the at least one information signal 120.

In various embodiments, adjacent location tags 105a, 105b are placed at fixed locations. The total distance between adjacent location tags 105a, 105b may be known. The external processor 115 may receive a data signal, comprising a signal strength of an information signal 120, and may determine a distance value using one of the methods previously described.

In some embodiments, the look up table 1600B may correlate signal strength to a distance value measured horizontally or along the same axis of a moving conveyor belt 310 on a production line 1600A. For example, as illustrated in FIG. 16A, the distance measurements may correspond to measurements labeled d1 and d2. In other embodiments, the distance value may be measured with reference to a closest path between a mobile receiver 110 and a location tag 105 (e.g. a hypotenuse formed from a distance d1 and the perpendicular distance from the edge of the conveyor belt 310 to the mobile receiver 110). It will be understood that a distance measurement or value may be defined in any way when a set of calibration points are gathered.

In an example, such as when time=A, if a mobile receiver 110 determines the signal strength of an information signal 120 from a location tag 105a to be −59 dBm, the look up table 1600B may provide that the mobile receiver 110 is approximately 1 distance unit from location tag 105a. Further, for a signal strength of −68 dBm, from a location tag 105b, the look up table 1600B may provide that the mobile receiver 110 is approximately 3 distance units from location tag 1600B. Because the total distance between adjacent location tags 105a, 105b may be known to be 4 distance units, at the specific point in time T=A, the external processor 115 may determine that the mobile receiver 110 be at a location that is ¼ of the total distance between the adjacent location tags 105a, 105b away from the preceding location tag 105a. Accordingly, an external processor 115 may be able to continuously track the position of a mobile receiver 110 based on the signal strength of information signals 120.

As described above, in various embodiments, an external processor 115 may provide the relative position of the mobile receiver 110 relative to two adjacent location tags 105. In other embodiments, an external processor 115 may provide an absolute distance or position of a mobile receiver 110 relative to the location tags 105, or the conveyor belt 310 of the production line 1600A.

As previously described, location tags 105 may be used as guideposts or fixed markers on a production line 1600A. Accordingly, in various embodiments, an external processor 115 may generate a map of a production line 1600A and provide a real-time, or playback, illustration of the position of a mobile receiver 110 on a production line 1600A.

Even though the discussion above is in relation to determining the position of the mobile receiver 110 based on signal strengths of information signals 120 received from two adjacent location tags 105a, 105b, the same principles apply to determining the position of the mobile receiver 110 based on signal strengths of information signals 120 received from more than two location tags 105. For example, if at a given time, the mobile receiver 110 can detect multiple information signals 120 from multiple location tags 105, the determination of the position of the mobile receiver 110 may be based on the signal strengths of all of the multiple information signals 120.

In various embodiments, the external processor 115 may account for or apply mathematical functions to remedy apparent errors in distance values. For example, referring again to the previous example, the mobile receiver 110 was determined to be 1 distance unit from location tag 105a and 3 distance units from location tag 105B. If, however, the sum of the two distances does not equate the known distance between the adjacent location tags 105, the external processor 115 may apply error correction techniques.

In an example, it may be known that adjacent location tags 105a, 105b are separated by 4 distance units. If the external processor 115 determines that the mobile receiver 110 is 1 distance unit to a first location tag 105a and 2 distance units to a second location tag 105b, the external processor 115 may determine that some level of error had occurred (e.g. 1+2 does not equate 4). In various embodiments, the external processor 115 may average out the error. Accordingly, the external processor 115 may determine that the mobile receiver is 1.33 distance units from the first location tag 105a and 2.66 distance units from the second location tag 105b. Accordingly, the external processor 115 may utilize known distances between location tags 105 to improve the accuracy of information relating to mobile receiver 110 position along the production line. It will be understood that although only one example of error correction is illustrated, any other method or mathematical function may be employed to remedy apparent errors in distance values.

Although the external processor 115 is described herein as performing the operations to carry out the method 200E of position tracking with signal strengths of information signals 120, it will be understood that the mobile receiver 110 may also perform the operations to carry out the method of 200E of position tracking based on signal strengths of information signals 120.

In some embodiments, a mobile receiver 110 may not establish a communication link with an external processor 115 until several production line 1600A cycles have completed. In other embodiments, a mobile receiver 110 and an external processor 115 may be subsumed into a single device, carrying out all the operations as described herein.

Figure 7A:
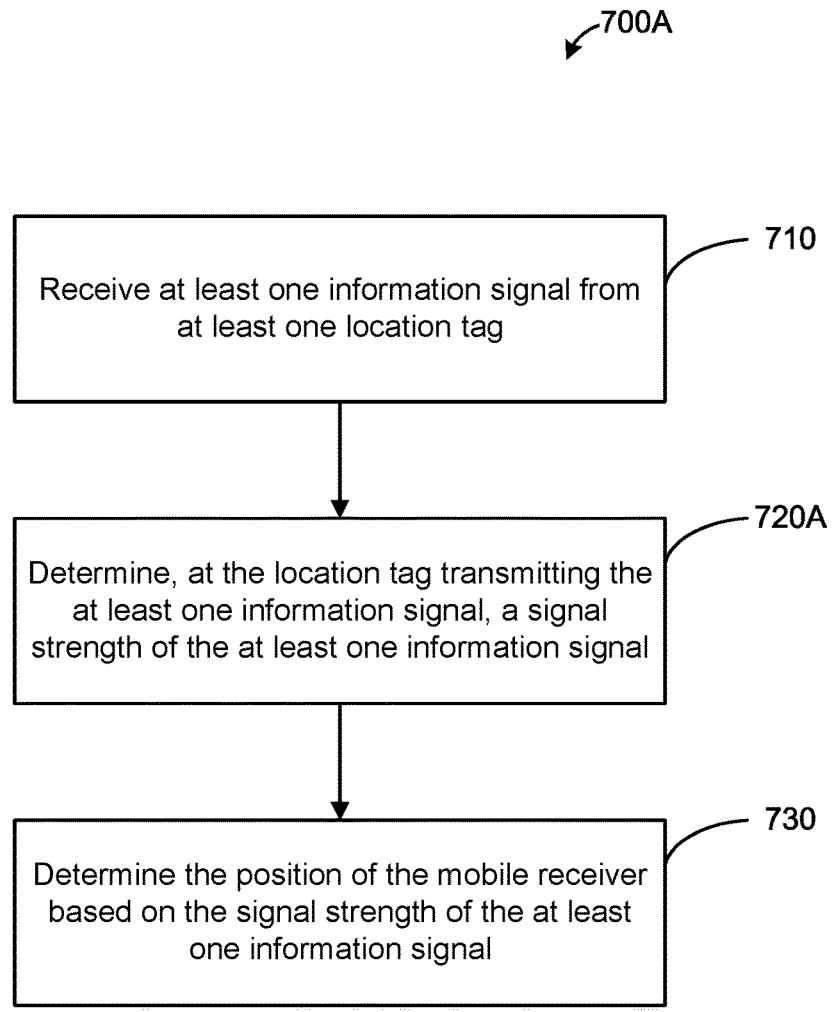
FIG. 7A is an example embodiment of a method for tracking the position of a mobile receiver on a production line.
Figure 7B:
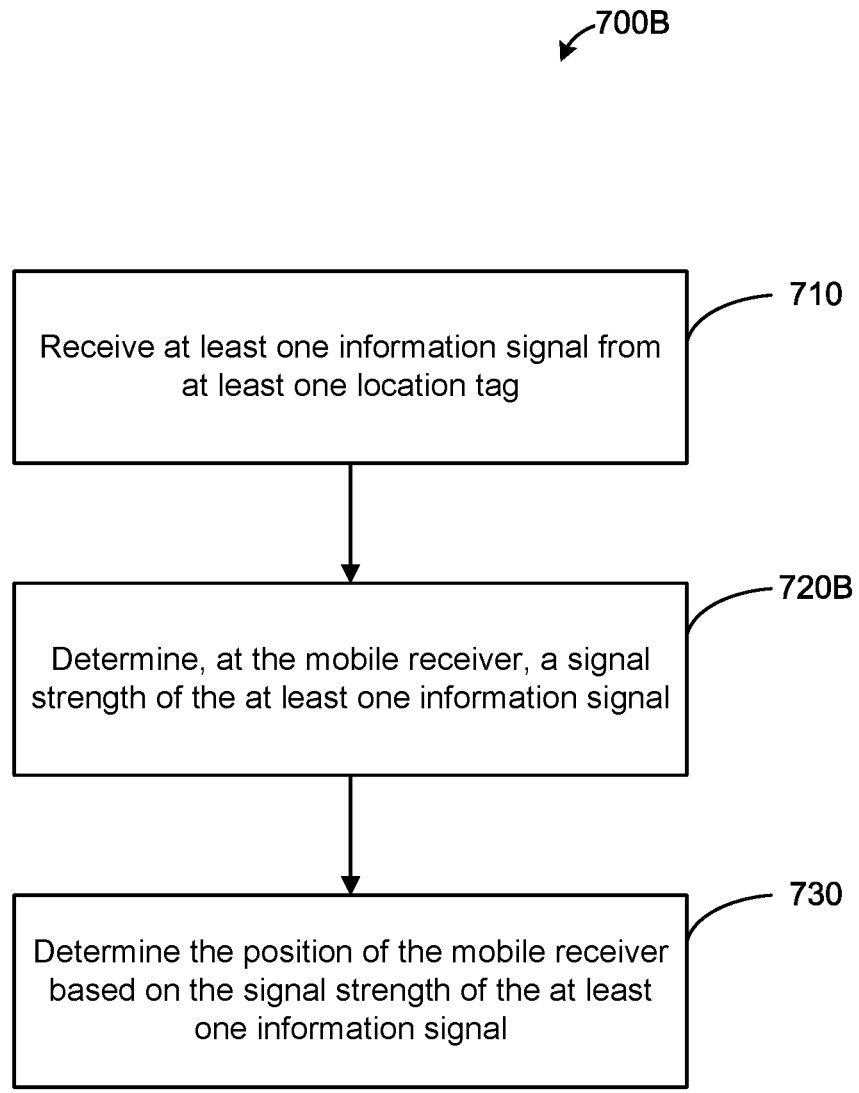
FIG. 7B is another example embodiment of a method for tracking the position of a mobile receiver on a production line.
Figure 7C:
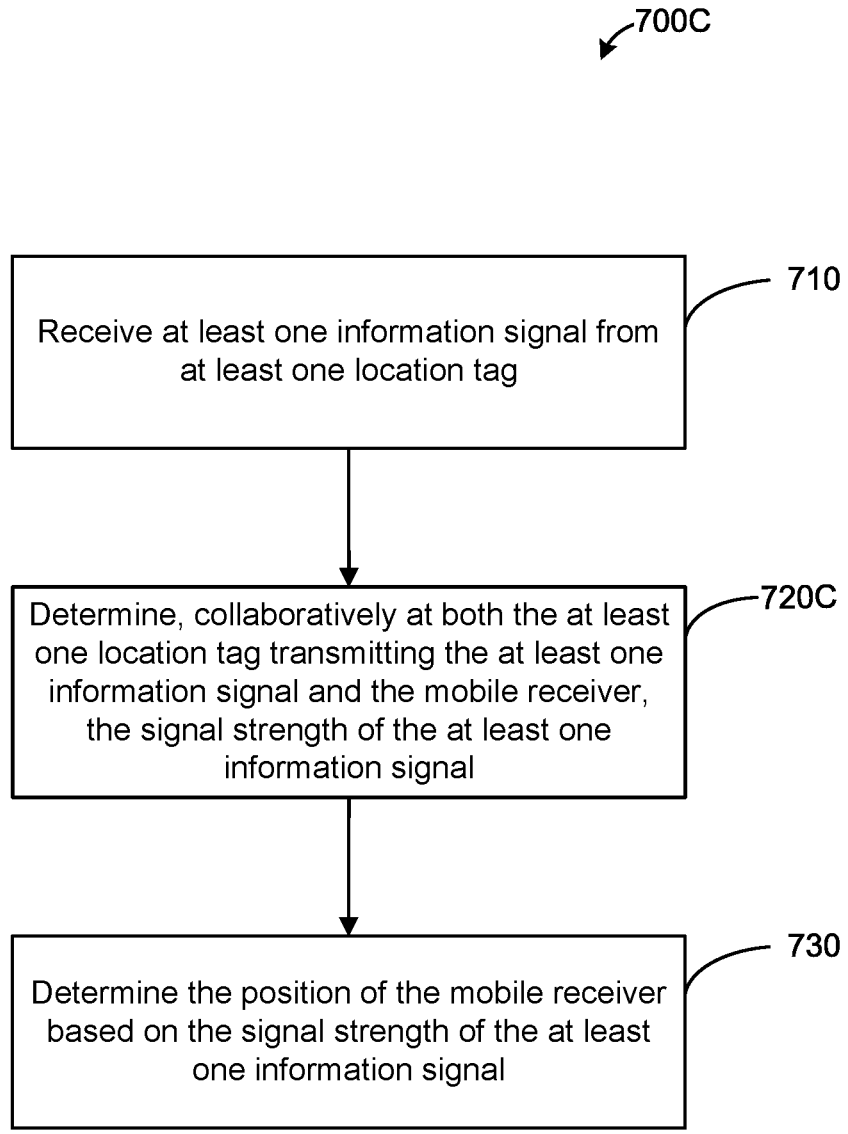
FIG. 7C is a further example embodiment of a method for tracking the position of a mobile receiver on a production line.

Reference will now be made to FIGS. 7A, 7B, and 7C, which illustrate example methods of tracking the position of a mobile receiver 110 on a production line. The flowcharts 700A, 700B and 700C correspond to FIGS. 7A, 7B and 7C, respectively. Each of the flowcharts 700A, 700B, 700C generally correspond to the method 200A of FIG. 2A. In particular, steps 710 and 730 of FIGS. 7A, 7B, and 7C are analogous to steps 210 and 230 of FIG. 2A. As will be discussed, flowcharts 700A, 700B, and 700C illustrate various example methods of determining a signal strength of an information signal 120.

As illustrated in FIG. 700A, at 720A, the signal strength of the information signal may be determined at the location tag 105. In some cases, the signal strength according to this embodiment corresponds to the transmission signal strength of the information signal 120. Once the signal strength is determined by the location tag 105, the signal strength information may be transmitted to the mobile receiver 110 either along with or as a value within the information signal 120.

As illustrated in FIG. 700B, at 720B, the signal strength of the information signal 120 may be determined at a mobile receiver 110. In some embodiments, the mobile receiver 110 may measure or determine the signal strength of received information signals 120 using Received Signal Strength Indicator (RSSI) values. RSSI is a measurement of the power present in a received signal. For example, a high RSSI value will indicate strong signal strength. In contrast, relatively lower RSSI values will indicate relatively weaker signal strengths. In various cases, the signal strength values may be measured as decibels (dB) or decibel-milliwatts (dBm). In various embodiments, RSSI measurements may be provided by the wireless communication protocol employed by the location tags 105 and the mobile receiver 110. It will be understood that although signal strength of an information signal 120 may be determined by RSSI values, any other signal strength measurement technique may be utilized. In some embodiments, other signal strength measurement techniques compatible with a chosen wireless communication protocol may be used. In other embodiments, the mobile receiver 110 may implement a signal strength measurement technique to supplement or take the place of signal strength measurement capabilities of wireless communication protocols. Signal strength measurement techniques may be implemented by a signal strength analysis module 540, as described earlier with reference to FIG. 5B.

Referring now to FIG. 7C, at 720C, the signal strength of the information signal 120 may be based on inputs from both the location tag 105 and the mobile receiver 110. That is, at 720C, the method 700C provides for collaboratively determining the signal strength of the at least one information signal 120 at both the at least one location tag 105 transmitting the at least one information signal and the mobile receiver 110.

In some embodiments, when a location tag 105 transmits an information signal 120 to a mobile receiver 110, the location tag 105 may communicate the transmission signal strength of the information signal 120. The mobile receiver 110 may subsequently measure or determine the signal strength of the received information signal 120 based both on the transmission signal strength information received from the location tag 105 and on a measured signal strength of the received information signal 120.

Accordingly, as illustrated by the various embodiments of steps 720A, 720B, and 720C, determining the signal strength of information signals 120 may be made by location tags 105, mobile receivers 110, or by a combined effort of both the location tag 105 and the mobile receiver 110.

Figure 8A:
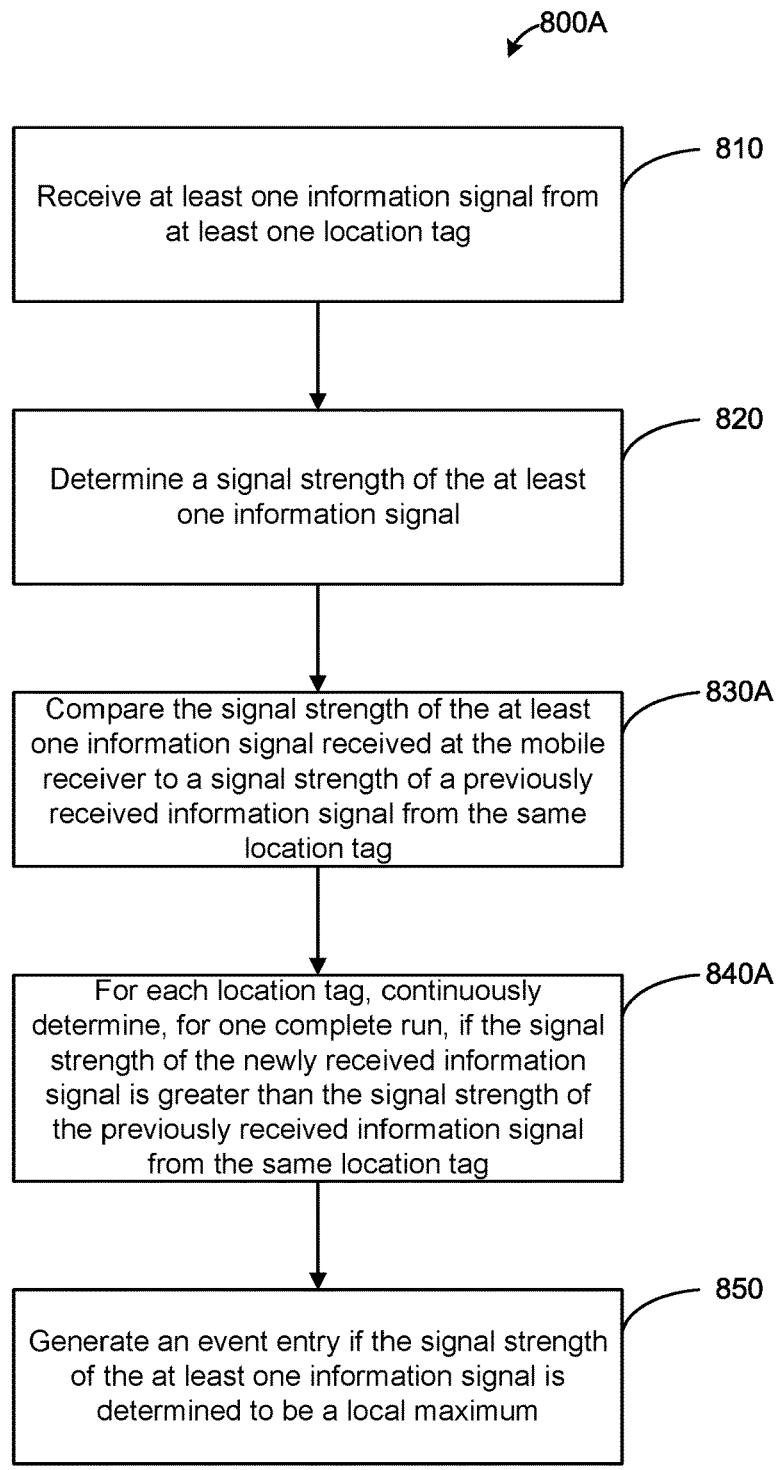
FIG. 8A is an example embodiment of a method for tracking the position of a mobile receiver on a production line.
Figure 8B:
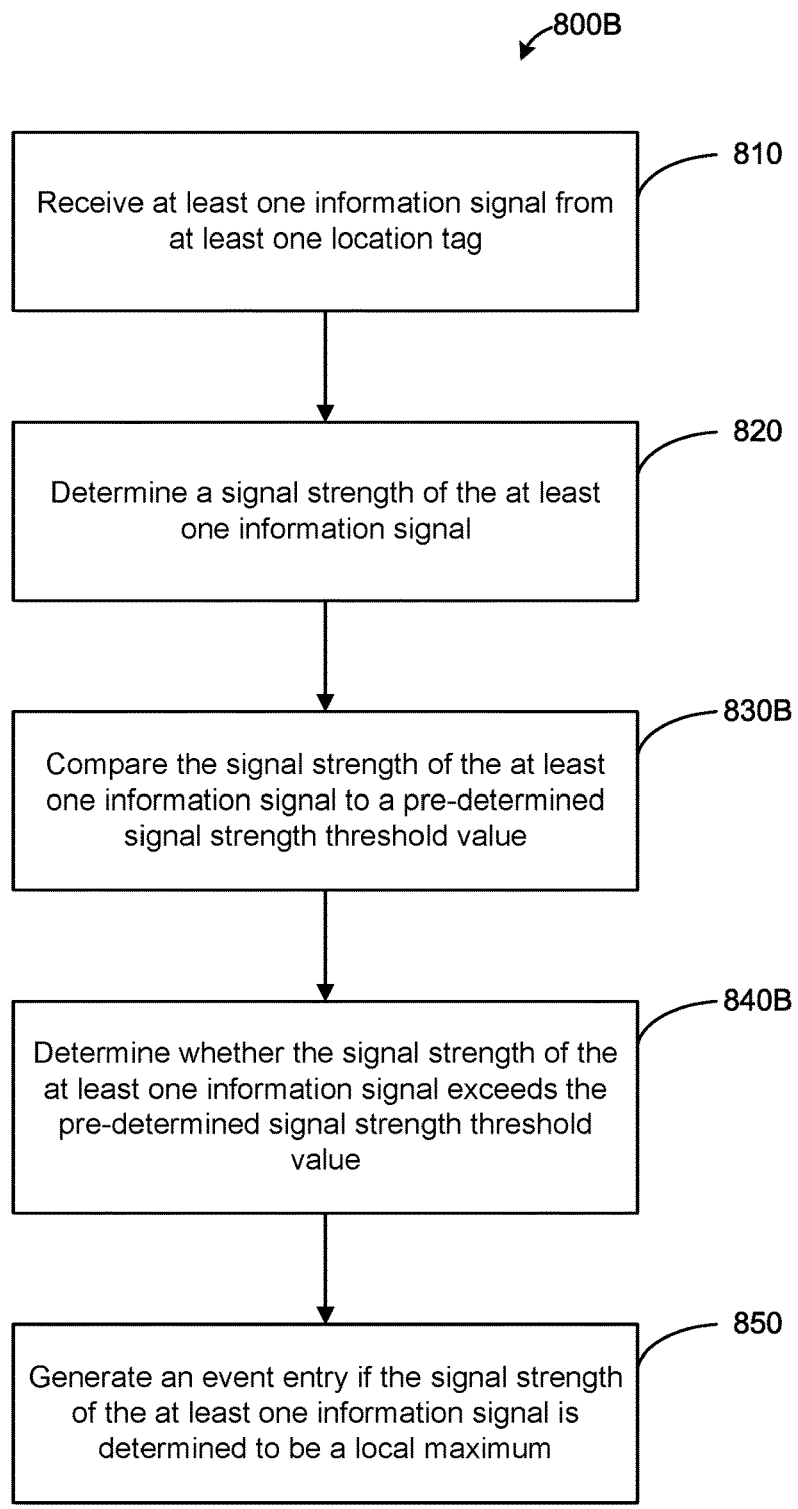
FIG. 8B is another example embodiment of a method for tracking the position of a mobile receiver on a production line.
Figure 8C:
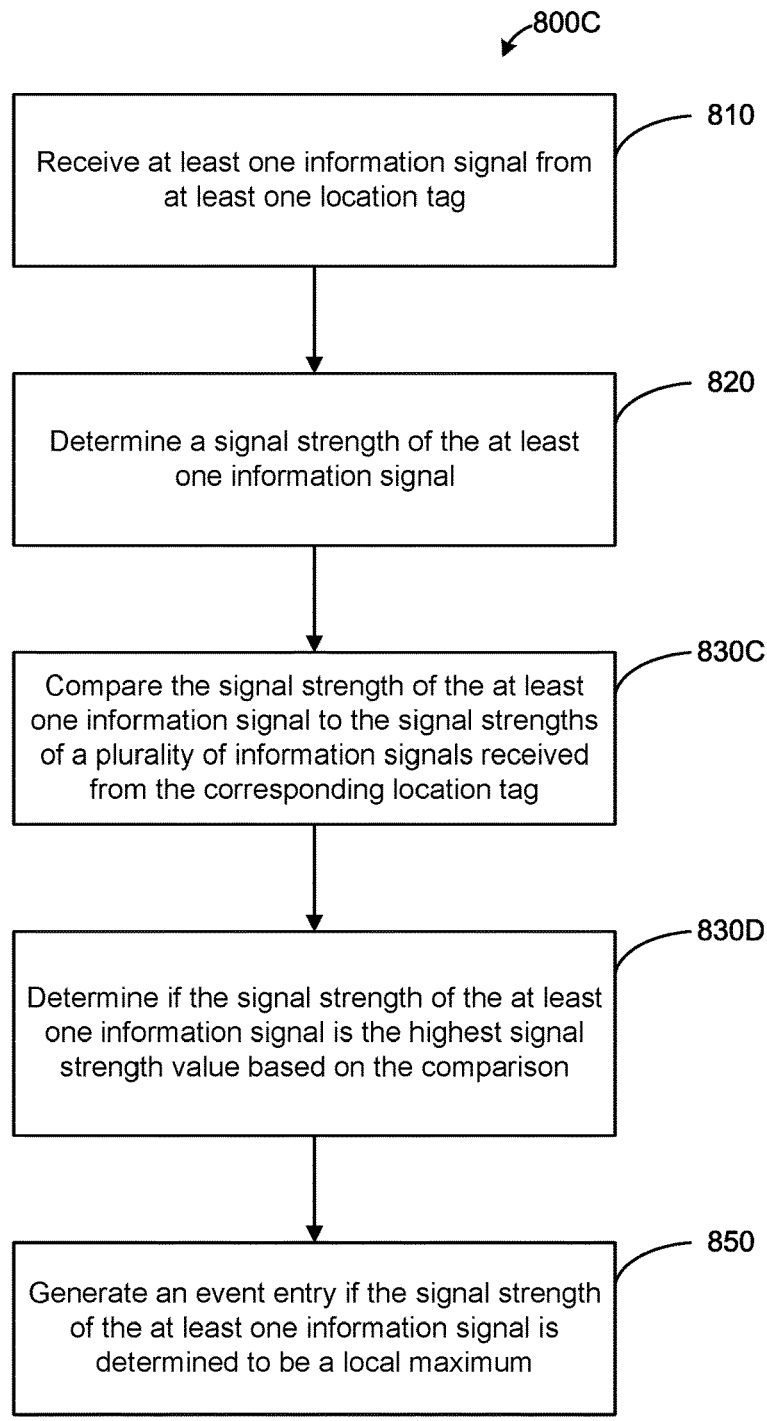
FIG. 8C is a further example embodiment of a method for tracking the position of a mobile receiver on a production line.

Reference is next made to FIGS. 8A, 8B, and 8C, which illustrate example methods of tracking the position of a mobile receiver 110 on a production line. The flowcharts 800A, 800B, and 800C correspond to FIGS. 8A, 8B and 8C, respectively. Each of the flowcharts 800A, 800B, and 800C generally correspond to the method 200B of FIG. 2B. In particular, steps 810, 820, and 850 of FIGS. 8A, 8B, and 8C are analogous to steps 210, 220, and 250A of FIG. 2B. As will be discussed, flowcharts 800A, 800B, and 800C illustrate various ways of determining whether the signal strength of the at least one information signal 120 is a local maximum. Signal strength local maximums may subsequently trigger the generation of an event entry. As previously described, an event entry may indicate that the mobile receiver has reached a minimum distance with respect to at least one location tag 105 transmitting at least one information signal 120 having a signal strength determined to be a local maximum over a period of time.

Figure 17A:
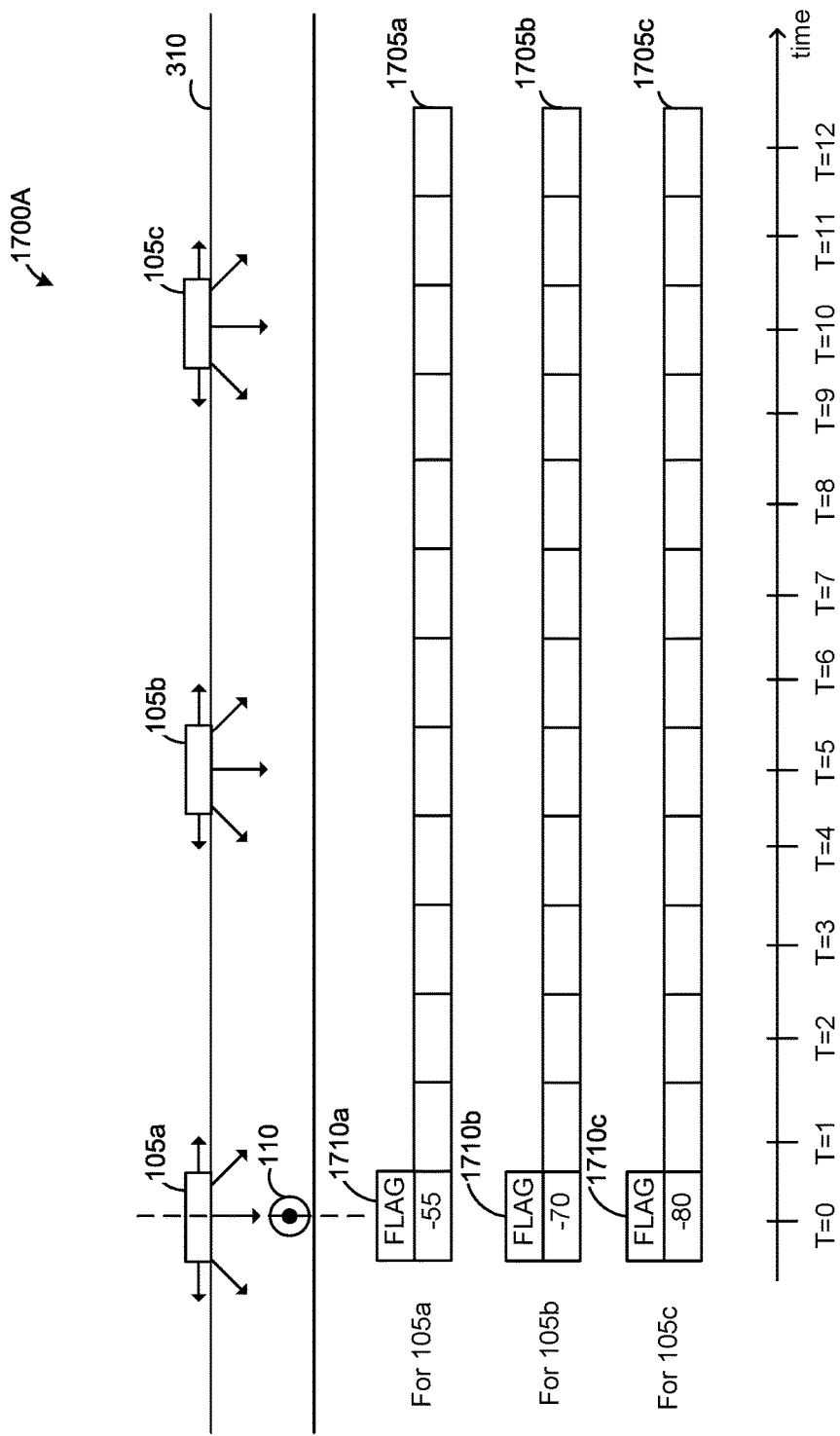
FIG. 17A illustrates a production line with a system for tracking the position of a mobile receiver in accordance with an example embodiment.
Figure 17B:
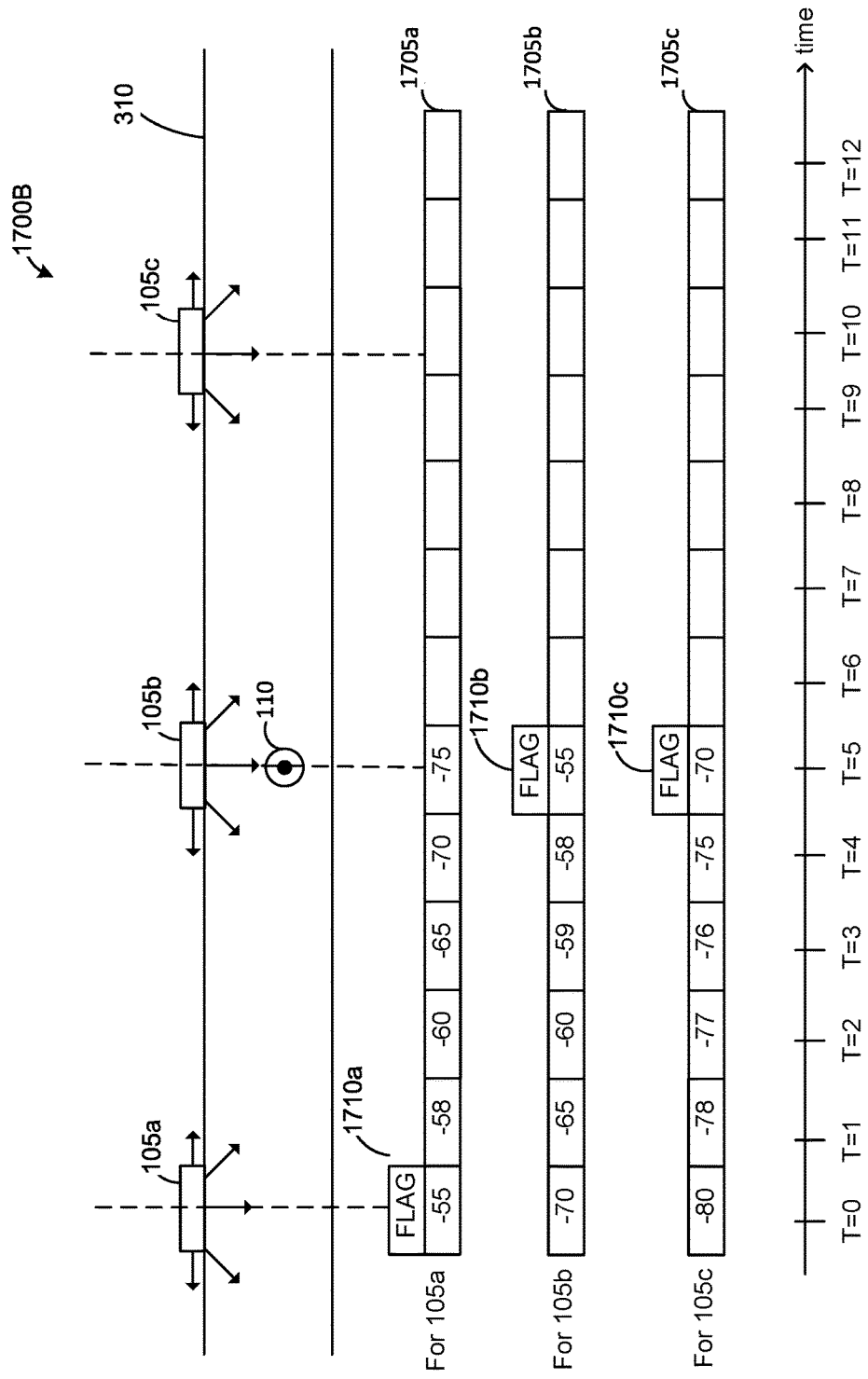
FIG. 17B illustrates a production line with a system for tracking the position of a mobile receiver in accordance with an example embodiment.
Figure 17C:
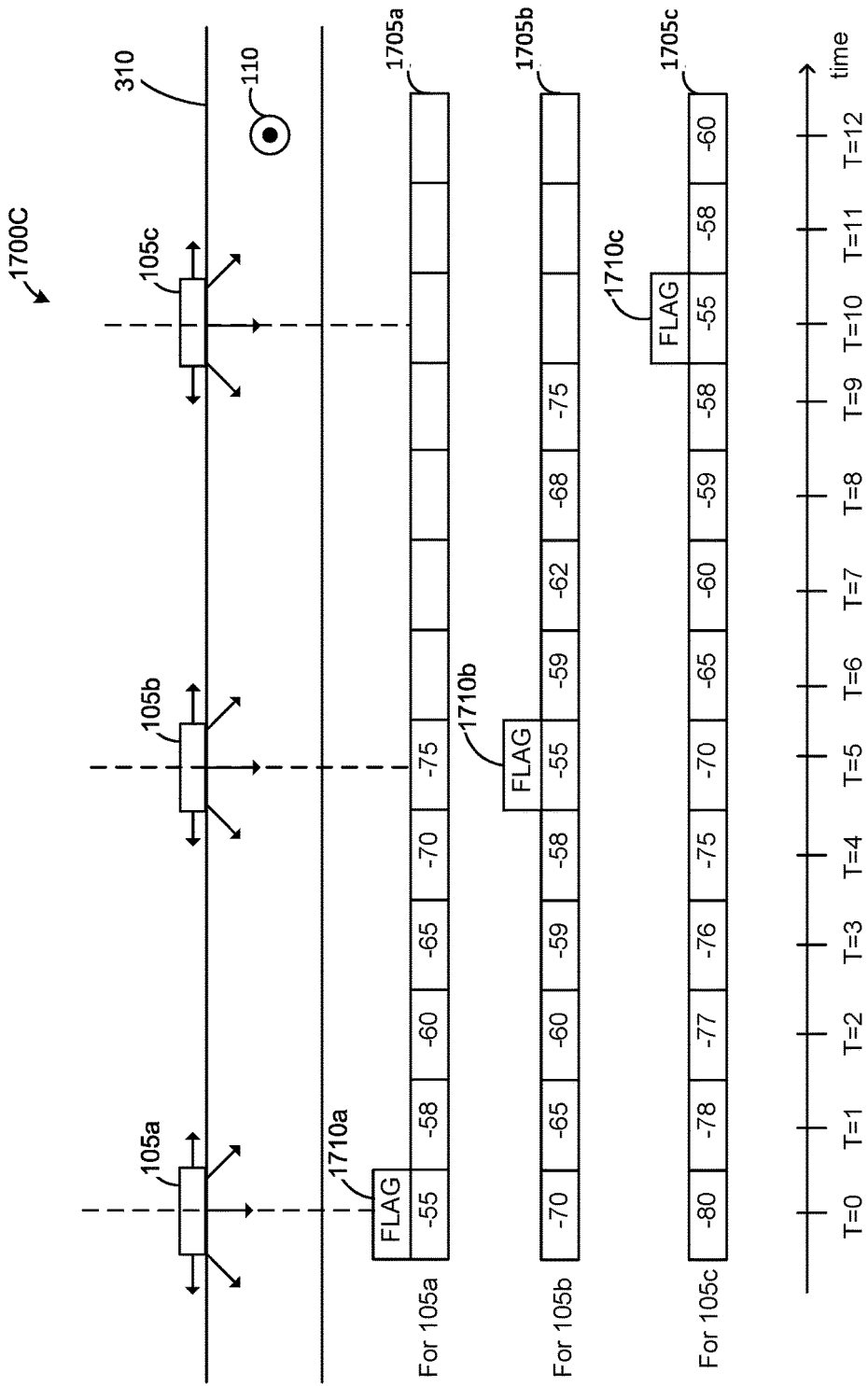
FIG. 17C illustrates a production line with a system for tracking the position of a mobile receiver in accordance with an example embodiment.

Reference will now be made to FIG. 8A, which illustrates an example method 800A of tracking the position of a mobile receiver 110 on a production line. To illustrate the example method of flowchart 800A, simultaneous references will be made to FIGS. 17A, 17B, and 17C, which illustrate a production line 1700A, 1700B, 1700C in accordance with an example embodiment. The embodiment of tracking the position of a mobile receiver 110 on a production line, as illustrated in FIGS. 17A to 17C, compares successively recorded signal strengths of information signals 120 received from a given location tag 110 and subsequently creates interim event entries indicating interim maximum signal strengths. Once a production run cycle has completed, there will be as many remaining event entries as location tags 105 on the production line 1700. Method 800A will be described in greater detail below.

FIGS. 17A, 17B, and 17C each illustrate a production line with a mobile receiver 110 at a specific point in time. FIG. 17A illustrates a mobile receiver 110 located adjacent a location tag 105a at a specific point in time, T=0. FIG. 17B illustrates a mobile receiver 110 located adjacent a location tag 105b at a specific point in time, T=5. FIG. 17C illustrates a mobile receiver 110 at a position when the mobile receiver 110 is passing a location tag 105c at a specific point in time, T=10.

As illustrated in FIGS. 17A, 17B, and 17C, signal strengths of information signals 120 received from each of the respective location tags 105 are illustrated. For example, the signal strength array 1705a correspond to signal strengths of successively received information signals 120 from location tag 105a as the mobile receiver 110 approaches, passes, and moves away from the location tag 105a. The signal strength array 1705b correspond to signal strengths of successively received information signals 120 from location tag 105b as the mobile receiver 110 approaches, passes, and moves away from the location tag 105b. The signal strength array 1705c correspond to signal strengths of successively received information signals 120 from location tag 105c as the mobile receiver 110 approaches, passes, and moves away from the location tag 105c.

When the mobile receiver 110 is located outside a signal reception range of a location tag 105 such that the mobile receiver 110 is unable to detect information signals 120 transmitted by a location tag 105, there may not be a recorded signal strength in the signal strength arrays 1705 at those particular points in time. The blank spaces in the recorded signal strengths 1705a, 1705b, 1705c represent points in time when the mobile receiver 110 has not yet passed a location tag 105 or was unable to detect or receive information signals 120 from respective location tags 105.

Referring again to the method 800A of FIG. 8A, at 830A, for each location tag 105, a comparison may be made between a signal strength of the at least one information signal 120 received at the mobile receiver 110 to a signal strength of a previously received information signal 120 from the same location tag 105.

At 840A, for one complete run, it is continuously determined if the signal strength of the newly received information signal is greater than the signal strength of the previously received information signal from the same location tag. For example, referring to FIG. 17B, at 840A it is determined if the signal strength (−58 dBm) in the signal strength array 1705a at T=1 is greater than the signal strength (−55 dBm) in the signal strengths array 1705a at T=0. Similarly, with reference to signal strength array 1705b, it is determined if the signal strength (−65 dBm) in the signal strength array 1705b at T=1 is greater than the signal strength (−70 dBm) in the signal strengths array 1705b at T=0. In this embodiment illustrated herein, this process is continuously carried out until the end of one complete run. In some other embodiments, the process may be carried out until the expiry of some other predetermined time period.

In some embodiments, as the mobile receiver 110 traverses along the production line 1700, as described with reference to steps 830A and 840A, a comparison of a subsequent signal strength may be carried out with a prior signal strength. If a subsequent signal strength is greater than a prior recorded signal strength, an interim local maximum may be found and a new interim event entry may be generated. For each signal strength array 1705a, 1705b and 1705c, the signal strength designated as an interim local maximum evolves over time as more information signals 120 are received. When the mobile receiver 110 completes a cycle of the production line 1700, each signal strength array 1705a, 1705b and 1705c comprises one local maximum each. It will be understood that local maximums may be defined as the largest signal strength in a sequence of signal strengths when received over a period of time, where the period of time may be defined as a function of time it takes to complete one complete run of the production line, or time it takes for the mobile receiver to pass a predetermined number of location tags 105, or any other predetermined time.

At 850, an event entry is generated. Generating an event entry identifies the signal strength determined to be a local maximum value in a given signal strength array. For example, as illustrated in FIG. 17C, three event entries are generated, with the first event entry 1710a generated for location tag 105a, the second event entry 1710b generated for location tag 105b and the third event entry 1710c generated for location tag 105c.

Referring again to FIG. 17A, the mobile receiver 110 is illustrated to be adjacent to a location tag 105a at a specific point in time, T=0, where the mobile receiver 110 receives information signal 120 from the location tag 105a. Further, at time, T=0, the mobile receiver 110 also receives detectable information signals 120 from location tags 105b and 105c. At time, T=0, the signal strengths of each of the information signals 120 received from each of the three location tags 105a, 105b and 105c, are assumed to be interim local maximum values. Accordingly, an interim event entry 1710a, 1710b and 1710c are generated for corresponding location tags 105a, 105b and 105c. In various embodiments, an interim event entry may include a signal strength of the information signal 120, and a location tag identifier for the location tag 105 from which the information signal 120 was received, and an indicator, e.g. a flag indicator, indicating that the corresponding signal strength is determined to be an interim local maximum value.

As the mobile receiver 110 advances through the production line 1700, signal strengths may be recorded for each of the information signals 120 received from the respective location tags 105 at specific points in time (e.g. T=1, T=2, etc.). As well, interim local maximum determination may be carried out for each specific point in time by comparing the flagged entry (i.e. a signal strength determined to be an interim local maximum) to a subsequently received signal strength entry. If an interim local maximum is identified, an interim event entry may be generated.

In FIG. 17B, the mobile receiver 110 is positioned adjacent a location tag 105b at a specific point in time, T=5. At T=5, as shown in signal strength arrays 1705a, 1705b, 1705c corresponding to the location tags 105a, 105b, 105c, the mobile receiver 110 receives an information signal 120 from location tag 105a with signal strength of −75 dBm, an information signal 120 from location tag 105b with signal strength of −55 dBm and an information signal 120 from location tag 105c with signal strength of −70 dBm. Once again, at time T=5, for each signal strength array, a comparison is made between the newly recorded signal strength at T=5, and the signal strength previously determined to be an interim local maximum at T=4. At T=4, the signal strength entry −55 dBm (at T=0) continues to be an interim local maximum for signal strength array 1705a, the signal strength entry −58 dBm (at T=4) becomes an interim local maximum for signal strength array 1705b, and the signal strength entry −75 dBm (at T=4) becomes an interim local maximum for signal strength array 1705c. These interim local maximum are compared against respective newly received signal strengths at T=5 to determine the new interim local maximum value. Accordingly, at T=5, the signal strengths of the information signals 120 received at T=5 from both the location tags 105b and 105c become the new interim local maximum values.

FIG. 17C similarly illustrates the recorded interim local maximum and interim event entry data at time T=12. At time T=12, the mobile receiver 110 has traversed three location tags 105a, 105b and 105c. At this time, each of the three signal strength arrays 1705a, 1705b and 1705c, corresponding to location tags 105a, 105b and 105c respectively, have an interim local maximum value and a corresponding interim event entry data. In some cases, time T=12 may signify the end of the mobile receiver run on the production line. In some other cases, time T=12 may signify a time of interest where an operator may be interested to know the position of the mobile receiver 110 on the production line. In some further cases, time T=12 may signify a time of interest where an operator may be interested to know those points in time when the mobile receiver 110 was at a minimum distance from each of the location tags 105*a*, 105*b* and 105*c*. In some other embodiments, time T=12 may signify some other time of interest. At the time of interest, the signal strength values designated as interim local maximums are determined to be local maximum values, and corresponding event entries are generated for these local maximum values. As illustrated in FIG. 17C, the event entries 1710*a*, 1710*b*, 1710*c* of FIG. 17C indicate positions on the production line 1700 where the mobile receiver 110 had reached a minimum distance with respect to each one of the location tags 105*a*, 105*b* and 105*c*. The signal strength of the information signals 120 received from each one of the location tags 105*a*, 105*b* and 105*c* at those points in time are designated as local maximum values.

Overall, as illustrated in the example embodiment of FIGS. 17A, 17B, and 17C, after the mobile receiver 110 has traversed the production line 1700C, the number of flags 1710 indicating local maximums will be equal to the number of location tags 105 on the production line. As illustrated in the example of FIGS. 17A to 17C, the method 800A determines only one local maximum per location tag 105 per production line 1700 cycle.

Reference is next made to FIG. 8B, which illustrates a method 800B of tracking the position of a mobile receiver 110 on a production line. As previously described, steps 810, 820, and 850 of FIG. 8B are analogous to steps 210, 220, and 250A of FIG. 2B. Method 800B may determine whether signal strength of an information signal 120 has reached a maximum value by comparing the signal strength of the information signal 120 to one or more signal strength threshold values.

At 830B, the signal strength of the at least one information signal 120 is compared to a pre-determined signal strength threshold value.

At 840B, a determination is made on whether the signal strength of the at least one information signal exceeds the pre-determined signal strength threshold value. If the signal strength of the at least one information signal is determined to have exceeded the pre-determined signal strength threshold value, the signal strength is determined to be a local maximum value, and a corresponding event entry is accordingly generated at 850.

For example, the mobile receiver 110 or external processor 115 may be configured to setup a maximum signal strength value as −60 dBm. Signal strengths below −60 dBm, such as −65 dBm, may not be found to have reached the maximum signal value. In contrast, a signal strength such as −58 dBm may be found to have reached a signal strength threshold value.

In some embodiments, the measured signal strength of a received information signal 120 may correspond to a distance measurement between a mobile receiver 110 and a location tag 105. In such embodiments, a threshold value or a maximum signal strength value may be expressed in terms of distance. For example, a mobile receiver 110 may be configured to record a signal strength value of −60 dBm and −70 dBm to correspond to distance measurements of 1 meter and 2 meters, respectively. The mobile receiver 110 may also be configured to record a threshold value of 1 meter, whereby if the distance between the mobile receiver 110 and the location tag 105 is determined to be less than 1 meter, the threshold value is determined to have been reached or exceeded.

In other embodiments, as previously discussed, a distance between a mobile receiver 110 and a location tag 105 may be approximately determined through a nonlinear relationship. For example, an exponential, polynomial, or other non-linear relationship may provide greater accuracy in determining the relationship between signal strengths of information signals 120 and distance between a mobile receiver 110 and location tags 105.

Reference is next made to FIG. 8C, which illustrates another method 800C of tracking the position of a mobile receiver 110 on a production line. As previously described, steps 810, 820, and 850 of FIG. 8C are analogous to steps 210, 220, and 250A of FIG. 2B. Method 800C may determine whether the signal strength of an information signal 120 has reached a maximum value by retroactively examining the signal strength values corresponding to successively received information signals 120.

At 830C, the signal strength of the at least one information signal 120 is compared to the signal strengths of a plurality of information signals 120 received from a same location tag 105 as the at least one information signal 120.

At 830D, upon comparison of signal strengths of a plurality of information signals 120, an information signal 120 having the highest signal strength value is identified.

In some embodiments, the mobile receiver 110 may successively receive information signals 120 from location tags 105. As the mobile receiver 110 approaches and moves past a location tag 105, the successively received information signals 120, having different signal strengths, from the same location tag 105 may be recorded and analyzed. The mobile receiver 110 may identify the information signal 120 with the highest signal strength value within the set of received information signals 120. The information signal 120 having the highest signal strength value may correspond to a point in time when the mobile receiver 110 is closest to the location tag 105.

In addition to the various embodiments illustrated in FIGS. 8A-8C, other ways of determining when a mobile receiver 110 is closes to a location tag 105 may be used. For example, in one embodiment, the mobile receiver 110 may utilize a mathematical function to calculate the distance between a location tag 105 and the mobile receiver 110. Subsequently, the mobile receiver 110 may identify a maximum value based upon distance values provided by the mathematical function. In some cases, a mathematical function may take into account production line environmental factors and historical signal strength data. It will be understood that although the previously described embodiments describe methods of locating local maximums with respect to signal strength and distance, methods of locating local maximums may also be made with respect to any other parameter derived from a signal strength of an information signal 120.

Figure 9A:
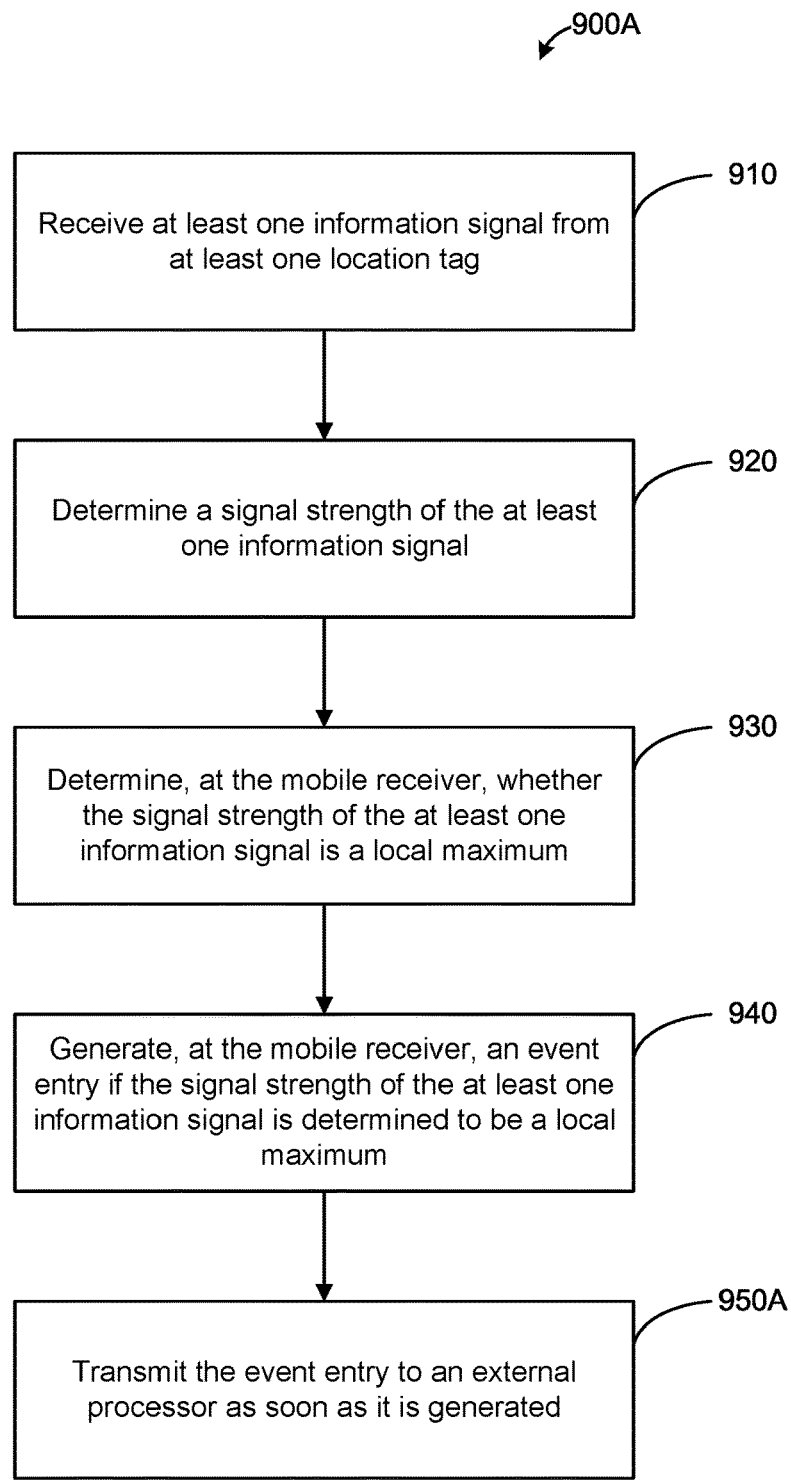
FIG. 9A is an example embodiment of a method for tracking the position of a mobile receiver on a production line.
Figure 9B:
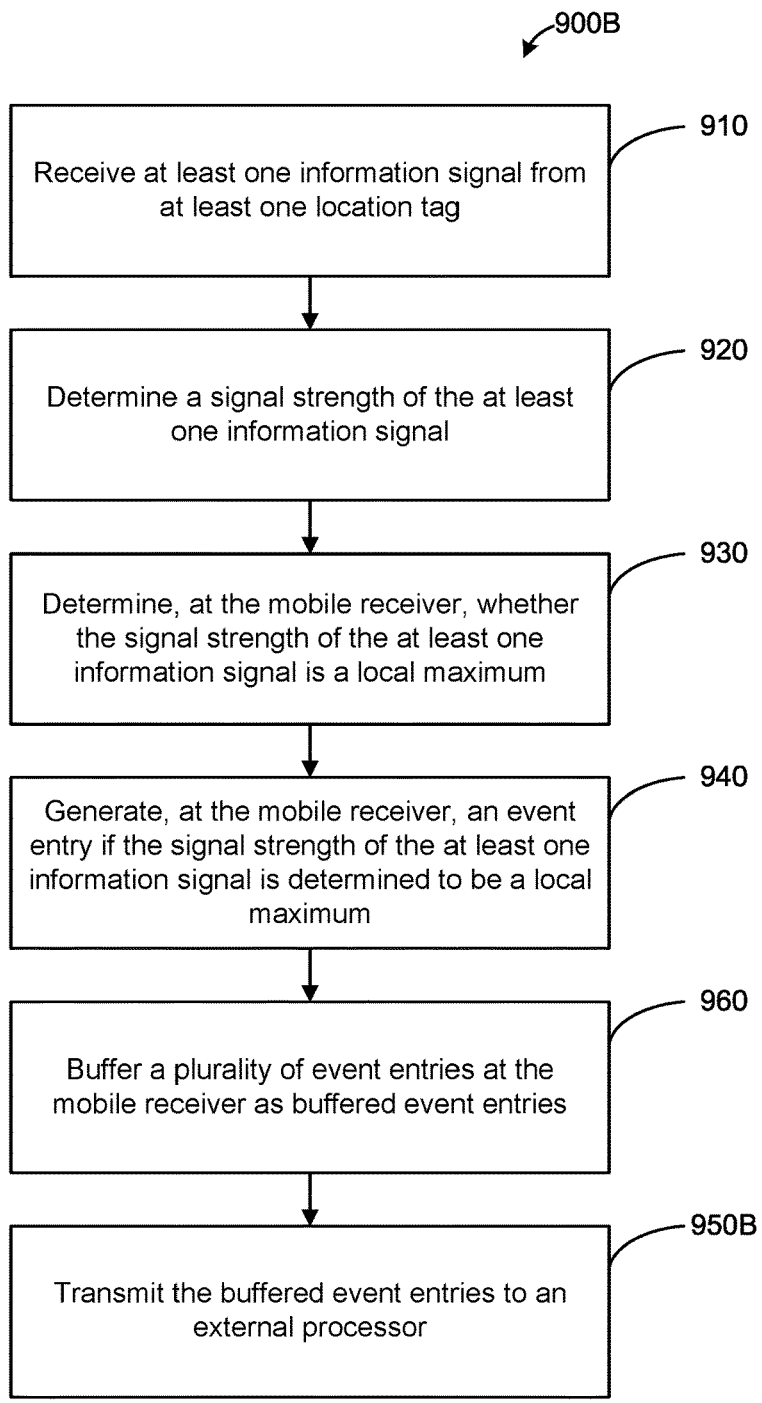
FIG. 9B is another example embodiment of a method for tracking the position of a mobile receiver on a production line.
Figure 9C:
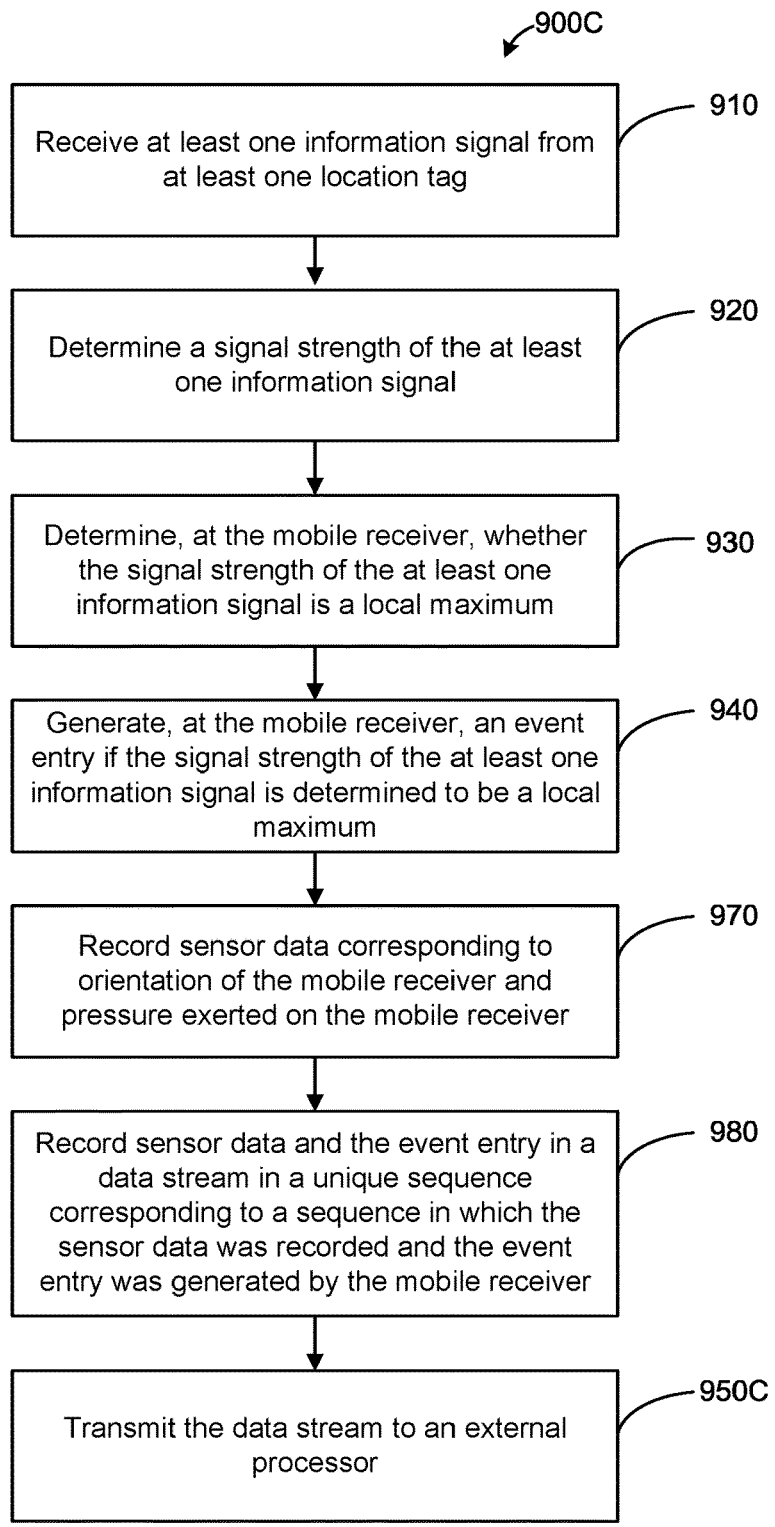
FIG. 9C is a further example embodiment of a method for tracking the position of a mobile receiver on a production line.

Reference will now be made to FIGS. 9A, 9B, and 9C, which illustrate example methods of tracking the position of a mobile receiver 110 on a production line. The flowcharts 900A, 900B, and 900C correspond to FIGS. 9A, 9B and 9C, respectively. Each of the flowcharts 900A, 900B and 900C generally correspond to method 200C of FIG. 2C. In particular, steps 910, 920, 930, and 940 of FIGS. 9A, 9B and 9C are analogous to steps 210, 220, 240B, and 250B of FIG. 2C. As will be discussed, flowcharts 900A, 900B and 900C illustrate different ways of recording that the signal strength of the information signal 120 may be a local maximum.

In the various embodiments illustrated in FIGS. 9A, 9B and 9C, if the mobile receiver 110 determines that the signal strength of the information signal is a local maximum, at step 940, the mobile receiver 110 may be configured to generate an event entry. The event entry may indicate that the mobile receiver 110 has reached a minimum distance with respect to the at least one location tag 105 transmitting the at least one information signal 120 having the signal strength determined to be a local maximum.

Referring to FIG. 9A, at 950A, the mobile receiver may transmit the event entry to an external processor 115 as soon as the event entry is generated. For example, the mobile receiver may transmit the event entry to the external processor 115 in real-time.

In another embodiment, as illustrated in FIG. 9B, at 960, the mobile receiver 110 may buffer a plurality of event entries at the mobile receiver 110 as buffered event entries. For example, the mobile receiver 110 may be configured to buffer the generated event entries until a mobile receiver run on the production line is complete. In some other cases, the mobile receive 110 may be configured to buffer the generated event entries for an entire day, or a week, or some other predetermined duration of time etc. At 950B, the mobile receiver 110 transmits the buffered event entries to the external processor 115.

In another embodiment, as illustrated in FIG. 9C, the mobile receiver 110 is configured to measure and record sensor data representing data corresponding to the motion and orientation of the mobile receiver 110, and pressure exerted on the mobile receiver 110. In such embodiments, at 970, the mobile receiver 110 records sensor data corresponding to the orientation of the mobile receiver and pressure exerted on the mobile receiver.

At 980, the mobile receiver 110 combines sensor data and event entries in a data stream in a unique sequence corresponding to a sequence in which the sensor data was recorded and the event entry was generated by the mobile receiver 110. Examples of data streams are illustrated in further detail with reference to FIG. 10B below.

At 950C, the mobile receiver 110 transmits the uniquely assembled data stream to the external processor 115.

In such embodiments, the mobile receiver 110 may be implemented in accordance with FIG. 5C. The data consolidation module 570 illustrated in FIG. 5C may be configured to associate event entries with pressure sensor and motion/orientation sensor data. An example of associating event entries with sensor data to generate a data stream is described with reference to FIG. 10B below.

Figure 10B:
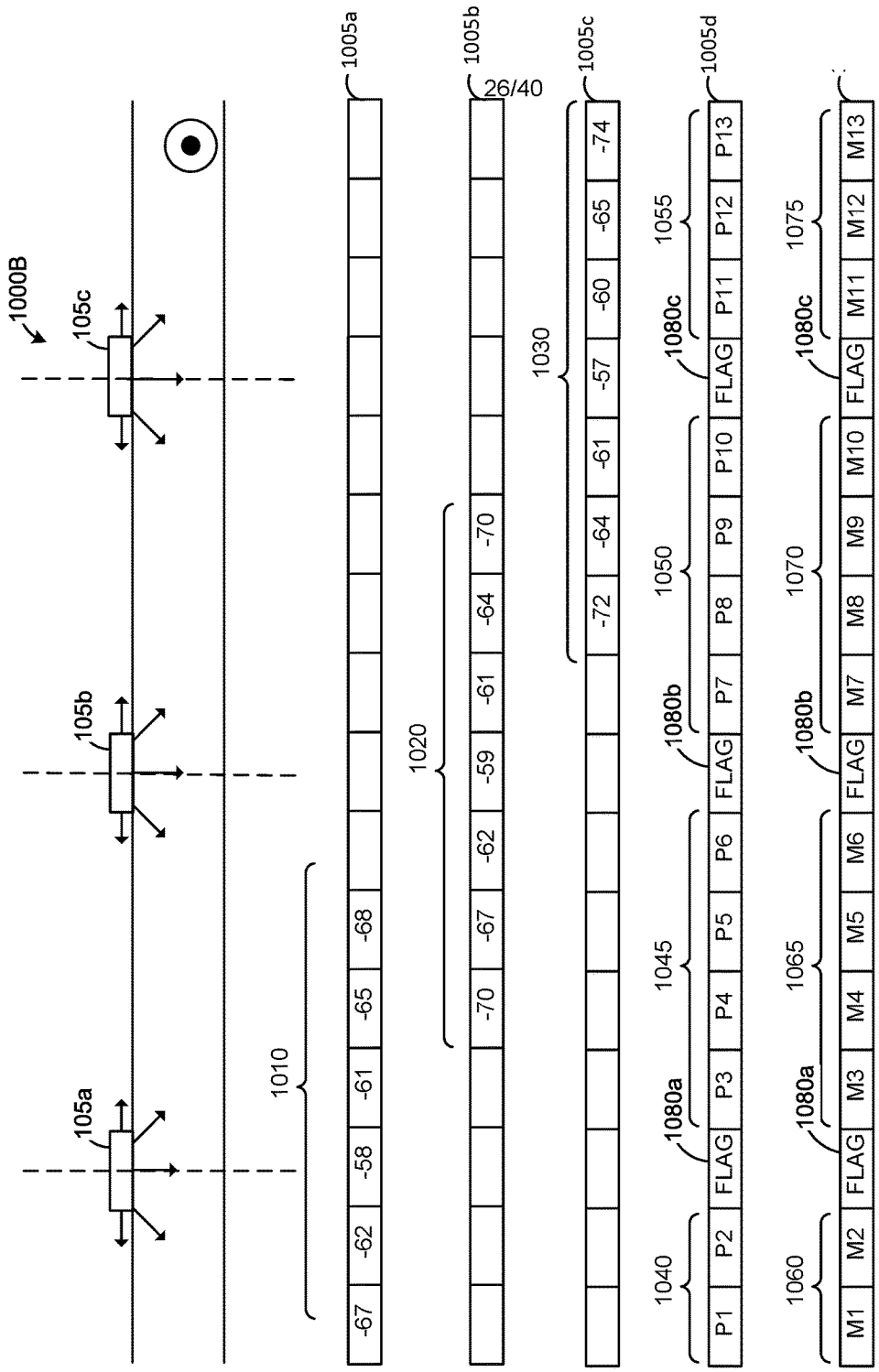
FIG. 10B illustrates a production line with a system for tracking the position of a mobile receiver and corresponding recorded data in accordance with another example embodiment.

Similar to FIG. 10A, FIG. 10B illustrates signal strength values 1010, 1020 and 1030 corresponding to signal strengths recorded for information signals 120 received from location tags 105a, 105b and 105c respectively. FIG. 10B further illustrates a pressure sensor data array 1005d and a motion sensor data array 1005e, where the pressure sensor data array 1005d illustrates the data recorded by the mobile receiver 110 regarding the pressure exerted on the mobile receiver 110 and the motion sensor data array 1005e illustrates the data recorded by the mobile receiver 110 regarding the motion or orientation of the mobile receiver 110.

The pressure sensor data array 1005d is a data stream comprising pressure sensor data entries 1040, 1045, 1050 and 1055 separated by event entries 1080a, 1080b and 1080c. Similarly, the motion sensor data array 1050e is a data stream comprising motion sensor data entries 1060, 1065, 1070, 1075 separated by event entries 1080a, 1080b and 1080c.

The event entries 1080a, 1080b, 1080c are recorded at specific points in time when the mobile receiver 110 is closest to specific location tags 105. That is, flags 1080a, 1080b, 1080c are recorded at points in time corresponding to local maximums in the signal strength arrays 1005a, 1005b, 1005c. The local maximums may be determined by the various methods described herein.

The event entries 1080a, 1080b and 1080c may be used to associate sensor data to unique regions of the production line. For example, the set of recorded pressure sensor data 1045 and recorded motion sensor data 1065 may be distinguished from other recorded pressure sensor data 1040, 1050, 1055 and other recorded motion sensor data 1060, 1070, 1075 in the sense that the recorded pressure sensor data 1045 and the recorded motion sensor data 1065 corresponds to the region between the location tag 105a and 105b on the production line.

By collecting and analyzing recorded data 1005a, 1005b, 1005c, 1005d, 1005e, unexpected pressure sensor data and/or motion sensor data values may be identified. For example, unexpected pressure sensor data values and/or motion sensor data values may be data values outside pre-established and acceptable ranges for a production line 1000A, 1000B. Because corresponding regions on a production line 1000A, 1000B may be identified, problematic regions of interests may be accurately identified. A production line operator may adjust production line apparatus or processes to minimize identified undesirable effects of pressure and motion exerted on the mobile receiver 110 and other articles 105 on the production line 1000A, 1000B.

Although FIG. 10B illustrates a pressure sensor data array 1005d and a motion sensor data array 1005e, it will be understood that other types of data may be recorded by the mobile receiver 110 as the mobile receiver travels through a production line 1000 and may similarly be recorded and/or associated with event entries as illustrated by the embodiment in FIG. 10B.

Furthermore, even though FIG. 10B illustrates a first data stream, corresponding to pressure sensor data array 1005d, comprising pressure sensor data and event entry data, and a second data stream, corresponding to motion sensor data array 1005e, comprising motion sensor data and event entry data, a data stream comprising a combination of motion sensor data, pressure sensor data and event entries may also be generated by the mobile receiver at 980 in FIG. 9C.

Figure 11:
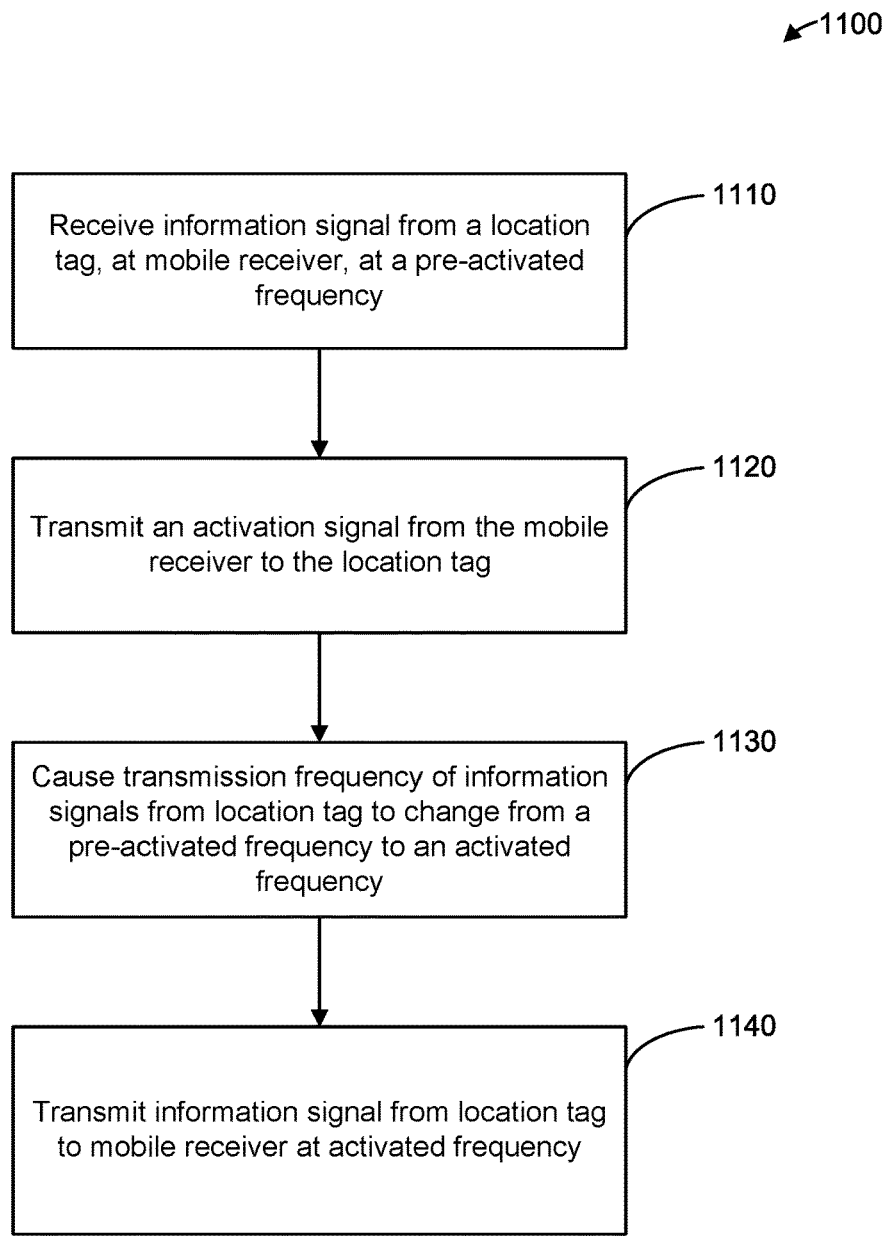
FIG. 11 is an example embodiment of a method of changing transmission frequencies of information signals.

Reference is now made to FIG. 11, which illustrates an example method 1100 of causing a location tag 105 to change a transmission frequency of information signals from a pre-activated frequency to an activated frequency.

At 1110, a mobile receiver 110 may receive information signals 120 from location tags 105 at a pre-activated frequency. For example, a pre-activated frequency may be contrasted with an activated frequency. A pre-activated frequency may be a lower frequency than an activated frequency. In an example, a location tag 105 may transmit pre-activated information signals 120 at a 1 Hz frequency. In contrast, the location tag 105 may transmit activated information signals 120 at a 50 Hz frequency. In some embodiments, location tags 105 may be configured to transmit information signals 120 at an activated frequency only when a mobile receiver 110, placed on the conveyor belt 310, may be passing the location tag 105. When the mobile receiver 110 is not near a location tag 105, location tags 105 may endeavor to achieve power savings by transmitting information signals 120 at a lower frequency, or at a pre-activated frequency. By transmitting information signals 120 at a lower frequency, the location tag 105 battery levels may be conserved for use when the location tag 105 transmits information signals 120 at a higher frequency.

At 1120, the mobile receiver 1120 may transmit activation signals 125 to location tags 105 from which the pre-activated information signals 120 were received. If the mobile receiver 110 received only one pre-activated information signal 120, the mobile receiver 110 may only send one activation signal 125 to the location tag 105 from which the pre-activated information signal 120 was sent.

If the mobile receiver 110 simultaneously received two or more pre-activated information signals 120, the mobile receiver 110 may send an activation signal 125 to each of the location tags 105 from which the pre-activated information signals 120 were transmitted.

At 1130, the location tags 105 receiving activation signals 125 may alter the frequency or rate of transmission of the information signal 120. For example, the location tag 105 may increase the frequency of information signal 120 transmission from a pre-activated frequency to an activated frequency. Accordingly, location tags 105 may be configured to transmit information signals 120 at an activated frequency based on whether a mobile receiver 110 is nearby. By throttling the frequency at which information signals 120 are transmitted, location tags 105 may conserve battery power when a mobile receiver 110 is not nearby.

In some embodiments, location tags 105 may increase the frequency of transmission of the information signal 120 to increase the mobile receiver 110 location tracking resolution. For example, when a mobile receiver 110 is nearby a location tag 105, a greater number of received information signals 120 signals may assist a mobile receiver 110 to determine with greater precision when the signal strength of information signals 120 has reached a maximum value, and accordingly, when the mobile receiver 110 is closest to the location tag 105.

At 1140, location tags 105 may transmit activated information signals 120 at an activation frequency.

Figure 12:
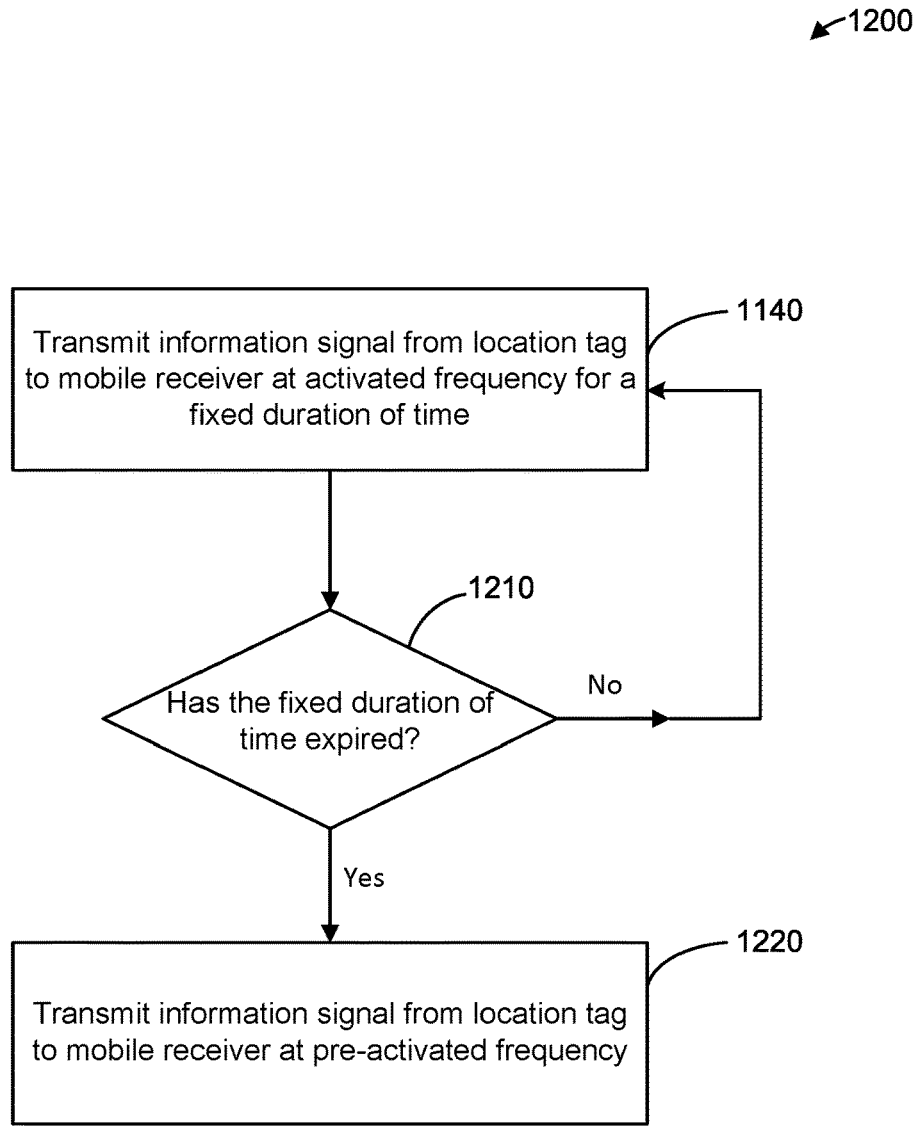
FIG. 12 is another example embodiment of a method of changing transmission frequencies of information signals.

Reference is now made to FIG. 12, which illustrates an example method 1200 of determining when a location tag 105 may switch from transmitting information signals 120 at an activated frequency to transmitting information signals 120 at a pre-activated frequency.

At 1140, a location tag 105 may transmit information signals 120 at an activated frequency for a fixed duration of time. The fixed duration of time may be setup based on empirical data of production line characteristics. For example, the fixed duration of time may correspond to the conveyor belt 310 rate of speed and the location tag 105 information signal 120 transmission power. In some cases, it may be desirable for location tags 105 to transmit information signals 120 only when a mobile receiver 110 may be within a signal reception vicinity. Knowing the conveyor belt 310 rate of speed and the location tag 105 information signal 120 transmission power, location tags 105 may be setup to transmit information signals 120 at an activated frequency for a fixed duration of time beginning after an activation signal 125 is received from a mobile receiver 110. For example, the amount of time it will take for a mobile receiver 110 travel through a signal reception range of a specific location tag 110 may be calculated if the width of the signal reception range and the rate of speed of the mobile receiver 110 is known.

At 1210, location tags 105 may determine whether the fixed duration of time has expired. If the fixed duration of time has not yet expired, the location tag 105 may continue to transmit information signals 120 at an activated frequency.

If the fixed duration of time has expired, at 1220, location tags 105 may subsequently transmit information signals 120 at a pre-activated frequency. When the fixed duration of time has expired, a mobile receiver 110 may already be moving away from a given location tag 105 and may be unable to receive information signals 120 from the given location tag 105 with sufficient signal power. Accordingly, the location tag 105 may switch from an activated frequency to a pre-activated frequency of transmission to conserve battery power. If a mobile receiver 110 were still within a signal receiving range, the location tag 105 may continue to receive activation signals 125 and may continue to transmit information signals 120 at an activated frequency.

Figure 13:
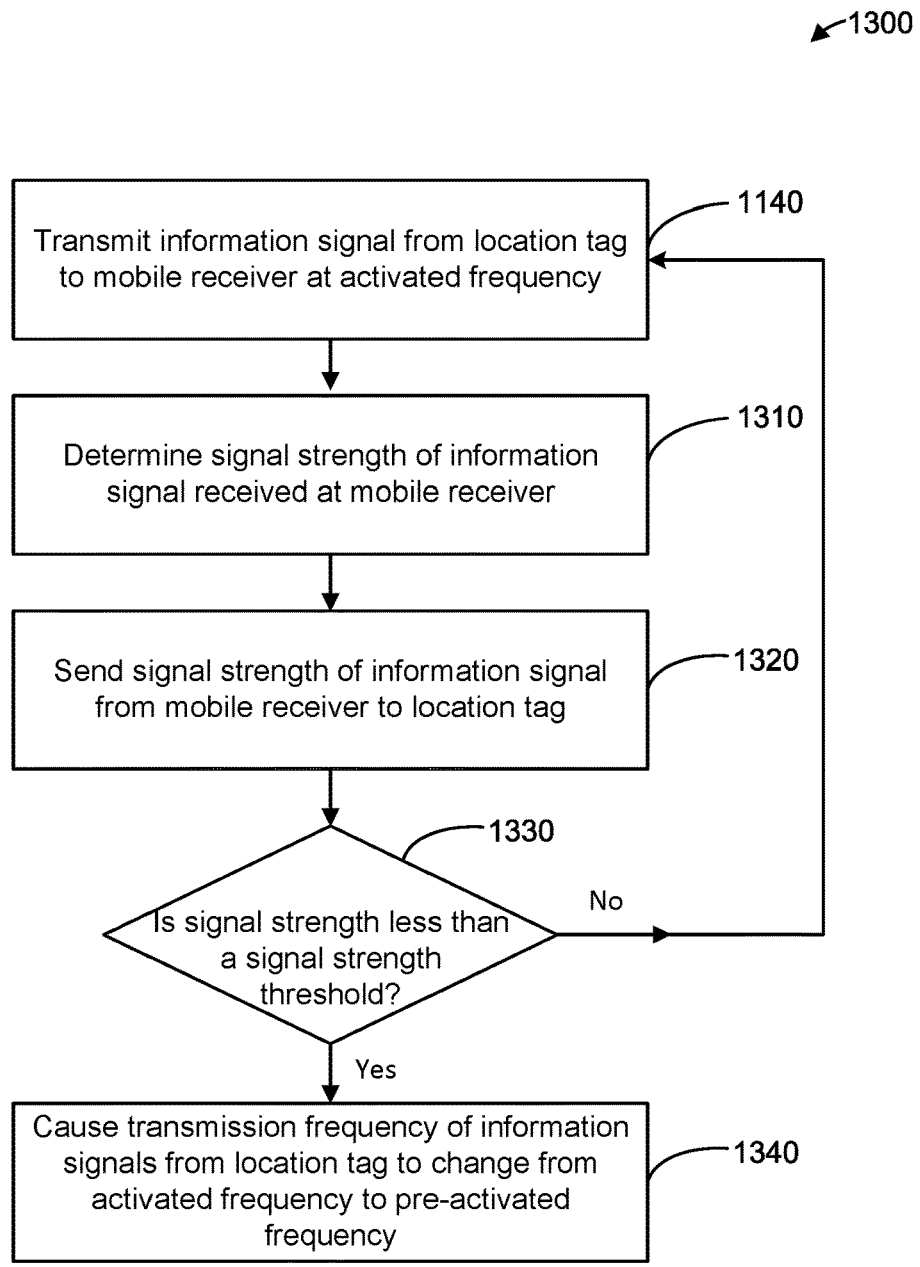
FIG. 13 is a further example embodiment of a method of changing transmission frequencies of information signals.

Reference is now made to FIG. 13, which illustrates an example method 1300 of determining when a location tag 105 may switch from transmitting information signals 120 at an activated frequency to transmitting information signals 120 at a pre-activated frequency. Location tags 105 of example method 1300 may transition from transmitting at an activated frequency to transmitting at a pre-activated frequency based upon signal strengths.

At 1140, location tag 105 transmits information signals 120 at an activated frequency. As previously described, an activated frequency may be distinguished from a pre-activated frequency. An activated frequency may be greater than a pre-activated frequency.

At 1310, a mobile receiver 110 may determine the signal strength of received information signals 120.

At 1320, the mobile receiver 110 may transmit the signal strengths to the location tag 105 from which the information signals 120 were received.

At 1330, the location tag 105 determines whether the signal strength value received from the mobile receiver 110 is less than a defined signal strength threshold value. The defined signal strength threshold value may correspond to a signal strength indicative of a large distance between a location tag 105 and a mobile receiver 110. If the signal strength value is indicative of a large distance, location tag 105 may determine that the mobile receiver 110 may be moving away from the location tag 105. Accordingly, the location tag 105 may switch from transmitting at an activated frequency to transmitting at a pre-activated frequency.

If the location tag 105 determines that the signal strength value received from the mobile receiver 110 is greater than the defined signal strength threshold, location tag continues to transmit information signals 120 at an activated frequency.

If the location tag 105 determines that the signal strength value received from the mobile receiver 110 is less than the defined signal strength threshold, at 1340, the location tag 105 may change from transmitting information signals 120 at an activated frequency to transmitting information signals 120 at a pre-activated frequency.

In some embodiments, a similar process as illustrated in FIG. 13, i.e. based on signal strength analysis, may be used to switch the transmission frequency of an information signal from a pre-activated transmission frequency to an activated transmission frequency. In other words, a location tag 105 may be configured to switch the transmission frequency from a pre-activated transmission frequency to an activated transmission frequency if the signal strength, as determined at the mobile receiver 110, of the previously transmitted information signal 120 from the location tag 105 is determined to exceed a predetermined threshold.

Figure 14:
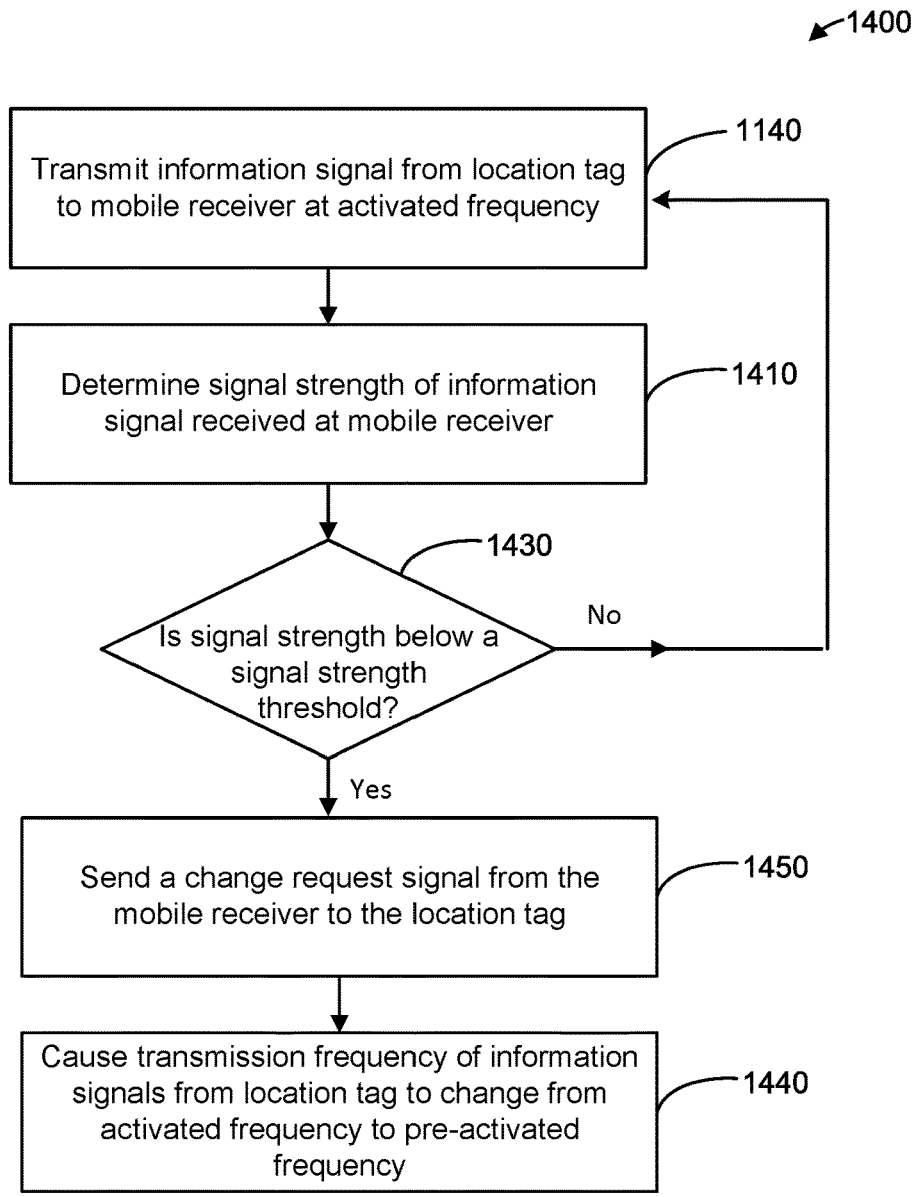
FIG. 14 is another example embodiment of a method of changing transmission frequencies of information signals.

Reference is now made to FIG. 14, which illustrates an example method 1400 of determining when a location tag 105 may switch from transmitting information signals 120 at an activated frequency to transmitting information signals 120 at a pre-activated frequency. Location tags 105 of example method 1400 may transition from transmitting at an activated frequency to transmitting at a pre-activated frequency based upon a change request signal sent from a mobile receiver 110 to the location tags 105.

At 1140, location tag 105 transmits information signals 120 at an activated frequency.

At 1410, a mobile receiver 110 may determine the signal strength of received information signals 120.

At 1430, the mobile receiver 110 may determine whether the signal strength of received information signals 120 is less than a defined signal strength threshold. Similar to step 1330 of FIG. 13, the signal strength threshold value may correspond to a signal strength indicative of a large distance between a location tag 105 and a mobile receiver 110.

If the signal strength of received information signals 120 is greater than the defined signal strength threshold, the mobile receiver 110 may be within a proximal distance to the location tag 105.

If the signal strength of received information signals 120 is less than the defined signal strength threshold, at 1450, the mobile receiver 110 may transmit a change request signal to location tags 105 from which the information signals 120 were received. The mobile receiver 110 may send the change request signal to indicate that the location tag 105 may transition from transmitting information signals 120 at an activated frequency to a pre-activated frequency.

In some embodiments, the change request signal may be an alternative to sending an activation signal 125. That is, the mobile receiver 110 may send an activation signal 125 to location tags 105 to indicate a change of transmitting information signals 120 from a pre-activated frequency to an activated frequency. The mobile receiver 110 may send a change request signal to location tags 105 to indicate a change of transmitting information signals 120 from an activated frequency to a pre-activated frequency. In such an embodiment, the activation signal is sent from the mobile receiver 110 to the location tag 105 if the signal strength of an information signal from the location tag is determined to exceed a predetermined threshold.

At 1440, when the location tag 105 receives a change request signal, the location tag 105 may cause the transmission frequency of information signals to change from an activated frequency to a pre-activated frequency.

Figure 15:
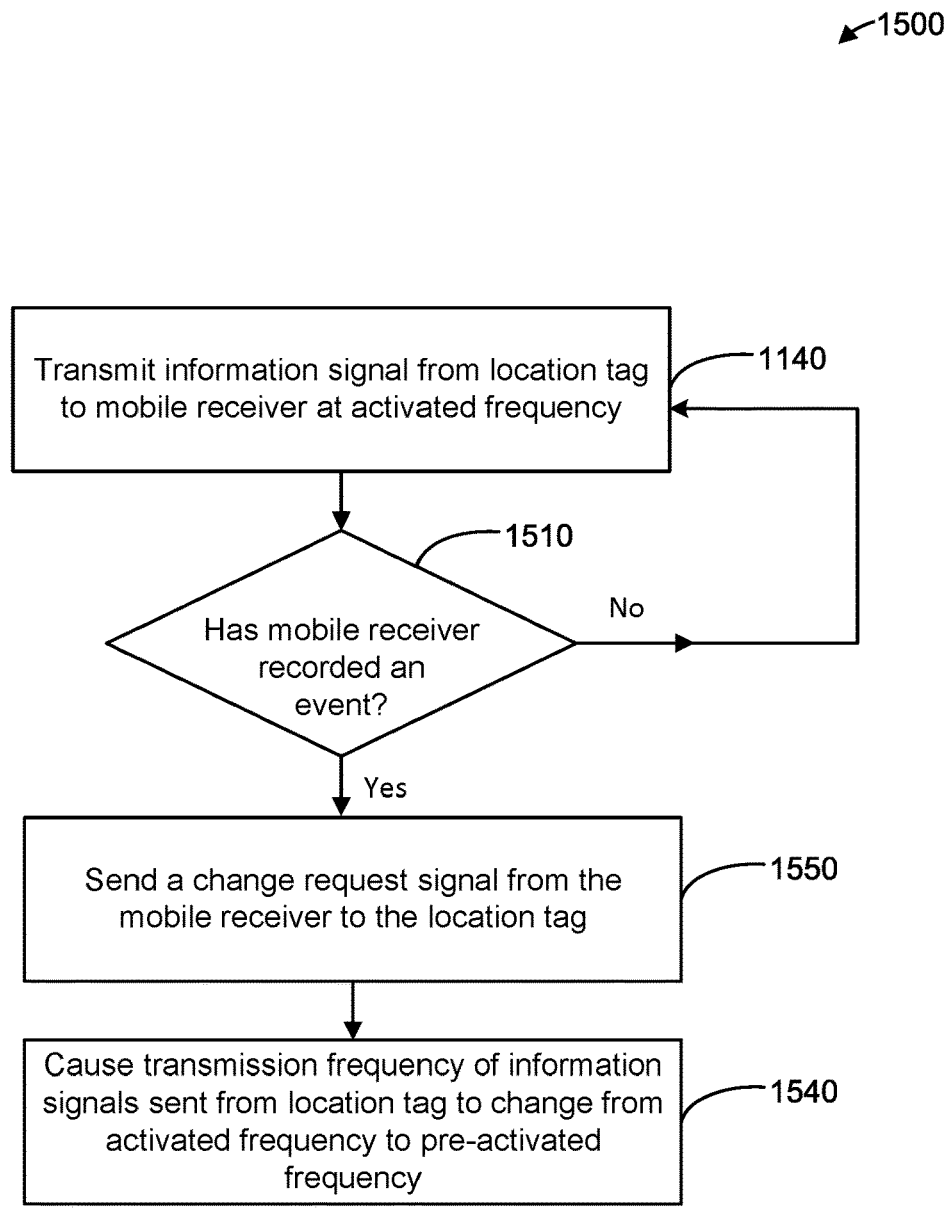
FIG. 15 is another example embodiment of a method of changing transmission frequencies of information signals.

Reference is now made to FIG. 15, which illustrates an example method 1500 of determining when a location tag 105 may switch from transmitting information signals 120 at an activated frequency to transmitting information signals 120 at a pre-activated frequency. Location tags 105 of example method 1500 may transition from transmitting at an activated frequency to transmitting at a pre-activated frequency based on whether an event entry has been recorded.

At 1140, location tag 105 transmits information signals 120 at an activated frequency.

At 1510, a mobile receiver 110 may determine whether an event entry has been recorded. As previously described, an event entry indicates that a mobile receiver 110 has reached a minimum distance with respect to at least one location tag 105 transmitting at least one information signal 120 having a signal strength determined to be a local maximum.

Recording of an event entry relating to a specific location tag 105 may indicate that the mobile receiver 110 may be traversing the production line and moving away from the location tag 105. Accordingly, once an event entry corresponding to a location tag 105 is recorded, a location tag 105 may switch from transmitting at an activated frequency to a pre-activated frequency to conserve battery power.

If an event entry relating to a specific location tag 105 has not yet been recorded, the location tag 105 may continue to transmit information signals 105 at an activated frequency.

If an event entry relating to a specific location tag 105 has been recorded, at 1550, the mobile receiver may send a change request signal to the location tag 105. Step 1550 may be analogous to step 1450 in FIG. 14.

At 1540, when the location tag 105 receives a change request signal, the location tag 105 may cause the transmission frequency of information signals to change from an activated frequency to a pre-activated frequency.

It will be understood that although numerous example methods have been described, one or any combination of the methods may be implemented in a system for tracking the position of a location tag 105.

Further, although the embodiments described with reference to FIGS. 11 to 15 relate to a pre-activated frequency and an activated frequency, any number of frequency levels may be implemented in accordance with the methods described herein. In some embodiments, and without limitation, a location tag 105 may be configured to transmit information signals 120 at, for example, three distinct frequencies according to three distinct signal strength thresholds. For example, a location tag 105 may be configured to transmit information signals 120 at 50 Hz when information signals 120 are received at a mobile receiver 110 with a signal strength according to the range of −60 dBm to −56 dBm, at 30 Hz when information signals 120 are received at a mobile receiver 110 with a signal strength according to the range of −65 dBm to −61 dBm, and at 1 Hz when information signals 120 are received at a mobile receiver 110 with a signal strength according to the range of −70 dBm to −66 dBm.

Figure 18:
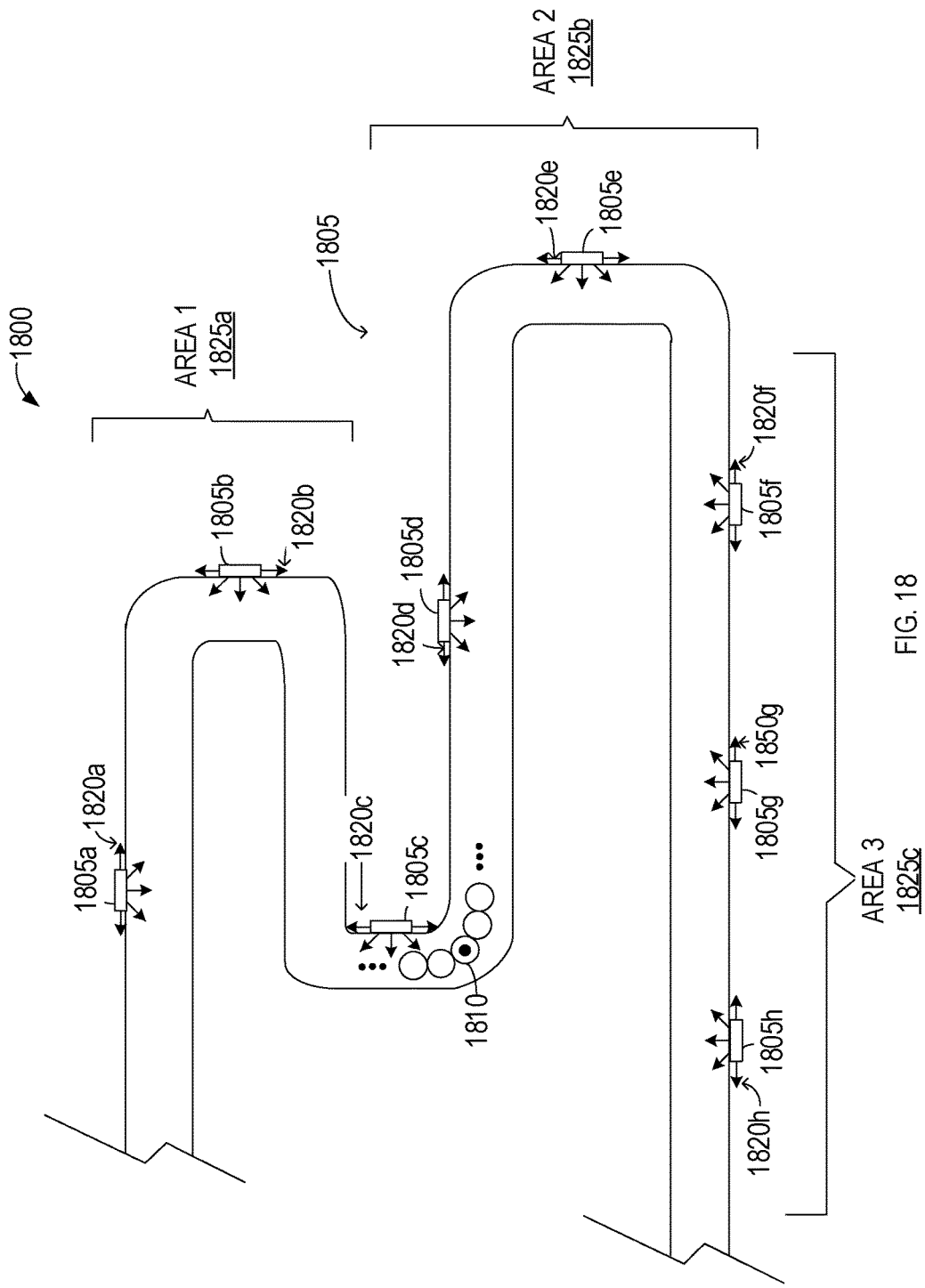
FIG. 18 illustrates a production line with a system for tracking the position of a mobile receiver in accordance with an example embodiment.

Reference is next made to FIG. 18, which illustrates a production line 1800 with a system for tracking the position of a mobile receiver 1810 in accordance with an example embodiment. In the illustrated embodiment of FIG. 18, the production line 1800 is divided into three areas, namely a first area 1825a, a second area 1825b and a third area 1825c. Each area represents a unique portion of the production line 1800. For instance, the first area 1825a may correspond to the cleaning area, where the conveying articles are cleaned before filling and/or packaging. The second area 1825b may correspond to a bottling area (or a filling area) where the conveying articles are filled with content. The third area 1825c may correspond to a packaging area where the conveying articles are packaged. It will be understood that even though only three areas of the production line 1800 are shown here, a production line, such as the production line 1800, can have any number of areas.

In the illustrated embodiment, each area of the production line 1800 comprises one or more location tags 1805. For instance, the first area 1825a includes a first location tag 1805a and a second location tag 1805b. The second area 1825b includes a third location tag 1805c, a fourth location tag 1805d and a fifth location tag 1805e. The third area 1825c includes a sixth location tag 1805f, a seventh location tag 1805g and an eighth location tag 1805h. It will be understood that each area of the production line 1800 may have any number of location tags 1805 associated with it. This determination may be made based on factors such as budgets, desired efficiency, type of conveying articles etc.

The system of tracking the position of the mobile receiver 1810, as illustrated here, can be used to track the precise location of the mobile receiver 1810 on the production line 1800 as a function of time, including information related the area in which the mobile receiver 1810 is at a given time.

As previously discussed, each location tag 1805 transmits an information signal which includes a unique identifier for the location tag 1805. The unique identifier may be in the form of a MAC address, a location tag serial number, a location tag name, or any other identifier that uniquely identifies the location tag from which the information signal originates. For instance, the first location tag 1805*a* transmits information signal 1820*a*, the second location tag 1805*b* transmits information signal 1820*b*, the third location tag 1805*c* transmits information signal 1820*c*, the fourth location tag 1805*d* transmits information signal 1820*d*, the fifth location tag 1805*e* transmits information signal 1820*e*, the sixth location tag 1805*f* transmits information signal 1820*f*, the seventh location tag 1805*g* transmits information signal 1820*g* and the eighth location tag 1805*h* transmits information signal 1820*h*.

At a given time, t=A, the mobile receiver may receive information signals from one or more location tags 1805 located at one or more areas of the production line 1800. For instance, in the illustrated embodiment, the mobile receiver 1810 receives information signals only from location tags 1805*a*, 1805*c*, 1805*d*, 1805*f*, 1805*g* and 1805*h*. Due to the layout of the production line 1800, the mobile receiver 1810, at time A, does not receive information signals from location tags 1805*b* and 1805*e*. In some cases, the signal strengths of the information signals received from the location tags 1805*b* and 1805*e* may be too low that the corresponding location tags are rejected from consideration.

With the above-noted setup of the production line 1800, various methods can be used to identify the precise location of the mobile receiver 1810. In one embodiment, the mobile receiver 1810 determines the signal strengths of the information signals received from the location tags on an area-by-area basis. In the illustrated embodiment, at time A, the mobile receiver 1810 determines the signal strength of the incoming information signal 1820*a* from the first location tag 1805*a* and assigns that signal strength to the first area 1825*a*. Similarly, the mobile receiver 1810 averages the signal strengths of the incoming information signals 1820*c* and 1820*d* from location tags 1805*c* and 1805*d*, and assigns that average signal strength to the second area 1825*b*. Likewise, the mobile receiver 1810 averages the signal strengths of the incoming information signals 1820*f*, 1820*g* and 1820*h* from location tags 1805*f*, 1805*g* and 1805*h*, and assigns the average signal strength to the third area 1825*c*.

The mobile receiver 1810 then compares the average signal strengths of each area, and identifies the area with the highest average signal strength. The area with the highest average signal strength is then concluded to be the area where the mobile receiver 1810 is at time A.

As the mobile receiver 1810 traverses the production line 1800, the mobile receiver 1810 continues to determine the area with the highest average signal strength at a pre-determined frequency to output the location of the mobile receiver 1810 on the production line 1800. As an example of an output in the illustrated embodiment, the mobile receiver 1810 may determine that the mobile receiver 1810 is in the second area 1825*b* at time A. As another example of an output, the mobile receiver 1810 may determine that the mobile receiver 1810 is located at more than one area at the same time. This may be the case when the average signal strengths of two or more areas are equal. On a production line 1800, this may be the case where the mobile receiver 1800 is at a transition point between two areas and is traversing from one area to another.

In another embodiment, the mobile receiver 1810 determines the signal strengths of the information signals received from the location tags on an individual basis. In this embodiment, the mobile receiver 1810 determines the signal strengths of the information signals visible to the mobile receiver 1810, such as, for example, information signal 1820*a* from the first location tag 1805*a*, information signal 1820*c* from the third location tag 1805*c*, information signal 1820*d* from the fourth location tag 1805*d*, information signal 1820*f* from the sixth location tag 1805*f*, information signal 1820*g* from the seventh location tag 1805*g* and information signal 180*h* from the eighth location tag 1805*h*.

In this embodiment, the mobile receiver 1810 treats each location tag individually and based on the signal strength information of the received information signals, the mobile receiver 1810 identifies the location tag corresponding to the highest signal strength. The area of the location tag with the highest signal strength is then concluded to be the area of the mobile receiver 1810. In the illustrated embodiment, the information signal 1820*c* is likely to have the highest signal strength, and accordingly the mobile receiver 1810 is likely to conclude that the mobile receiver 1810 is in the area corresponding to the third location tag 1805*c*, i.e. the second area 1825*b*.

In another embodiment, the mobile receiver 1810 may be configured to identify the number of location tags transmitting information signals with signal strengths above a pre-determined threshold. The mobile receiver 1810 then counts the qualifying location tags and concludes that the mobile receiver 1810 is in the area with the highest count of qualifying location tags.

For instance, in the illustrated embodiment, the pre-determined threshold may be set so that only the first location tag 1805*a*, the third location tag 1805*c*, the fourth location tag 1805*d* and the eighth location tag 1805*h* qualify. In other words, the mobile receiver 1810 determines that only the first location tag 1805*a*, the third location tag 1805*c*, the fourth location tag 1805*d* and the eighth location tag 1805*h* transmit information signals with signal strengths above the pre-determined threshold.

The mobile receiver 1810 then identifies the number of qualifying location tags in each area. In this example, the mobile receiver 1810 identifies that only one location tag 1805*a* qualifies in the first area 1825*a*, two location tags 1805*c* and 1805*d* qualify in the second area 1825*b* and one location tag 1805*h* qualifies in the third area 1825*c*. Based on this determination, the mobile receiver 1810 concludes that since the number of qualifying location tags is highest in the second area 1825*b*, the mobile receiver is in the second area 1825*b*.

It will be understood that even though the mobile receiver 1810 is disclosed to be carrying out all the processing steps, the processing steps may also be carried out by an external processor either exclusively, or concurrently with the mobile receiver 1810.

In various embodiments, once the area in which the mobile receiver is traversing at a point in time is determined, the output report or an output user interface may be adjusted so that only the details of this area are displayed. In some other embodiments, the output report or an output user interface may be adjusted so that the location tags and/or any events triggered by the location tags located outside the area of interest (i.e. the area in which the mobile receiver 1810 is traversing at a point in time) are not displayed.

Figure 19:
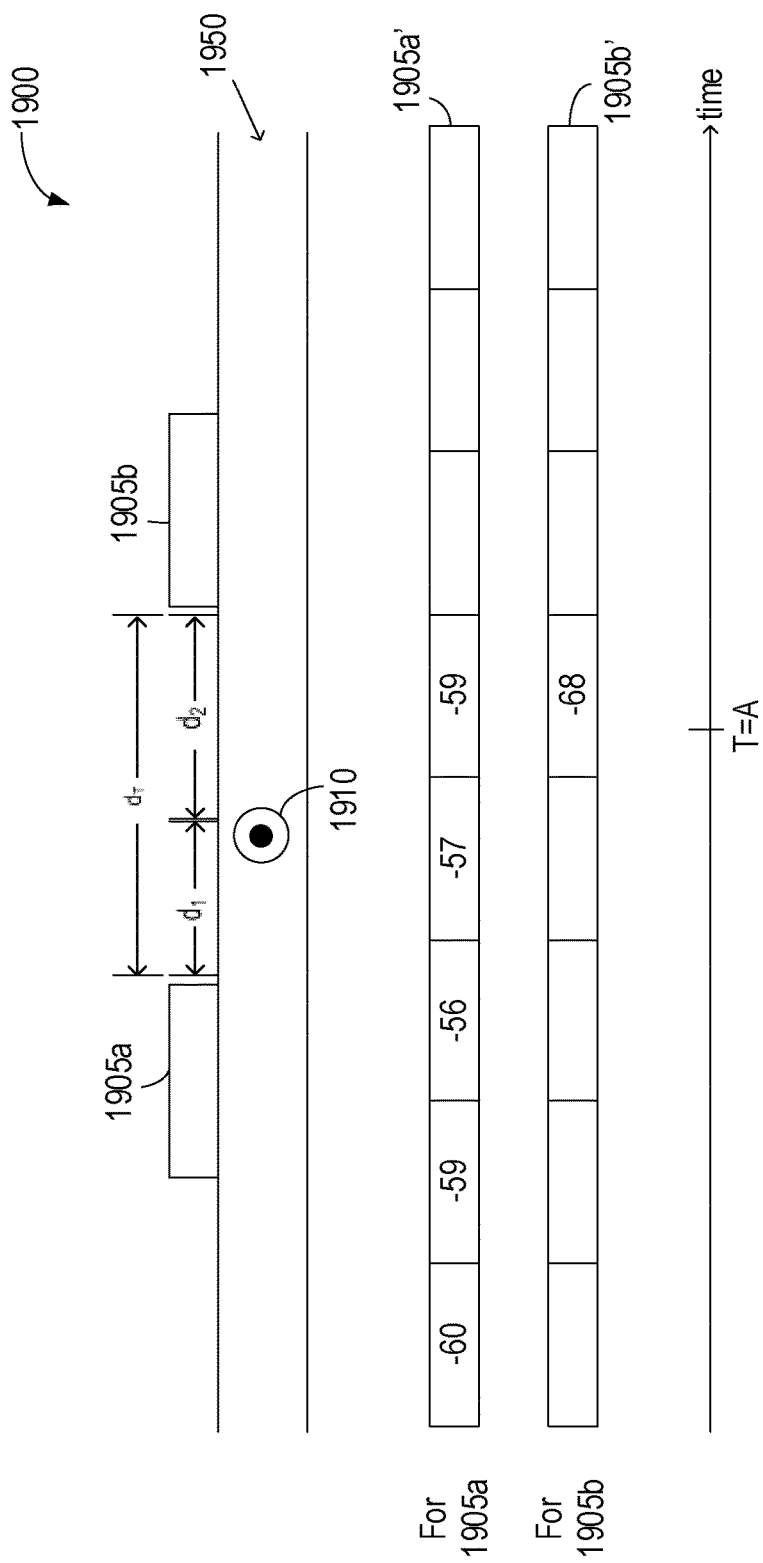
FIG. 19 illustrates a system for tracking the position of a mobile receiver in accordance with an example embodiment.

Reference is next made to FIG. 19, which illustrates a system 1900 for tracking the position of a mobile receiver 1910 on a production line 1950 according to an example embodiment. System 1900 also includes recorded signal strength arrays 1905a' and 1905b'. The signal strength array 1905a' corresponds to signal strengths of the successively received information signals from location tag 1905a as the mobile receiver 1910 approaches, passes, and subsequently moves away from the location tag 1905a. Similarly, the signal strength array 1905b' corresponds to signal strengths of the successively received information signals from location tag 1905b as the mobile receiver approaches, passes, and subsequently moves away from the location tag 1905b.

In various embodiments discussed below, this information, including the positions of the adjacent location tags 1905a and 1905b and/or information pertaining to distance between adjacent location tags 1905a and 1905b, along with signal strength information of location tags (such as signal strength arrays 1905a', 1905b') can be used to determine the position of the mobile receiver 1910 on the production line 1950.

In one embodiment, the location of the mobile receiver 1910 can be determined using a method of interpolation. In this method, the mobile receiver 1910 or an external processor can interpolate a position between the positions of the location tags 1905a and 1905b and determine the position of the mobile receiver 1910 accordingly.

Interpolation can be time based, signal strength based, or based on any other criteria. For example, if the mobile receiver 1910 or the external processor records that the distance between the location tags 1905a and 1905b is $d_T$ units, and at time A, the signal strengths of information signals received from the location tags 1905a and 1905b are −59 dBm and −68 dBm respectively, then the mobile receiver 1910 or the external processor can determine the ratio of the distance of the mobile receiver 1910 from location tag 105a to the distance of the mobile receiver 1910 from location tag 105b based on the ratio of the received signal strengths at time A.

Similarly, for example, if the mobile receiver 1910 or the external processor records that the mobile receiver 1910 passed the location tag 1905a at time=T units, and the time now is A units, then the mobile receiver 1910 or the external processor can interpolate the distance traveled by the mobile receiver 1910 in (A-T) units based on factors such as known distance between the adjacent location tags 1905a and 1905b, known speed of travel of the mobile receiver 1910, or a combination of these.

In another embodiment, the location of the mobile receiver 1910 can be determined by determining the distance of the mobile receiver 1910 from each of the visible location tags and calculating a best estimate of position based on this data.

In the illustrated embodiment, it is assumed that the mobile receiver 1910 only has two visible location tags, namely location tags 1905a and 1905b (i.e. the mobile receiver 1910 can only receive information signals from location tags 1905a and 1905b). The mobile receiver 1910 or the external processor then determines the distance of the mobile receiver 1910 from each of the visible location tags, i.e. location tags 1905a and 1905b. The determination of the distance of the mobile receiver 1910 from the visible location tags can be carried out in a variety of ways, such as those illustrated in the context of FIGS. 16A and 16B above.

Once the mobile receiver 1910 or the external processor determines the distance of the mobile receiver 1910 from each of the visible location tag, the mobile receiver 1910 or the external processor determines the average position of the mobile receiver 1910 based on the known distances between the visible location tags.

In a further embodiment, the location of the mobile receiver 1910 can be determined by determining the signal strengths of information signals received from the visible location tags and the known positions of the visible location tags. In other words, in this embodiment, the location of the mobile receiver 1910 can be determined based on the signal strength arrays 1905a' and 1905b' of the visible location tags 1905 and 1905b, and the known positions of the visible location tags 1905 and 1905b. Off-the-shelf algorithms or mathematical formulae can be used to determine the position of the mobile receiver 1915 in this embodiment.

As previously described, the location tags 1905a and 1905b, and any other location tags on the production line 1950, may be used as guideposts or fixed markers on the production line 1950. Once the information pertaining to the location of the mobile receiver 1910 is additionally determined, an external processor or the mobile receiver 1910 may generate a map of the production line 1950 (also referred to herein as a line map) including the position of the mobile receiver 1910, the position of the location tags and the overall map of the customer's production line, either in a real-time, or playback.

In various embodiments, the map of the production line 1950 may additionally include information pertaining to the motion or orientation of the mobile receiver 1910, the pressure exerted on the mobile receiver 1910 while traversing through the line, or both. This may provide a visual indication to the customer or the recipient of the line map of the problem areas along the production line, such as areas exposed to high pressures etc.

In the various embodiments disclosed herein, the location tags may be selected so that the power settings of the location tags are configurable. The configuration of the location tags may be based on factors such as, desired transmission rates of information signals from the location tags, the amount of metal content on the production line, the amount of other signal blocking noise on the transmission line etc. Setting the power levels of the location tags controls the range of the information signals transmitted from the location tags. However, since a power level and a battery life of a location tag are inversely proportional, the configuration of the location tag to adjust the power levels may be a significant consideration for the operators of the production line. In some cases, all the location tags are configured to have the same power settings. In some other cases, different location tags are configured to have different power settings.

In some cases, the mobile receiver receiving information signals from the location tags may be configured to determine the power settings of the location tags and update the records within the mobile receiver or the external processor accordingly. In some other cases, the mobile receiver may be configured to adjust the power settings of the location tags to a pre-determined level. For example, if a location tag is monitored to transmit an information signal with a lower signal strength than its counterparts (such as, adjacent location tag, or other location tags in the same area), then the power level of the location tag may need to be adjusted. The operator may configure the mobile receiver to then adjust the power level of the problematic location tag (or tags) to a desired power level.

Figure 20A:
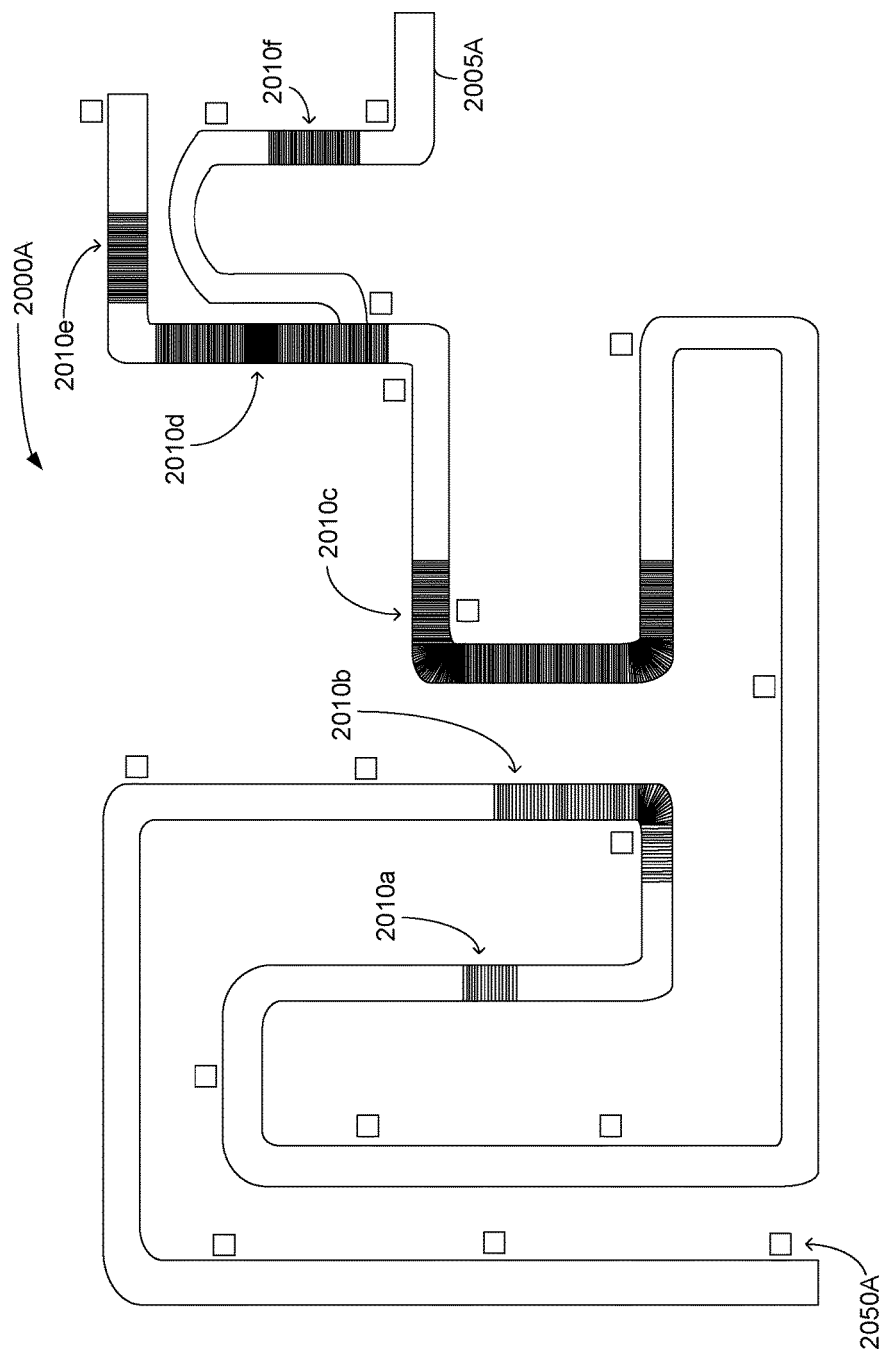
FIG. 20A illustrates a screenshot of a production line map according to an example embodiment.
Figure 20B:
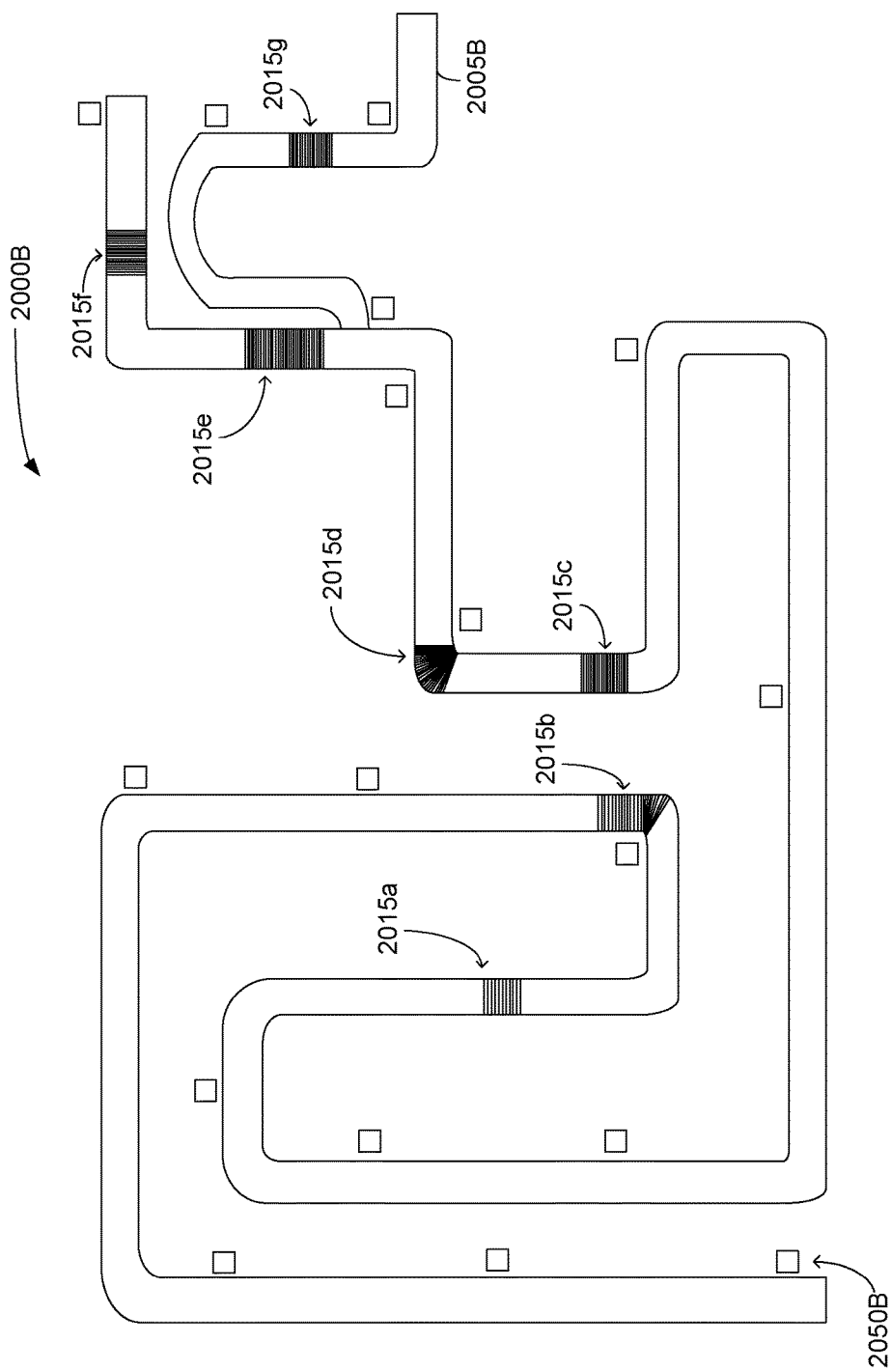
FIG. 20B illustrates a screenshot of a production line map according to another example embodiment.
Figure 20C:
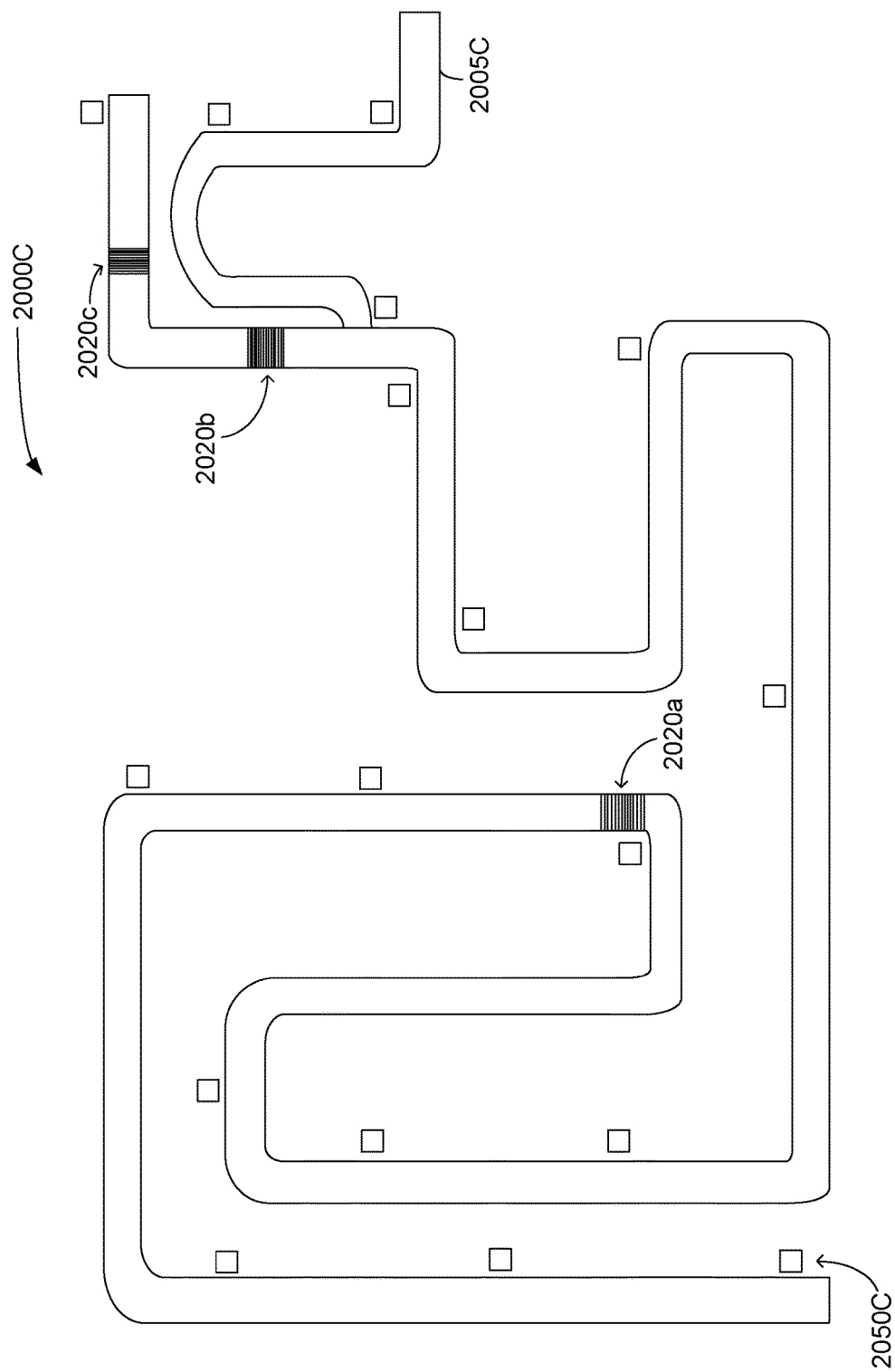
FIG. 20C illustrates a screenshot of a production line map according to a further example embodiment.

Reference is next made to FIGS. 20A-20C illustrating screenshots of a production line map and which show a production line having abnormal pressure areas as detected along the production line. FIG. 20A illustrates an embodiment where the production line map is generated based on manual determination of pressure areas along the production line. FIGS. 20B and 20C illustrate embodiments where the production line map is generated based on the various embodiments disclosed herein. FIG. 20B illustrates a production line map at a first time, and FIG. 20C illustrates a production line map at a second time after adjustments are made to the production line based on the observations of FIG. 20B.

Reference is again made to FIG. 20A, which illustrates a screenshot 2000A of a production line 2005A. FIG. 20A also illustrates numerous abnormal pressure areas along the production line 2005A. As shown, the production line 2005A has a first abnormal pressure area 2010a, a second abnormal pressure area 2010b, a third abnormal pressure area 2010c, a fourth abnormal pressure area 2010d, a fifth abnormal pressure area 2010e and a sixth abnormal pressure area 2010f.

In the embodiment of FIG. 20A, the production line 2005A is observed manually and movement of a mobile receiver, such as the mobile receiver 110 of FIG. 1, along the production line 2005A is observed and recorded manually. As discussed above, the mobile receiver is operable to measure pressure forces exerted on it as it traverses through the production line 2005A. Accordingly, the mobile receiver is able to keep track of pressure data along the production line 2005A over time.

However, in this embodiment, associating the measured pressure data to various areas of the production line 2005A is carried out manually. Typically, a human operator monitors the mobile receiver as it traverses along the production line 2005A, and manually flags the times at which the mobile receiver passes the location tags 2050A. Then, at a later time, the information about the pressure data is combined with the information about when the mobile received traverses various regions of the production line 2005A. In the illustrated embodiment, the combined result is further refined to only indicate those pressure areas where the measured pressure data is determined to be abnormal or unacceptable. The screenshot 2000A illustrates this refined combined result.

There are many disadvantages that result from a manual generation of the production line map. This process tends to be prone to human errors. For example, different human operators may have different reaction times to when the mobile receiver passes the location tags along the production line 2005A, and accordingly may record this information differently. Furthermore, some human operators tend to be more conservative in their estimates than others. Accordingly, it will be understood that two human operators observing the same production line at the same time may nevertheless generate two different production line maps.

Reference is next made to FIGS. 20B and 20C, which illustrates screenshots 2000B and 2000C of production lines 2005B and 2005C, respectively. In these embodiments, the generation of the production line maps 200B and 2000C is automated based on the teachings of the various embodiments disclosed herein. Specifically, in these embodiments, both the measurement of pressure forces exerted on the mobile receiver as well as tracking the position of the mobile receiver as it passes the locations tags 2050B and 2050C, respectively, along the production lines 2005B and 2005C, respectively, are automated.

As illustrated in FIG. 20B, numerous abnormal pressure areas along the production line 2005A include a first abnormal pressure area 2015a, a second abnormal pressure area 2015b, a third abnormal pressure area 2015c, a fourth abnormal pressure area 2015d, a fifth abnormal pressure area 2015e, a sixth abnormal pressure area 2015f and a seventh abnormal pressure area 2015g.

When compared to the production line map 2000A of FIG. 20A, it can be observed that the production line map 2000B of FIG. 20B, generated based on the teachings of the present application, shows precise locations of abnormal pressure areas along the production line 2005B. For example, while the second abnormal pressure area 2010b of FIG. 20A and the second abnormal pressure area 2015b of FIG. 20B are generally in the same region along on the respective production lines, the production line map 200B of FIG. 20B is more precise in indicating the exact region of abnormal pressure exposure. This advantage is possible because of the precise location tracking techniques disclosed in the various embodiments herein.

Reference is next made to FIG. 20C, which illustrates a screenshot 2000C of a production line 2005C. FIG. 20C also illustrates numerous abnormal pressure areas along the production line 2005C. As shown, the production line 2005C has a first abnormal pressure area 2020a, a second abnormal pressure area 2020b and a third abnormal pressure area 2030c.

The production line map 2000C of FIG. 20C is provided to illustrate the advantages of the various embodiments disclosed herein. Once a production line map, such as the production line map 2000B of FIG. 20B, is generated at time A and relayed to a customer operating the production line, the customer can easily detect the problem areas along the production line. The customer will then typically make adjustments to the production line in the problem areas. Once the adjustments are made, the customer can generate another production line map, such as the production line map 2000C of FIG. 20C, at time B, and observe if any improvements have been realized by making the adjustments to the production line.

As illustrated in FIG. 20C, the production line map 2000C shows fewer problem areas along the production line, indicating to the customer that the adjustments made to the production line based on the results of the production line map 2000B were helpful, and that a few more adjustments still need to be made to minimize or eliminate the abnormal pressure exposure along the production line.

As can be appreciated, the production line maps, such as production line maps 2000A, 2000B and 2000C of FIGS. 20A-20C, provide a very useful tool to demonstrate the state or the health of a production line to the customers operating the production line. The production line maps can be generated to observe improvements to pressure exposure when adjustments are made to the production line, as discussed above. The production line maps can also be used to monitor the state of the production line by comparing production line maps generated at different times, weeks or months.

As can also be appreciated, while a visual display of the production line map is illustrated in FIGS. 20A-20C, the same information regarding abnormal pressure exposure along the production line can be relayed to the customer operating the production line in the form of reports, graphs, audio or any other means of relaying information.

Various modifications and variations may be made to these example embodiments without departing from the spirit and scope of the embodiments, which is limited only by the appended claims which should be given the broadest interpretation consistent with the description as a whole.

What is claimed is:

1. A method of tracking the position of a mobile receiver on a production line, the production line having a movable conveyor belt and a plurality of location tags positioned at fixed locations along the length of the conveyor belt, and wherein the mobile receiver, when placed on a moving conveyor belt, is moving with respect to the plurality of location tags such that the distance between the mobile receiver and the plurality of location tags is continuously changing, and wherein the mobile receiver is configured to observe and communicate with one or more location tags within a range of the mobile receiver, the method comprising:

- receiving at least one information signal from at least one location tag;
- determining a signal strength of the at least one information signal;
- determining whether the signal strength of the at least one information signal is a local maximum; and
- generating an event entry if the signal strength of the at least one information signal is determined to be a local maximum, wherein the event entry indicates that the mobile receiver has reached a minimum distance with respect to the at least one location tag transmitting the at least one information signal having the signal strength determined to be a local maximum.

2. The method of claim 1, further comprising:
- determining the position of the mobile receiver based on the signal strength of the at least one information signal.

3. The method of claim 2, further comprising:
- transmitting a data signal from the mobile receiver to an external processor, wherein the data signal comprises at least one of the signal strength of the at least one information signal and a location tag identifier corresponding to the at least one location tag transmitting the at least one information signal; and
- wherein determining the position of the mobile receiver based on the signal strength of the at least one information signal comprises determining the position of the mobile receiver at the external processor.

4. The method of claim 2, further comprising:
- recording sensor data corresponding to orientation of the mobile receiver and pressure exerted on the mobile receiver;
- recording the sensor data and the event entry in a data stream in a unique sequence corresponding to a sequence in which the sensor data was recorded and the event entry was generated by the mobile receiver; and
- transmitting the data stream to an external processor, wherein the external processor is communicably linked to the mobile receiver.

5. The method of claim 2, further comprising:
- transmitting one or more information signals from the at least one location tag, wherein the at least one location tag is configurable to switch the frequency of transmission of the one or more information signals from an activated frequency to a pre-activated frequency based on the generation of the event entry, wherein the activated frequency is higher than the pre-activated frequency.

6. The method of claim 2, wherein determining the position of the mobile receiver based on the signal strength of the at least one information signal comprises:
- associating a first signal strength corresponding to a first information signal received from a first location tag to a first distance value;
- associating a second signal strength corresponding to a second information signal received from a second location tag to a second distance value, wherein the first location tag is adjacent to the second location tag, and wherein the distance between the first location tag and the second location tag are known; and
- determining a position of the mobile receiver between the first location tag and the second location tag based on the first distance value, the second distance value and the distance between the first location tag and the second location tag.

7. The method of claim 1, further comprising transmitting one or more information signals from the at least one location tag, the at least one location tag being configurable to change frequency of transmission of the one or more information signals based on an activation signal received from the mobile receiver, wherein:
- prior to receiving the activation signal from the mobile receiver, the at least one location tag is configured to transmit the one or more information signals at a pre-activated frequency, and
- subsequent to receiving the activation signal from the mobile receiver, the at least one location tag is configured to transmit the one or more information signals at an activated frequency, wherein the activated frequency is higher than the pre-activated frequency.

8. A system for tracking the position of a mobile receiver on a production line, the production line having a moving conveyor belt, the system comprising:
- at least one location tag, the at least one location tag positioned at an at least one fixed location along the length of the conveyor belt; and
- a mobile receiver, wherein the mobile receiver, when placed on a moving conveyor belt, is moving with respect to the at least one location tag such that the distance between the mobile receiver and the at least one location tag is continuously changing, and wherein the mobile receiver is configured to observe and communicate with one or more location tags within a range of the mobile receiver, the mobile receiver comprising a processor unit, the processor unit being configured to:
  - receive at least one information signal from at least one location tag;
  - determine a signal strength of the at least one information signal;
  - determine whether the signal strength of the at least one information signal is a local maximum; and
  - generate an event entry if the signal strength of the at least one information signal is determined to be a local maximum to determine the position of the mobile receiver, wherein the event entry indicates that the mobile receiver has reached a minimum distance with respect to the at least one location tag transmitting the at least one information signal having the signal strength determined to be a local maximum.

9. The system of claim 8, wherein the processor unit of the mobile receiver is configured to determine the position of the mobile receiver based on the signal strength of the at least one information signal.

10. The system of claim 9, wherein the at least one location tag is configured to switch frequency of transmission of one or more information signals from an activated frequency to a pre-activated frequency based on the generation of the event entry, wherein the activated frequency is higher than the pre-activated frequency.

11. The system of claim 8, further comprising an external processor communicably linked to the mobile receiver, wherein the processor unit of the mobile receiver is configured to buffer a plurality of event entries as buffered event entries and transmit the buffered event entries to the external processor for processing.

12. The system of claim 8, wherein the processor unit of the mobile receiver is further configured to:
    record sensor data corresponding to orientation of the mobile receiver and pressure exerted on the mobile receiver;
    record the sensor data and the event entry in a data stream in a unique sequence corresponding to a sequence in which the sensor data was recorded and the event entry was generated by the mobile receiver; and
    transmit the data stream to an external processor, wherein the external processor is communicably linked to the mobile receiver.

13. The system of claim 8, wherein the at least one location tag is configured to transmit one or more information signals and is configurable to change frequency of transmission of the one or more information signals based on an activation signal received from the mobile receiver such that prior to receiving the activation signal from the mobile receiver, the at least one location tag is configured to transmit the one or more information signals at a pre-activated frequency, and subsequent to receiving the activation signal from the mobile receiver, the at least one location tag is configured to transmit the one or more information signals at an activated frequency, wherein the activated frequency is higher than the pre-activated frequency.

14. The system of claim 8, wherein the processor unit of the mobile receiver is configured to associate a first signal strength corresponding to a first information signal received from a first location tag to a first distance value, associate a second signal strength corresponding to a second information signal received from a second location tag to a second distance value, wherein the first location tag is adjacent to the second location tag, and wherein the distance between the first location tag and the second location tag are known, and determine a position of the mobile receiver between the first location tag and the second location tag based on the first distance value, the second distance value and the distance between the first location tag and the second location tag.

15. A non-transitory computer-readable medium storing computer-executable instructions, the instructions for causing a processor to perform a method of tracking the position of a mobile receiver on a production line, the production line having a moveable conveyor belt and a plurality of location tags positioned at fixed locations along the length of the conveyor belt, and wherein the mobile receiver, when placed on a moving conveyor belt, is moving with respect to the plurality of location tags such that the distance between the mobile receiver and the plurality of location tags is continuously changing, and wherein the mobile receiver is configured to observe and communicate with one or more location tags within a range of the mobile receiver, the method comprising:
    receiving at least one information signal from at least one location tag;
    determining a signal strength of the at least one information signal;
    determining whether the signal strength of the at least one information signal is a local maximum; and
    generating an event entry if the signal strength of the at least one information signal is determined to be a local maximum, wherein the even entry indicates that the mobile receiver has reached a minimum distance with respect to the at least one location tag transmitting the at least one information signal having the signal strength determined to be a local maximum.

16. The non-transitory computer-readable medium of claim 15, wherein the processor is further configured to determine the position of the mobile receiver based on the signal strength of the at least one information signal.

17. The non-transitory computer-readable medium of claim 16, wherein the at least one location tag is configured to switch frequency of transmission of one or more information signals from an activated frequency to a pre-activated frequency based on the generation of the event entry, wherein the activated frequency is higher than the pre-activated frequency.

18. The non-transitory computer-readable medium of claim 15, wherein the processor is further configured to:
    record sensor data corresponding to orientation of the mobile receiver and pressure exerted on the mobile receiver;
    record the sensor data and the event entry in a data stream in a unique sequence corresponding to a sequence in which the sensor data was recorded and the event entry was generated by the mobile receiver; and
    transmit the data stream to an external processor, wherein the external processor is communicably linked to the mobile receiver.

19. The non-transitory computer-readable medium of claim 15, wherein the at least one location tag is configured to transmit one or more information signals and is configurable to change frequency of transmission of the one or more information signals based on an activation signal received from the mobile receiver such that prior to receiving the activation signal from the mobile receiver, the at least one location tag is configured to transmit the one or more information signals at a pre-activated frequency, and subsequent to receiving the activation signal from the mobile receiver, the at least one location tag is configured to transmit the one or more information signals at an activated frequency, wherein the activated frequency is higher than the pre-activated frequency.

20. The system of claim 15, wherein the processor is further configured to associate a first signal strength corresponding to a first information signal received from a first location tag to a first distance value, associate a second signal strength corresponding to a second information signal received from a second location tag to a second distance value, wherein the first location tag is adjacent to the second location tag, and wherein the distance between the first location tag and the second location tag are known, and determine a position of the mobile receiver between the first location tag and the second location tag based on the first distance value, the second distance value and the distance between the first location tag and the second location tag.

* * * * *

UNITED STATES PATENT AND TRADEMARK OFFICE
CERTIFICATE OF CORRECTION

PATENT NO. : 10,386,453 B2
APPLICATION NO. : 15/533226
DATED : August 20, 2019
INVENTOR(S) : Kumaran Thillainadarajah et al.

Page 1 of 1

It is certified that error appears in the above-identified patent and that said Letters Patent is hereby corrected as shown below:

In the Claims

Claim 15, Column 48, Line 5, "...wherein the even entry..." should read -- wherein the event entry --.

Signed and Sealed this
Twenty-sixth Day of May, 2020

Andrei Iancu
*Director of the United States Patent and Trademark Office*